(12) United States Patent
Kim et al.

(10) Patent No.: US 10,747,353 B2
(45) Date of Patent: Aug. 18, 2020

(54) ELECTRONIC DEVICE AND METHOD OF CONTROLLING THE ELECTRONIC DEVICE BASED ON TOUCH INPUT

(71) Applicant: Samsung Electronics Co., Ltd., Suwon-si, Gyeonggi-do (KR)

(72) Inventors: Nayoung Kim, Seoul (KR); Seungwook Nam, Bucheon-si (KR); Daehwan Kim, Suwon-si (KR); Kwangtai Kim, Suwon-si (KR); Mooyoung Kim, Seoul (KR); Hyungsup Byeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/955,118

(22) Filed: Apr. 17, 2018

(65) Prior Publication Data

US 2018/0314362 A1 Nov. 1, 2018

(30) Foreign Application Priority Data

Apr. 26, 2017 (KR) .................. 10-2017-0053976

(51) Int. Cl.
*G06F 3/041* (2006.01)
*G06F 3/0488* (2013.01)
*G06F 3/044* (2006.01)
*G06F 1/16* (2006.01)

(52) U.S. Cl.
CPC .......... *G06F 3/0414* (2013.01); *G06F 1/1626* (2013.01); *G06F 1/1637* (2013.01);
(Continued)

(58) Field of Classification Search
CPC .. G06F 3/0484; G06F 3/04842; G06F 3/0488; G06F 3/04883; G06F 2203/04105;
(Continued)

(56) References Cited

U.S. PATENT DOCUMENTS

| 2010/0220065 A1* | 9/2010 | Ma .................. G06F 3/016 345/173 |
| 2012/0105367 A1* | 5/2012 | Son .................. G06F 3/0414 345/174 |

(Continued)

FOREIGN PATENT DOCUMENTS

| EP | 3 109 727 A2 | 12/2016 |
| WO | 2017/004748 A1 | 1/2017 |
| WO | 2017/053430 A1 | 3/2017 |

OTHER PUBLICATIONS

International Search Report dated Jul. 17, 2018, issued in International Patent Application No. PCT/KR2018/004456.

(Continued)

*Primary Examiner* — Xuemei Zheng

(74) *Attorney, Agent, or Firm* — Jefferson IP Law, LLP

(57) ABSTRACT

A method of detecting a touch input and controlling an electronic device based on the touch input is provided. The method of includes displaying a user interface through a touchscreen display; detecting a first touch input with a pressure lower than a first threshold via a first region of the display and performing a first action, detecting a second touch input with a pressure lower than a second threshold via a second region of the display adjacent to a periphery of the display and performing a second action, detecting a third touch input with a pressure greater than the first threshold via the first region of the display and performing a third action, and detecting a fourth touch input with a pressure greater than the second threshold via the second region and performing a generic fourth action associated with the electronic device.

16 Claims, 44 Drawing Sheets

(52) U.S. Cl.
CPC ............ *G06F 1/1643* (2013.01); *G06F 3/041* (2013.01); *G06F 3/044* (2013.01); *G06F 3/0488* (2013.01); *G06F 3/04883* (2013.01); *G06F 3/04886* (2013.01); *G06F 2203/04103* (2013.01); *G06F 2203/04104* (2013.01); *G06F 2203/04105* (2013.01)

(58) Field of Classification Search
CPC ..... G06F 3/0414–04144; G06F 3/0416; G06F 3/0418
See application file for complete search history.

(56) References Cited

U.S. PATENT DOCUMENTS

| | | | |
|---|---|---|---|
| 2013/0172052 A1* | 7/2013 | Bengtsson | G06F 3/041 455/566 |
| 2014/0009413 A1 | 1/2014 | Su et al. | |
| 2014/0145993 A1* | 5/2014 | Nakayama | G06F 3/0414 345/173 |
| 2016/0224233 A1 | 8/2016 | Phang et al. | |
| 2016/0259412 A1 | 9/2016 | Flint et al. | |
| 2016/0328065 A1 | 11/2016 | Johnson et al. | |
| 2016/0378334 A1 | 12/2016 | Liu et al. | |
| 2017/0083096 A1 | 3/2017 | Rihn et al. | |
| 2017/0293387 A1* | 10/2017 | Zhang | G06F 3/016 |
| 2018/0059893 A1 | 3/2018 | Xu et al. | |
| 2018/0284512 A1* | 10/2018 | Lee | G06F 1/1643 |

OTHER PUBLICATIONS

Extended European Search Report dated Dec. 6, 2019, issued in European Patent Application No. 18790618.5-1221.

* cited by examiner

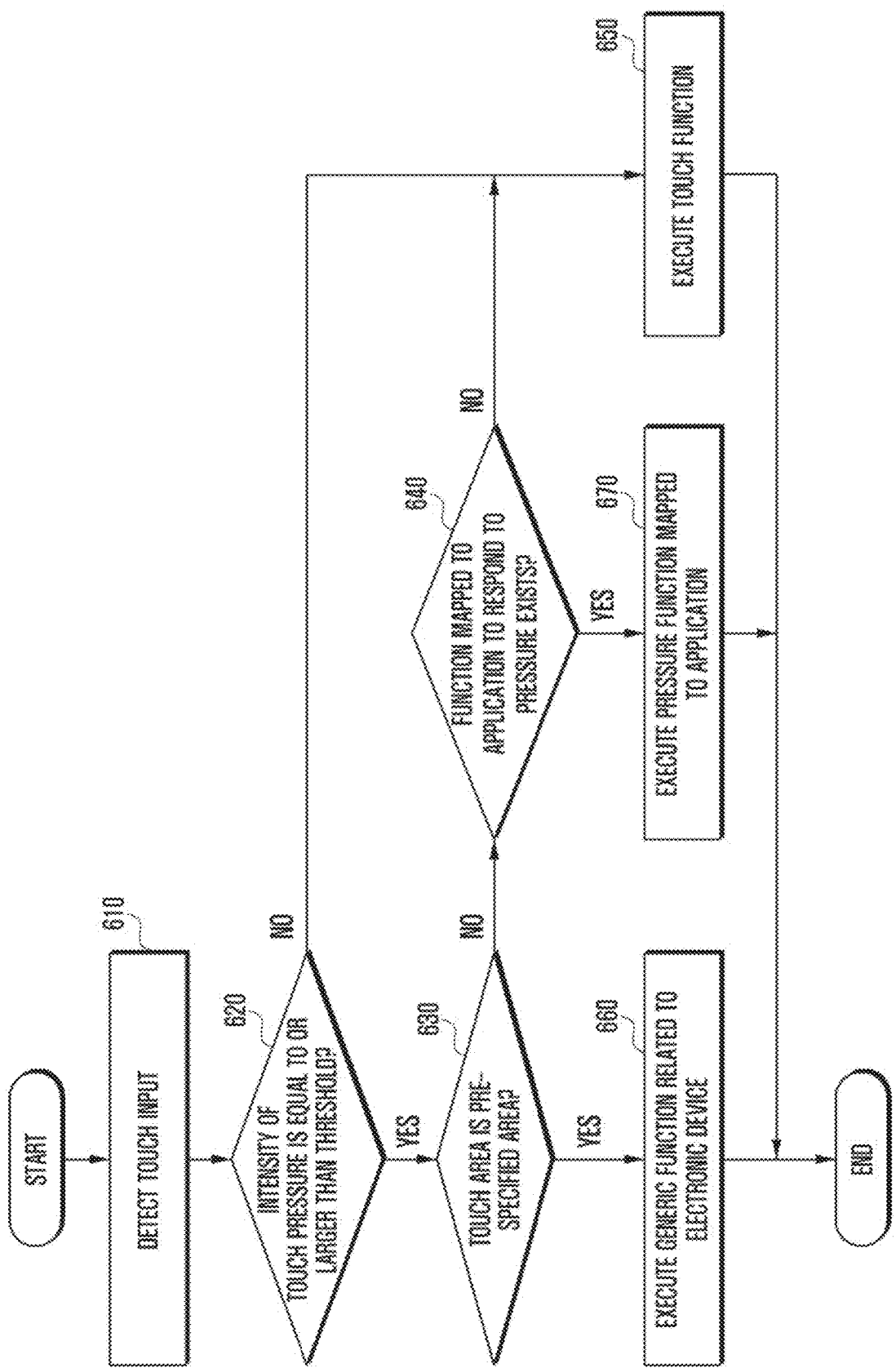

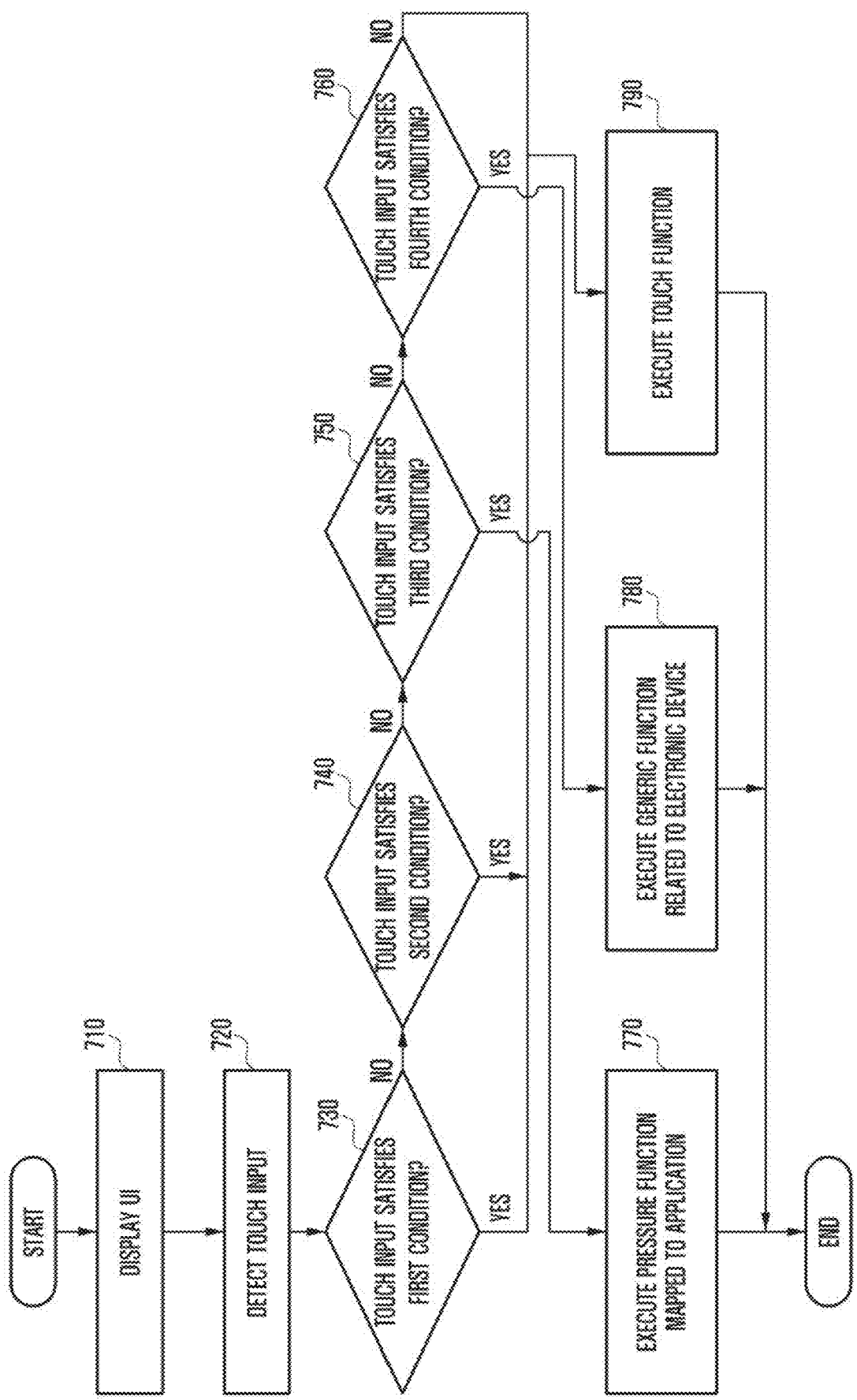

FIG. 11A
FIG. 11B
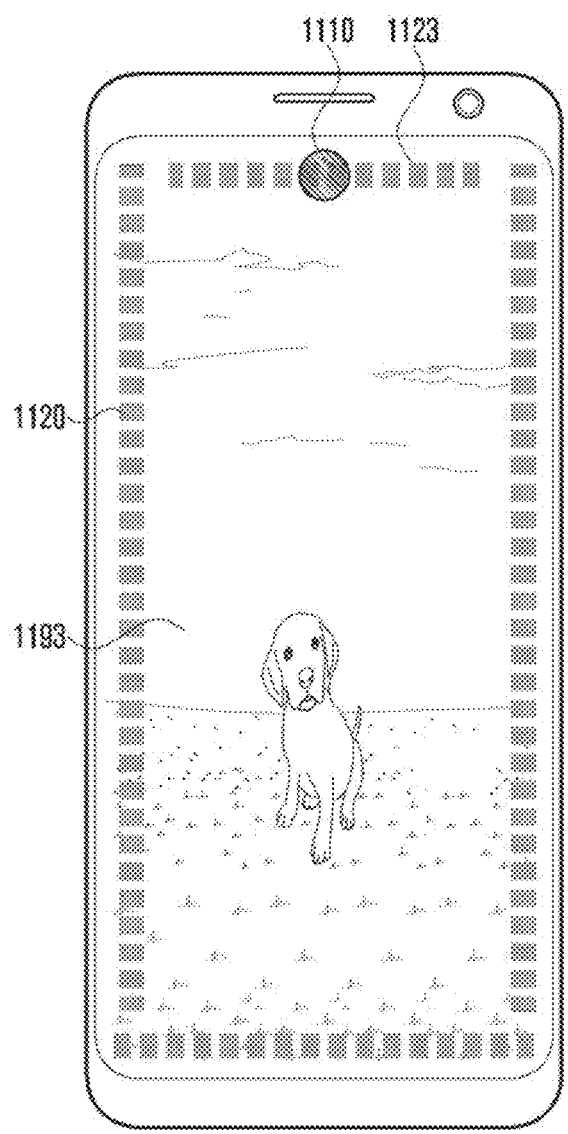
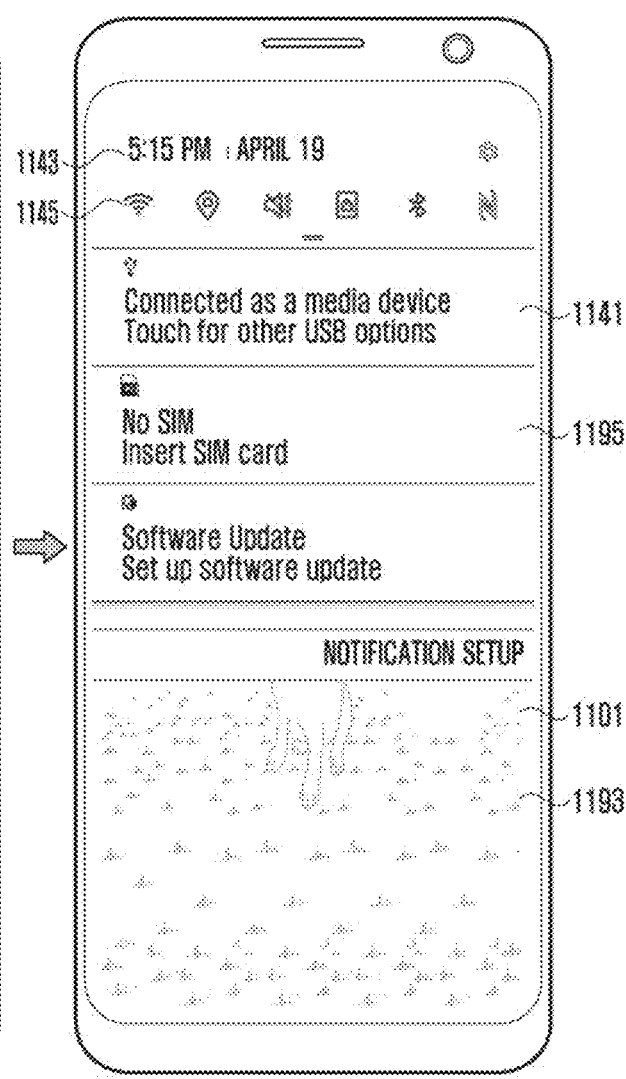

FIG. 12A
FIG. 12B
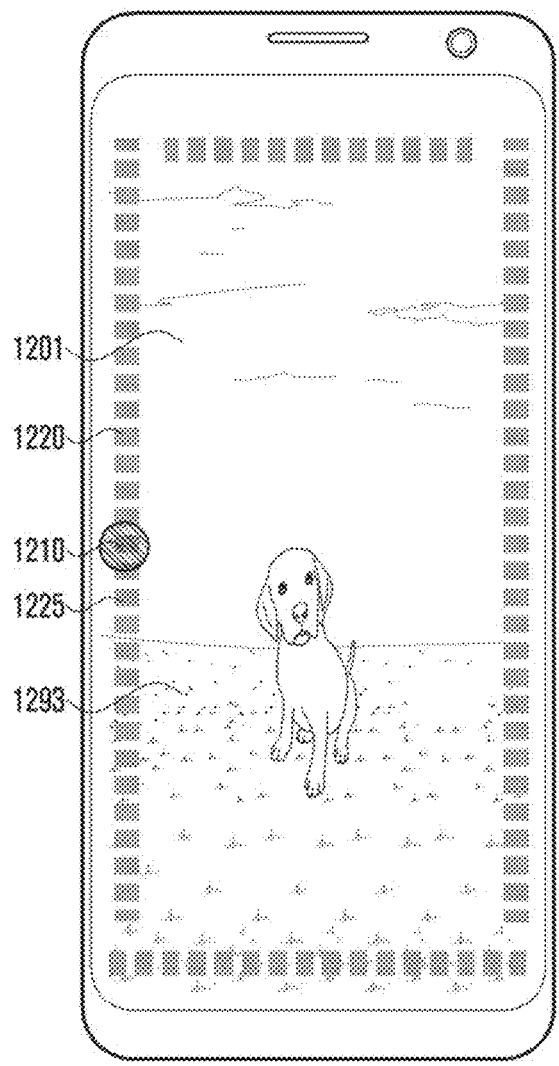
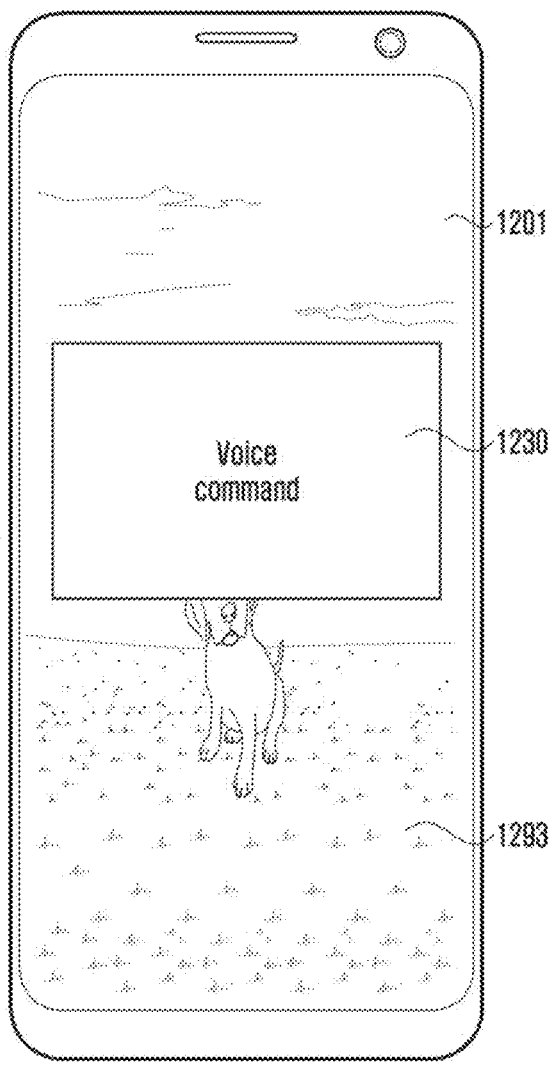

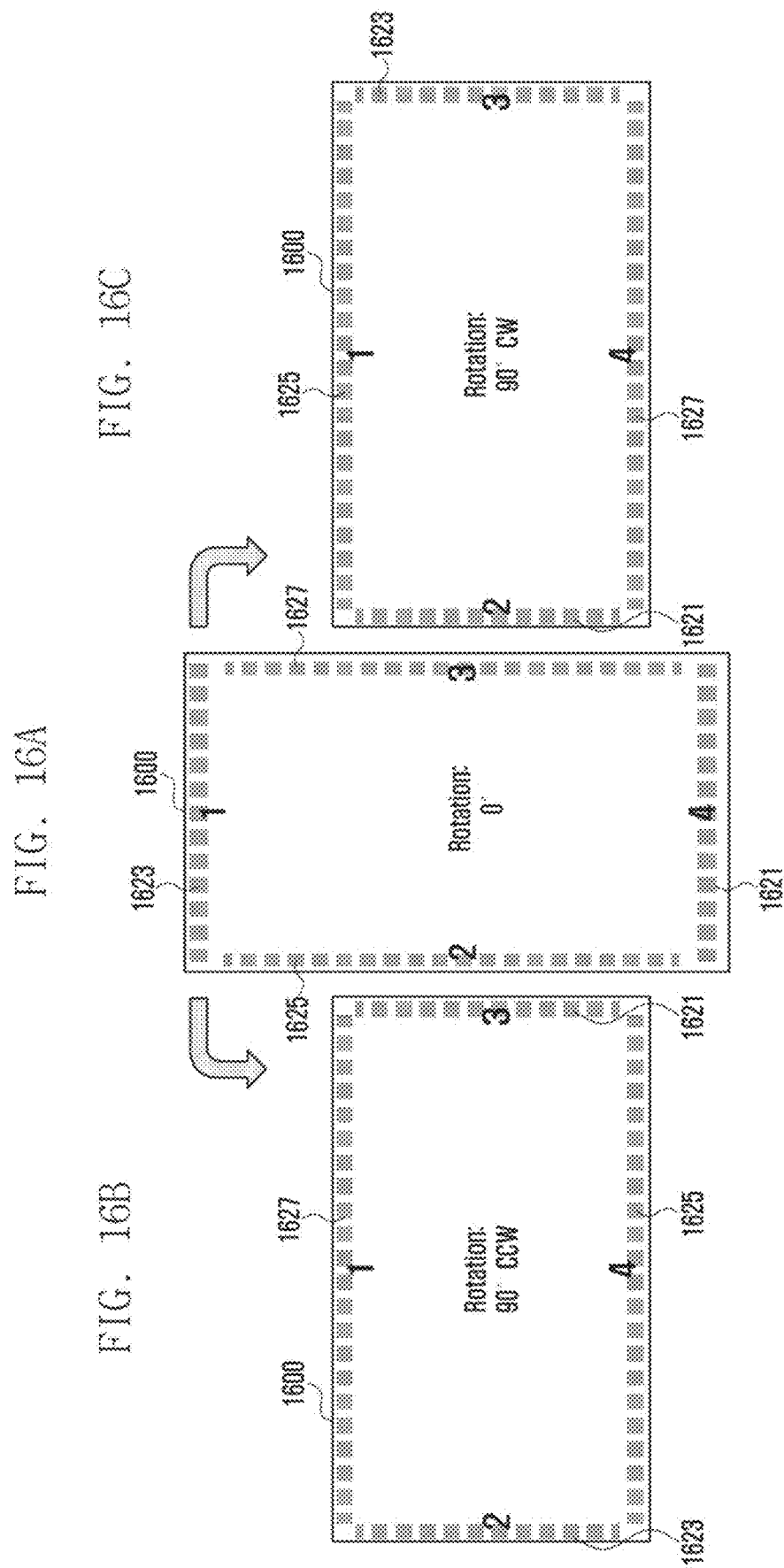

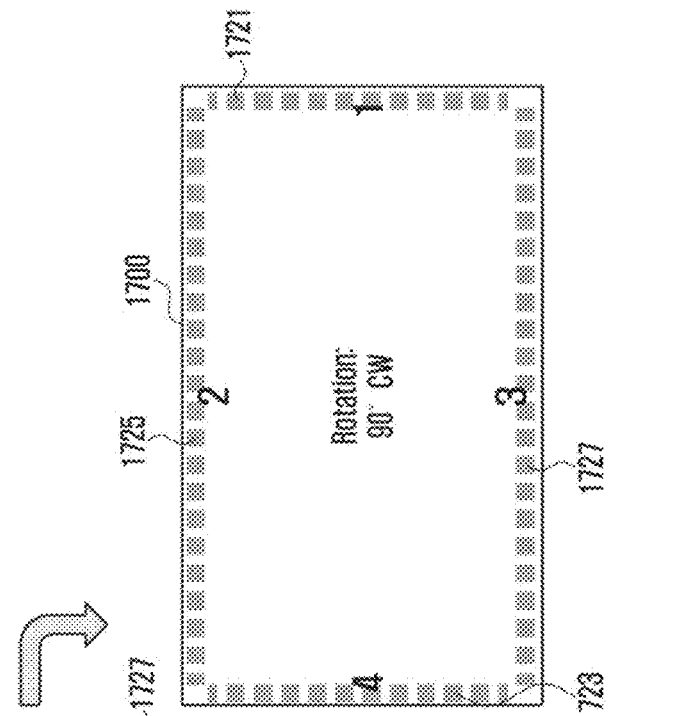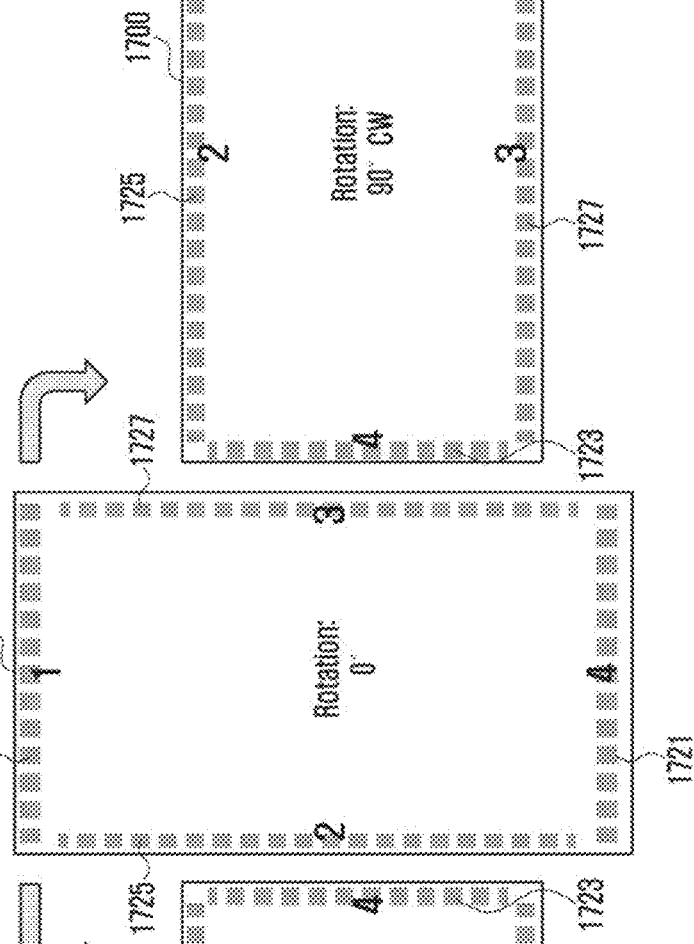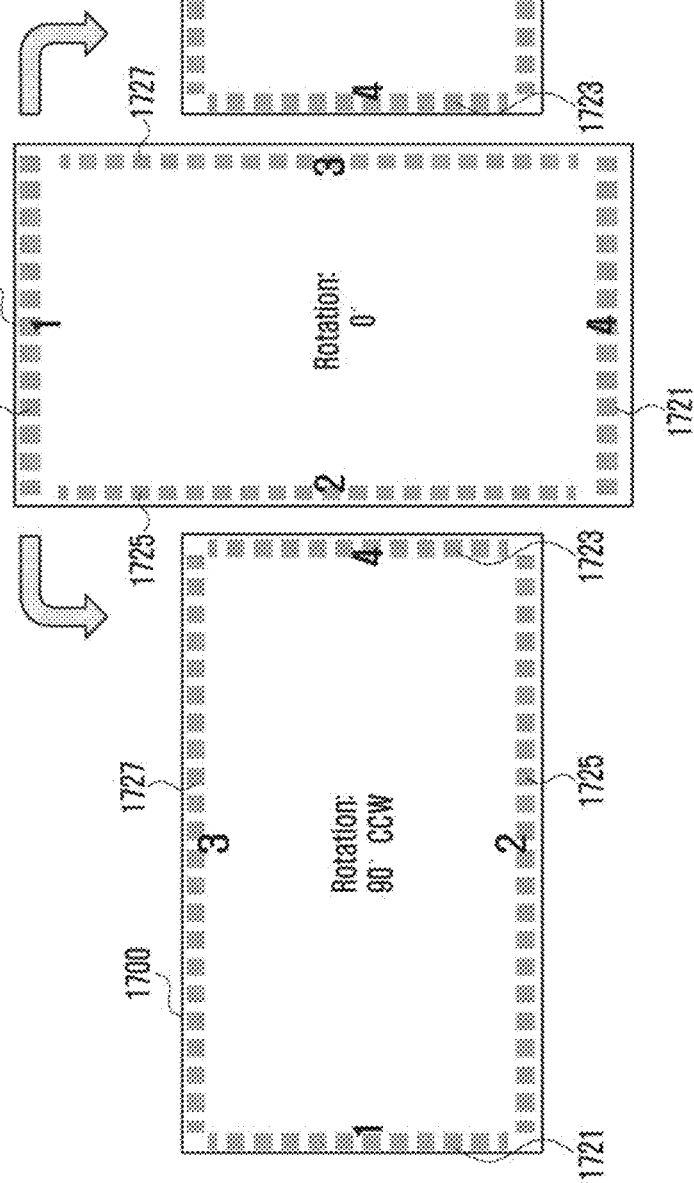

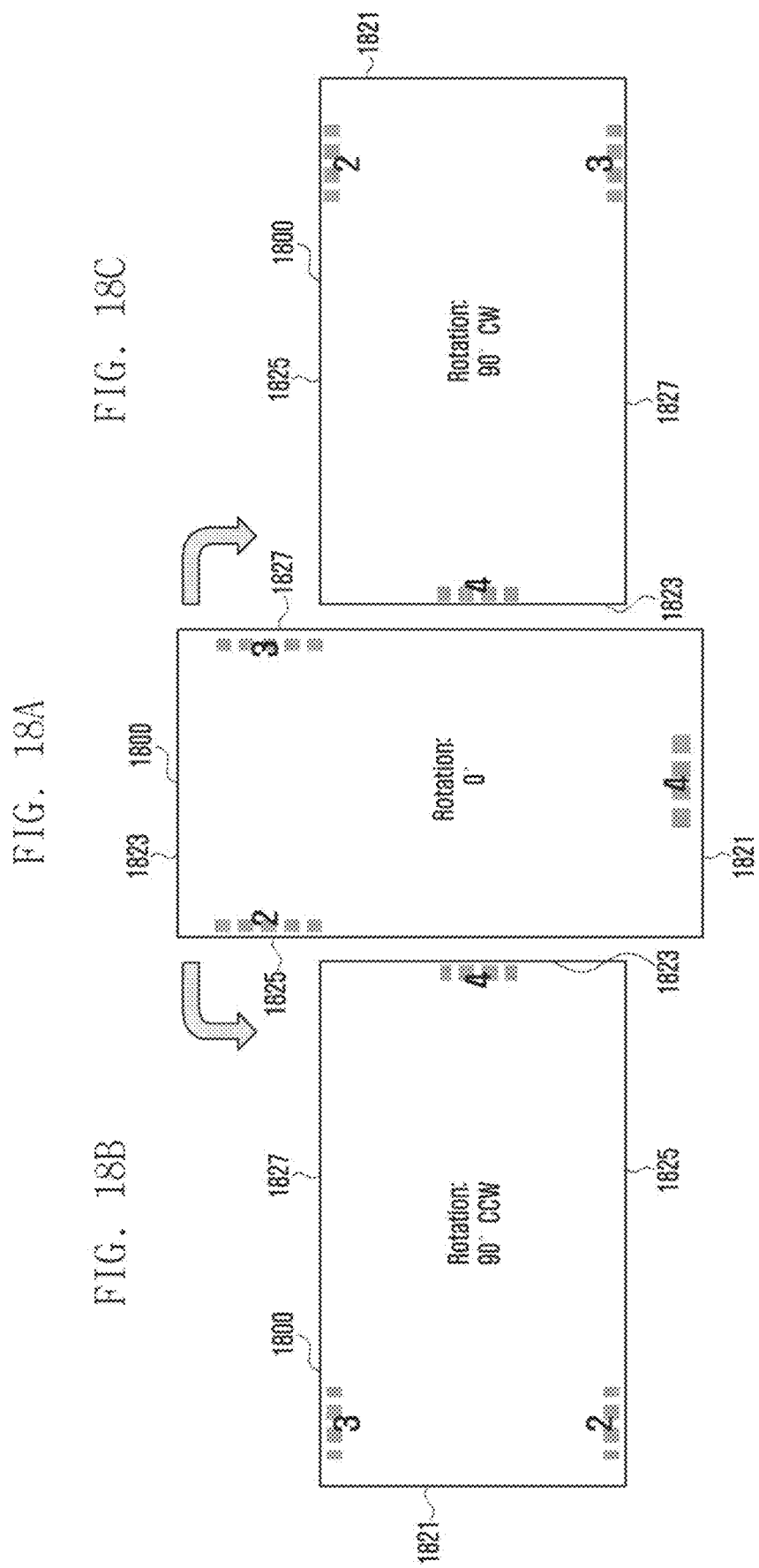

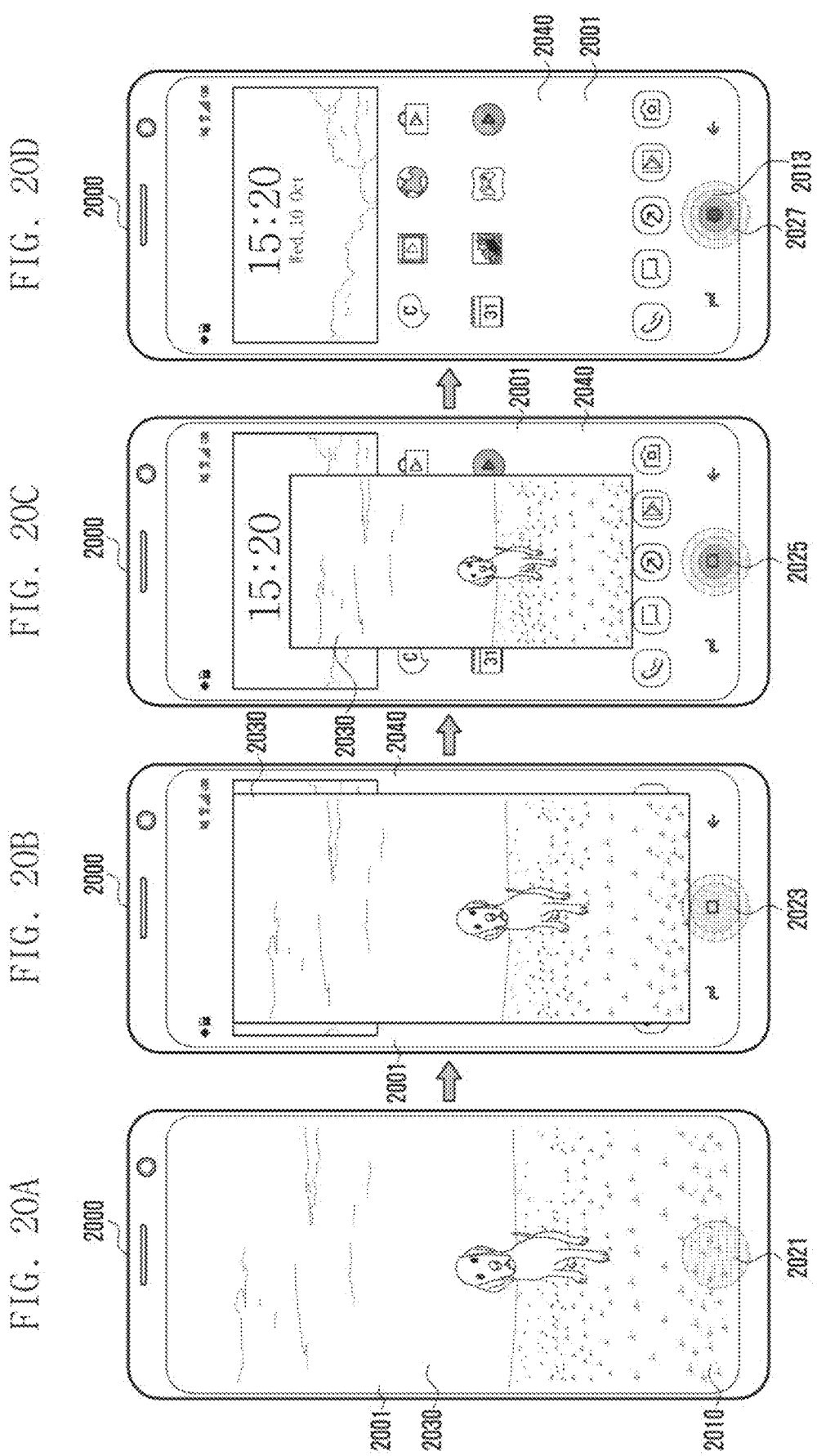

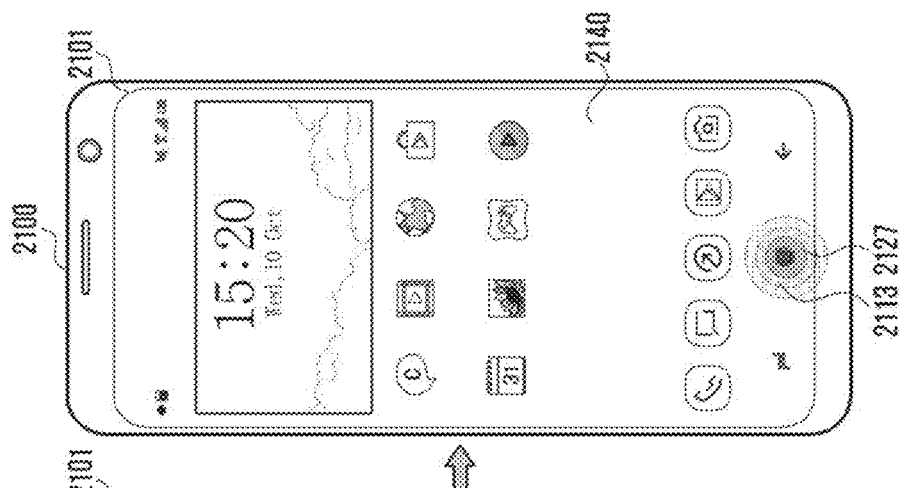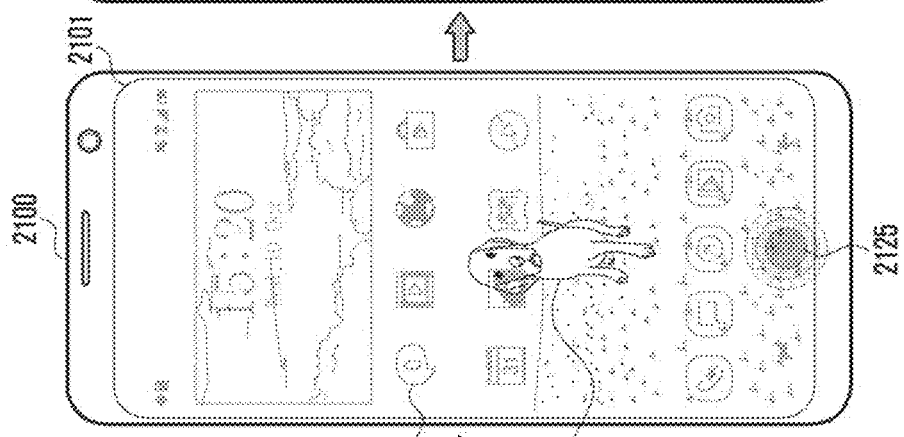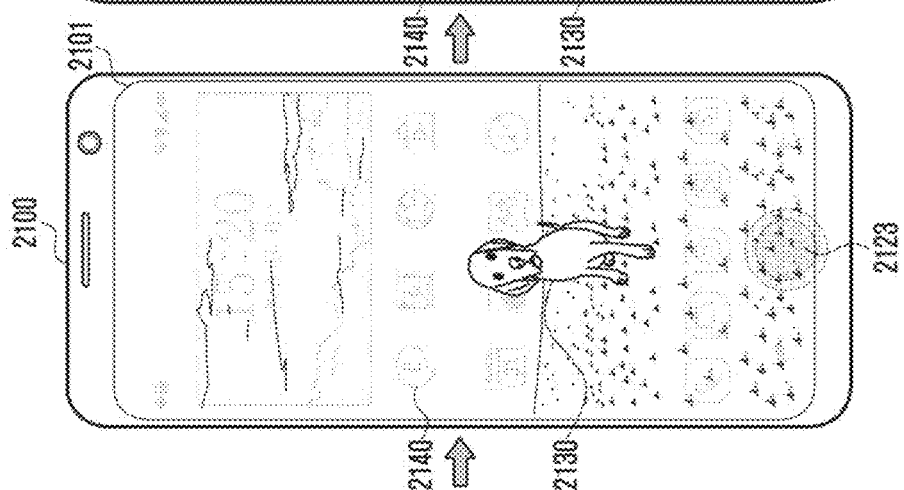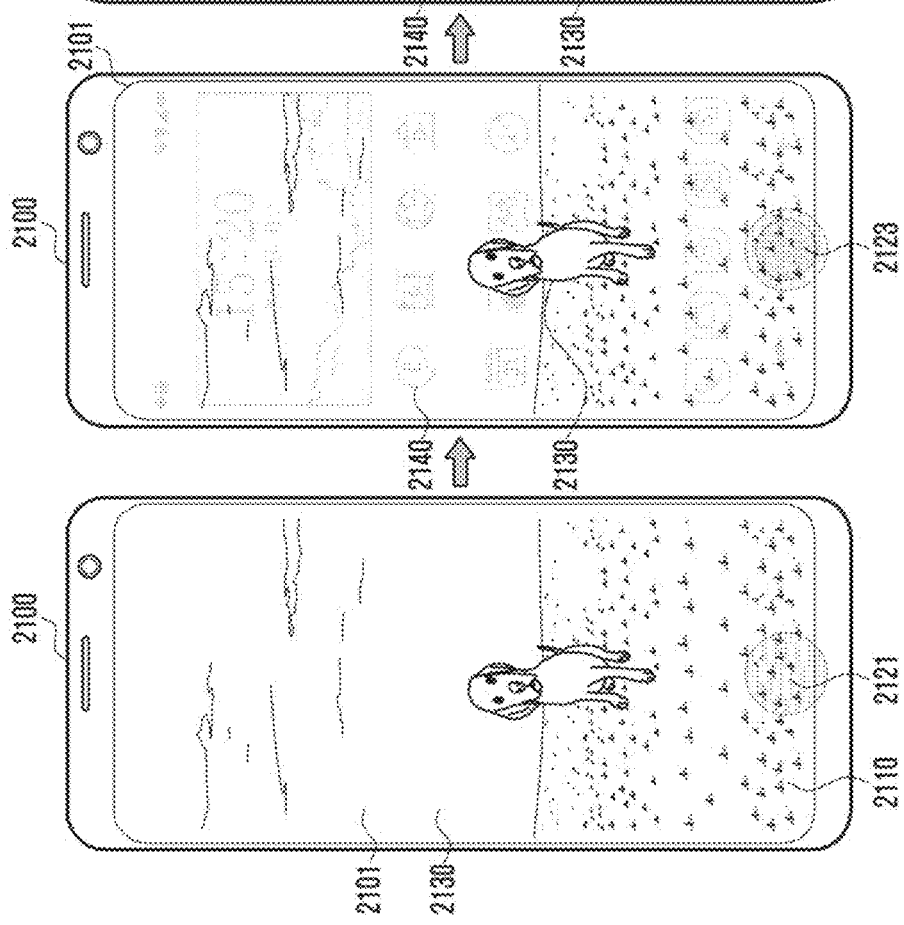

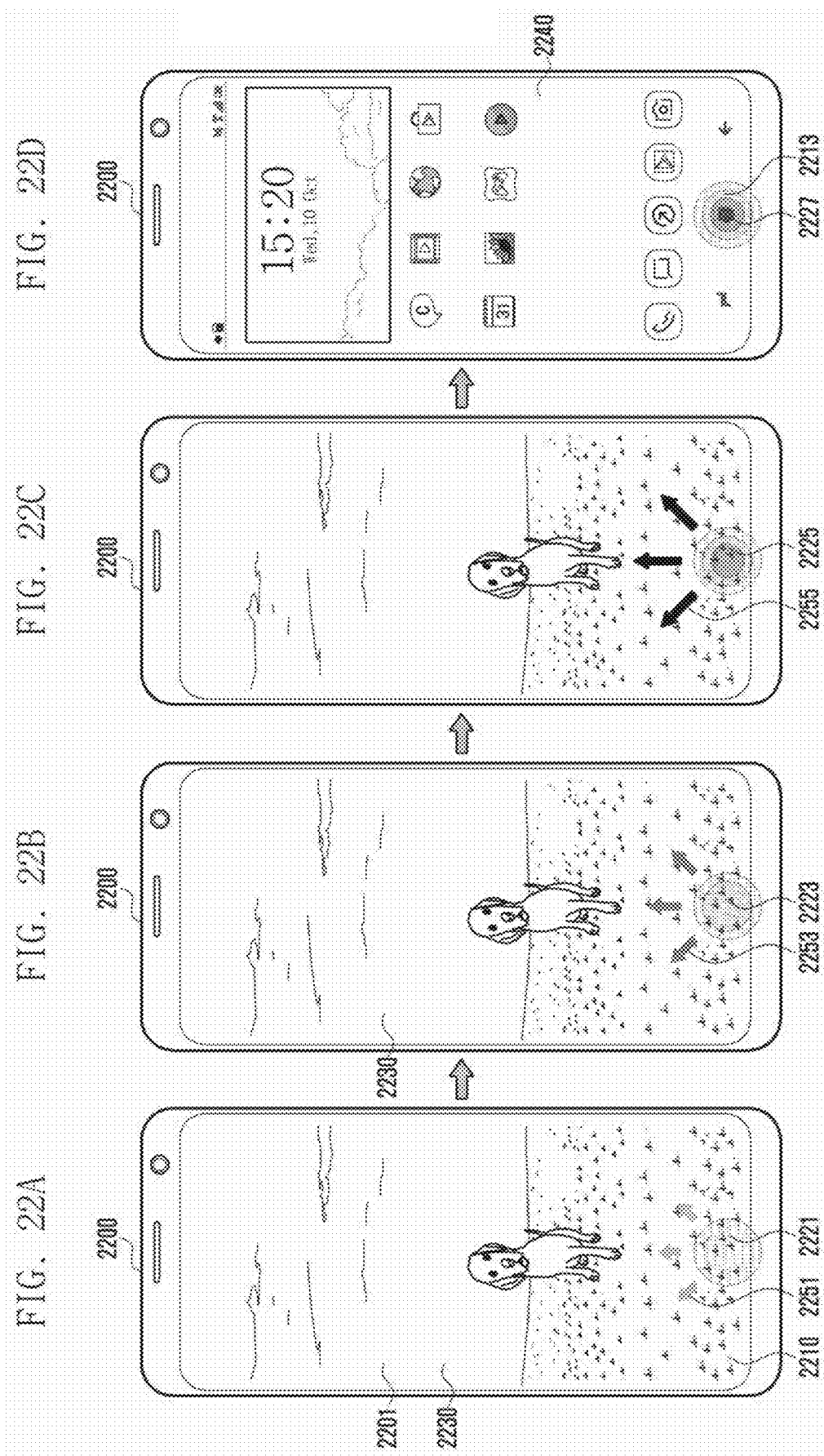

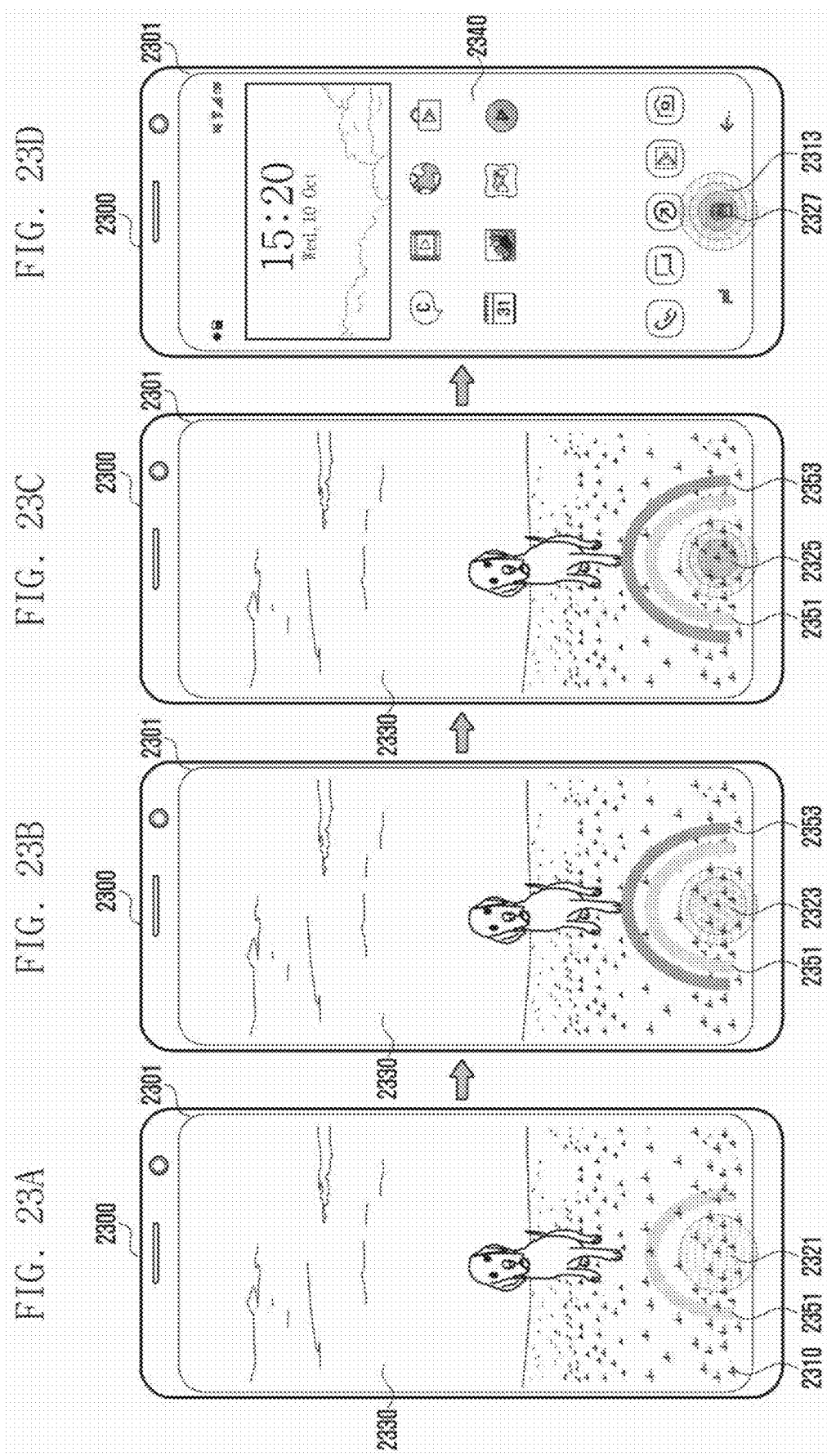

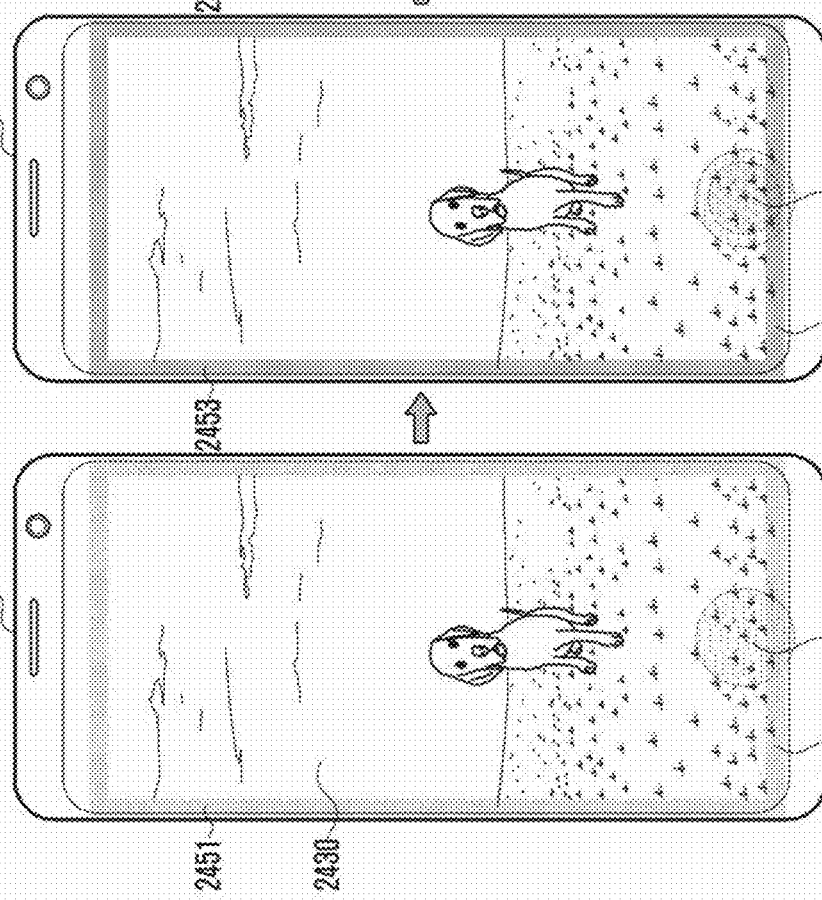

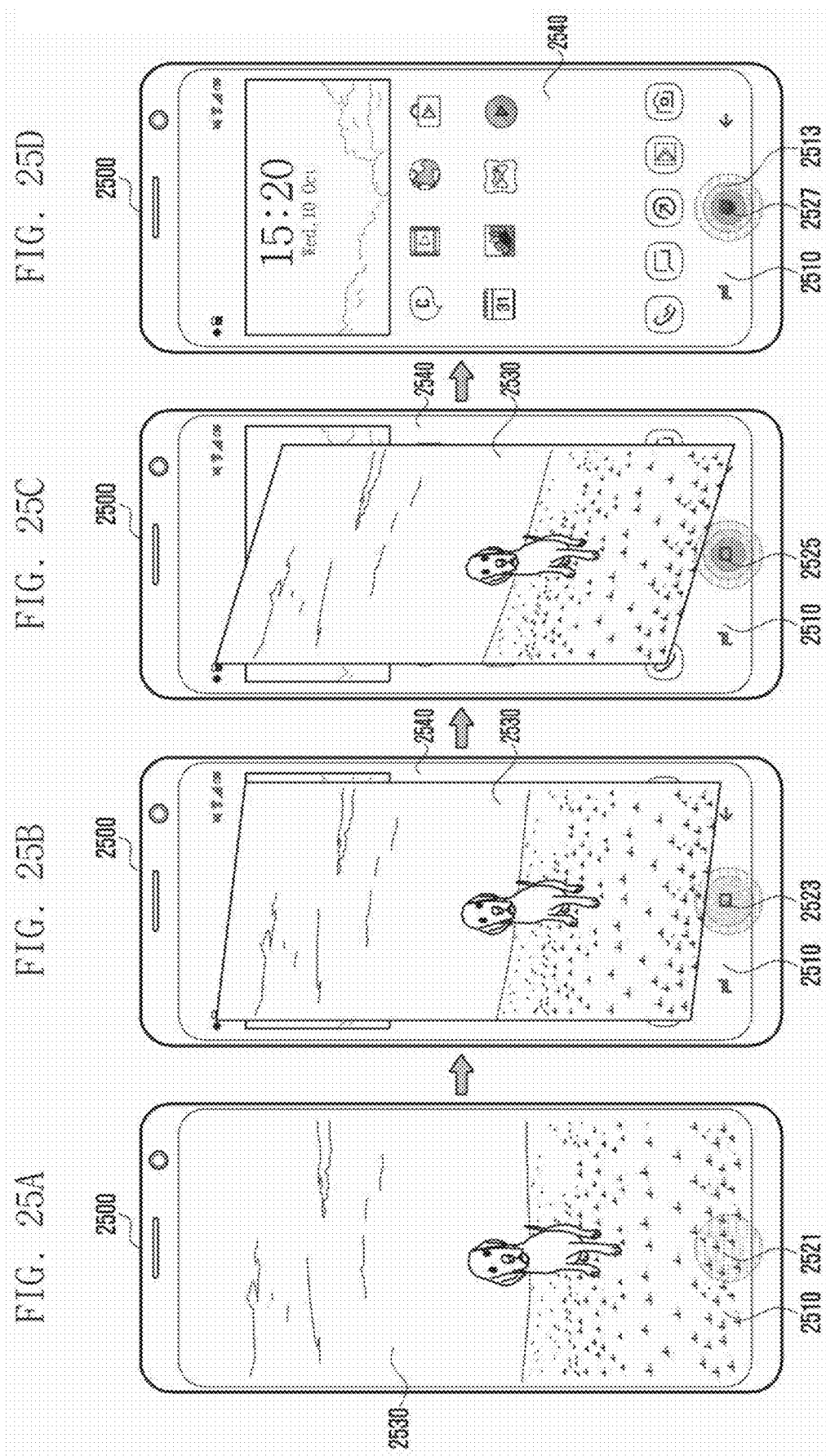

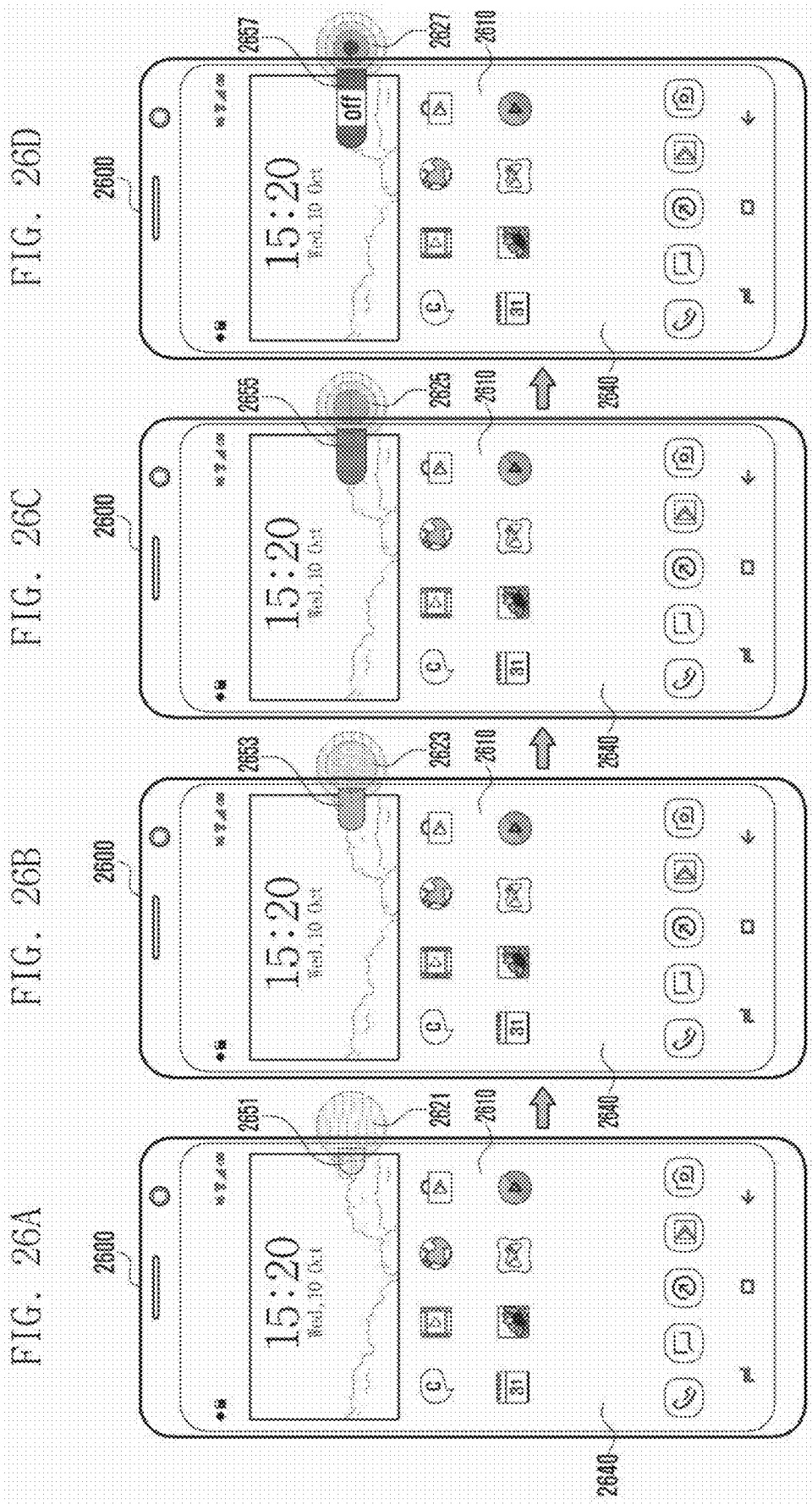

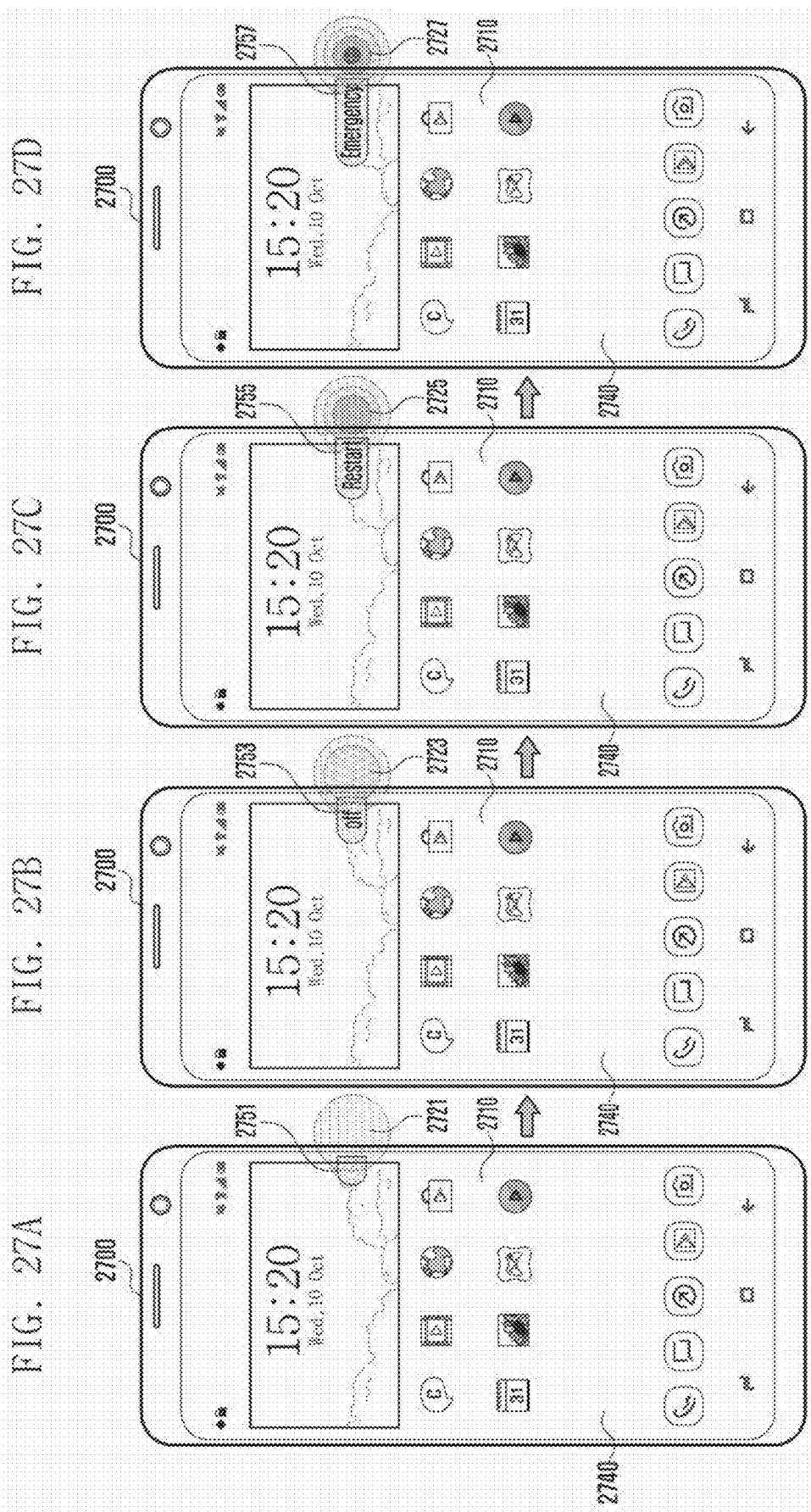

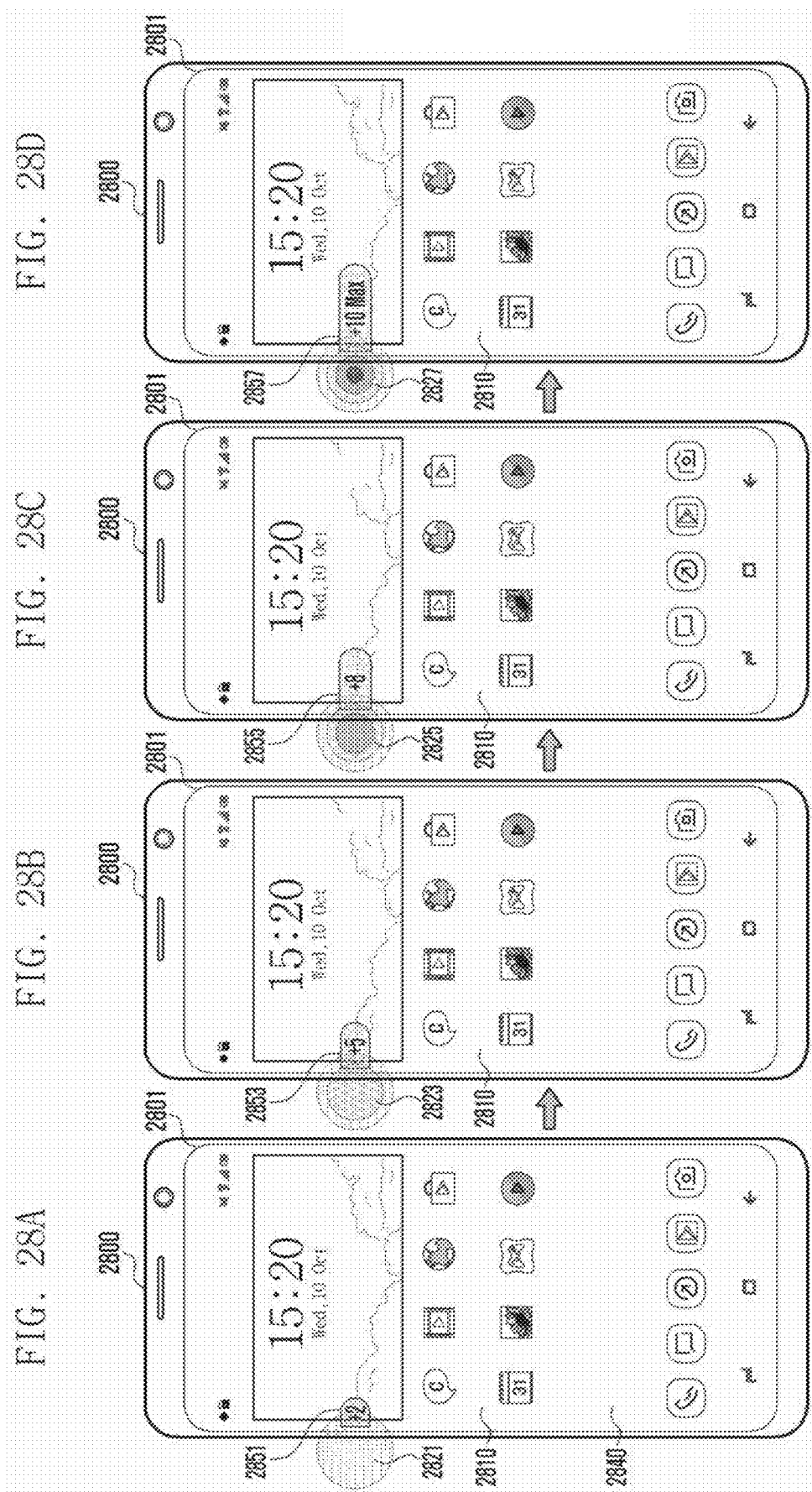

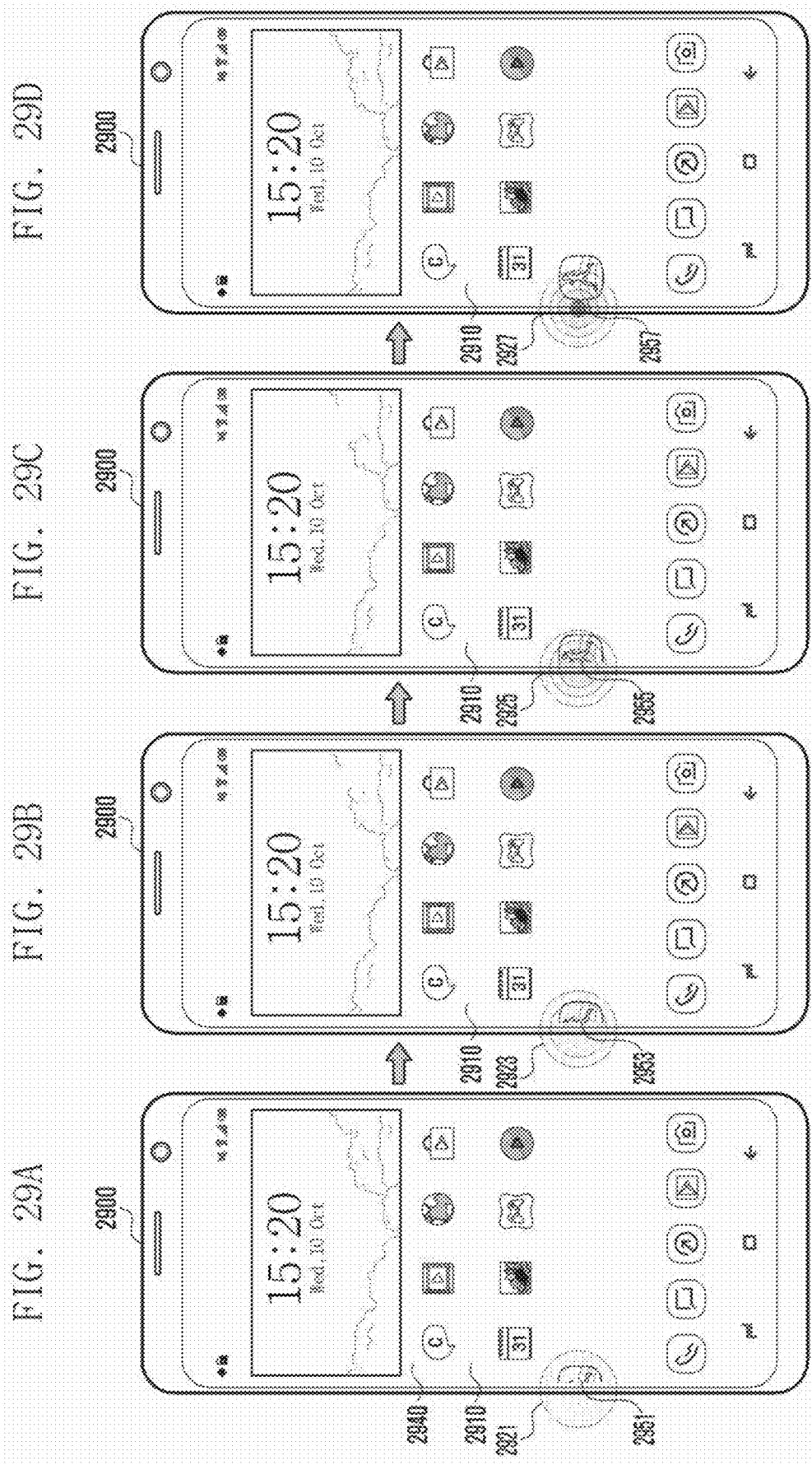

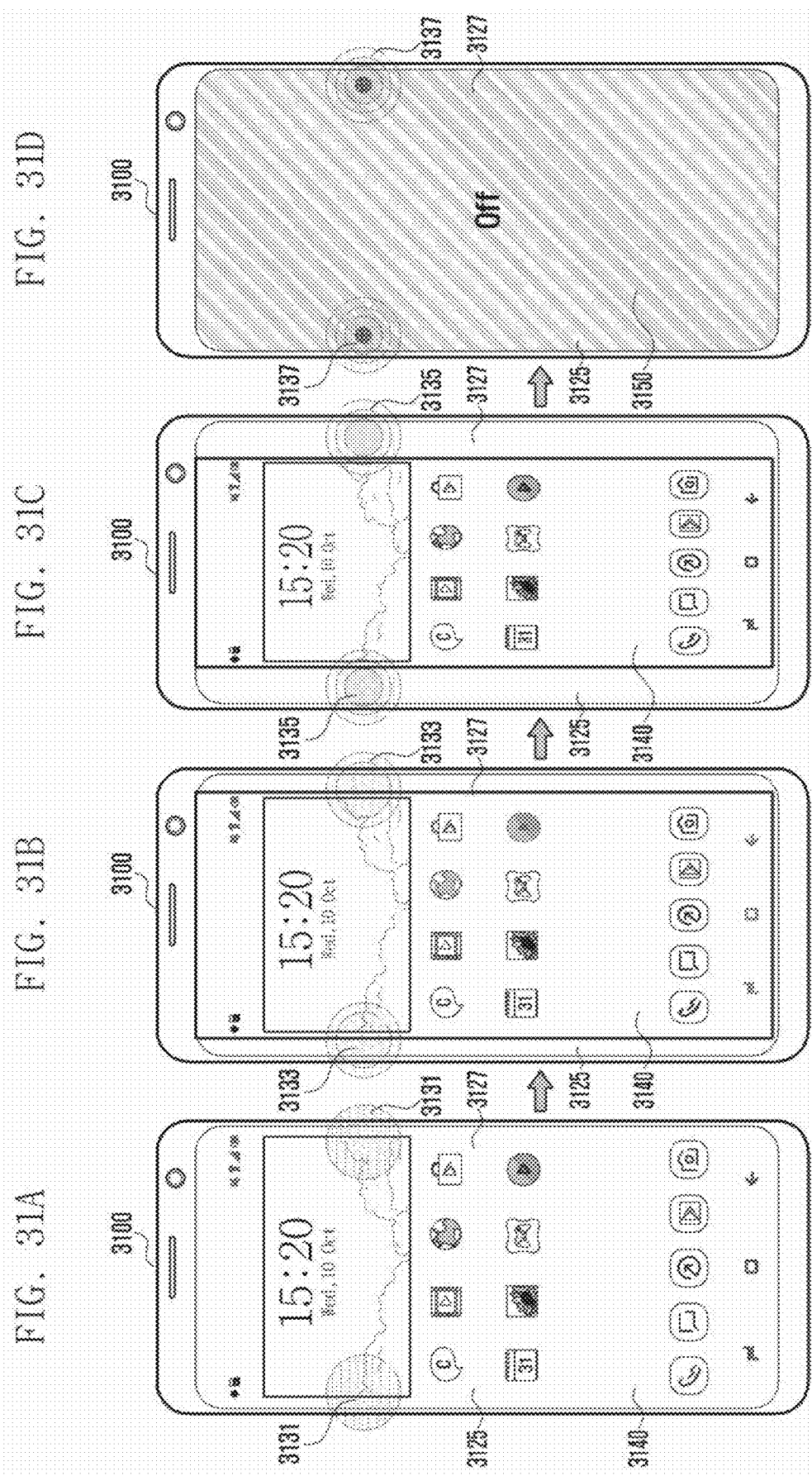

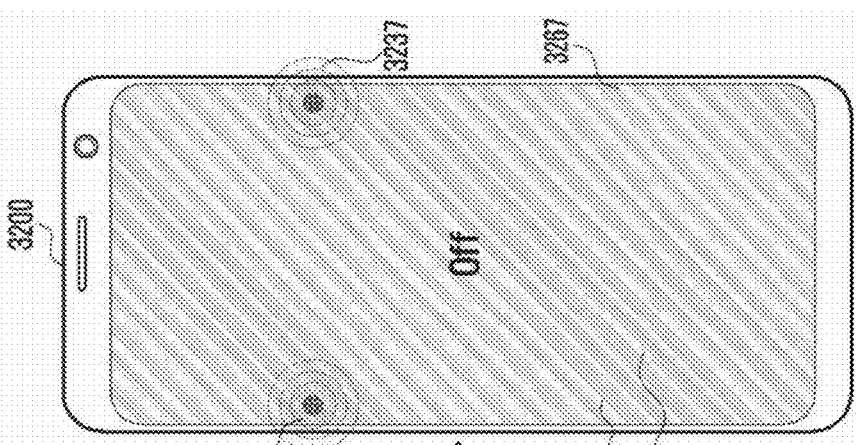
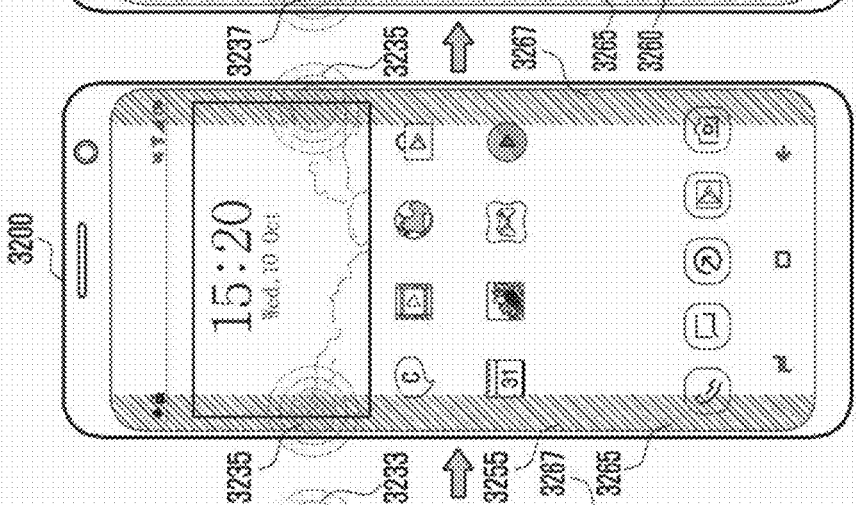
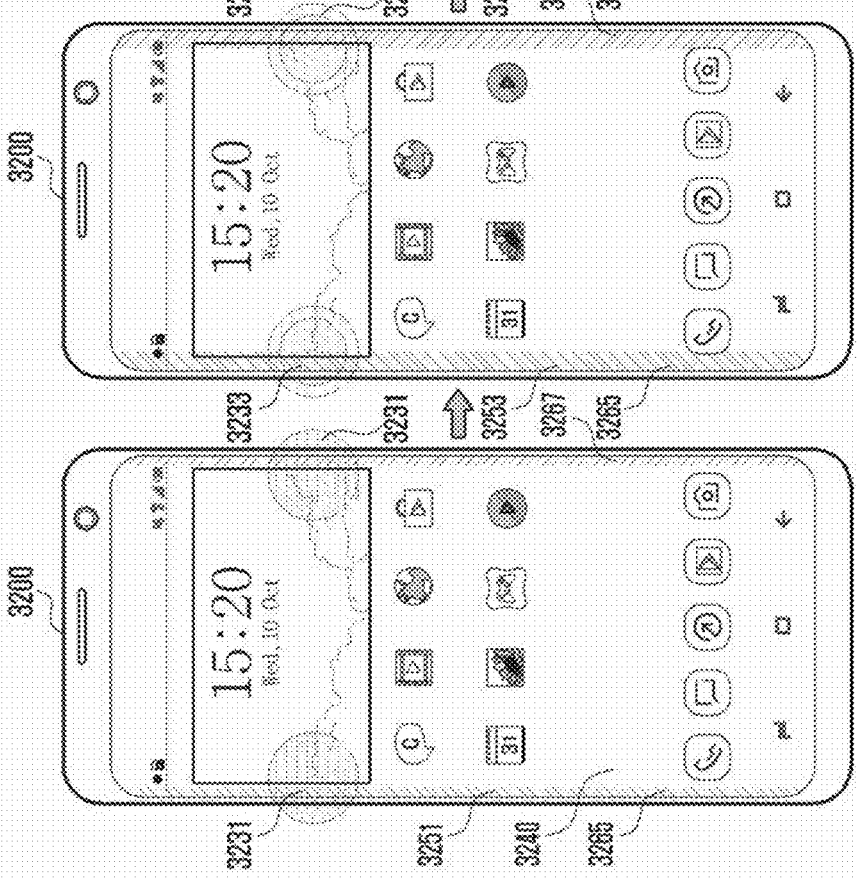
FIG. 32A  FIG. 32B  FIG. 32C  FIG. 32D

ELECTRONIC DEVICE AND METHOD OF CONTROLLING THE ELECTRONIC DEVICE BASED ON TOUCH INPUT

CROSS-REFERENCE TO RELATED APPLICATION(S)

This application is based on and claims priority under 35 U.S.C. § 119(a) of a Korean patent application number 10-2017-0053976, filed on Apr. 26, 2017, in the Korean Intellectual Property Office, the disclosure of which is incorporated by reference herein in its entirety.

TECHNICAL FIELD

The disclosure relates to a method of detecting a user's touch input and controlling an electronic device based on the detected touch input.

BACKGROUND

With the development of electronic technology, various types of electronic devices are being developed and spread. Nowadays, portable electronic devices with various functions, such as a smart phone and a tablet personal computer (PC) have been widely used. In order to support various functions, the portable electronic device has used detection of intensity of a touch input as a new input means. For example, the electronic device may provide a function related to an application in response to a touch input.

The electronic devices are in a trend having a gradually large display screen, and in recent years, technology of enlarging a screen area of the display to an entire front surface of the electronic device and replacing an existing physical button has been developed.

By enlarging a screen area of the display to an entire front surface of the electronic device, an electronic device including no physical button may perform a function related to an application based on a touch input or may perform a generic function (e.g., a home button input, volume control, or power off) related thereto.

However, when the electronic device performs a function in response to the touch input, among a function related to an application and a generic function related to the electronic device, a reference of a function to perform is not clear; thus, the electronic device may perform an operation different from that of a user intention and user convenience may be thus deteriorated.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method for performing an action associated with a designated function or application based on a touch detection area and a touch pressure.

In accordance with an aspect of the disclosure, an electronic device is provided. The electronic device includes a housing including a first plate and a second plate facing away from the first plate, a touchscreen display positioned inside the housing and exposed through a portion of the first plate, a pressure sensing circuit interposed between the first plate and the second plate, and configured to detect a pressure exerted onto at least a portion of the display by an external force, a wireless communication circuit positioned inside the housing, at least one processor positioned inside the housing, and electrically connected to the display, the pressure sensing circuit, and the communication circuit, and a memory positioned inside the housing and electrically connected to the processor, wherein the memory is configured to store an application program including a user interface, and stores instructions that, when executed, cause the processor to display the user interface through the display, detect a first touch input with a pressure lower than a first threshold via a first region of the display, perform a first action associated with the application program in response to the first touch input, detect a second touch input with a pressure lower than a second threshold via a second region of the display, wherein the second region abuts a periphery of the display, perform a second action associated with the application program in response to the second touch input, detect a third touch input with a pressure greater than the first threshold via the first region of the display, perform a third action associated with the application program in response to the third touch input, detect a fourth touch input with a pressure greater than the second threshold via the second region, and perform a generic fourth action associated with the electronic device in response to the fourth touch input.

In accordance with another aspect of the disclosure, a method of controlling an electronic device is provided. The method includes displaying a user interface through a touchscreen display, detecting a first touch input with a pressure lower than a first threshold via a first region of the display and performing a first action associated with an application program in response to the first touch input, detecting a second touch input with a pressure lower than a second threshold via a second region of the display adjacent to a periphery of the display and performing a second action associated with the application program in response to the second touch input, detecting a third touch input with a pressure greater than the first threshold via the first region of the display and performing a third action associated with the application program in response to the third touch input, and detecting a fourth touch input with a pressure greater than the second threshold via the second region and performing a generic fourth action associated with the electronic device in response to the fourth touch input.

In accordance with another aspect of the disclosure, a non-transitory recording medium is provided. The non-transitory recording medium includes a program for controlling an operation of an electronic device is recorded, wherein the program is configured to enable to display a user interface through a touchscreen display, detect a first touch input with a pressure lower than a first threshold via a first region of the display, perform a first action associated with an application program in response to the first touch input, detect a second touch input with a pressure lower than a second threshold via a second region of the display adjacent to a periphery of the display, perform a second action associated with the application program in response to the second touch input, detect a third touch input with a pressure greater than the first threshold via the first region of the display, perform a third action associated with the application program in response to the third touch input, detect a fourth touch input with a pressure greater than the second threshold via the second region, and perform a generic fourth action associated with the electronic device in response to the fourth touch input.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of the disclosure will be more apparent from the following detailed description in conjunction with the accompanying drawings, in which:

FIG. 6 is a flowchart illustrating an operation of an electronic device according to various embodiments of the disclosure;

FIG. 7 is a flowchart illustrating an operation of an electronic device according to various embodiments of the disclosure;

FIGS. 11A and 11B are diagrams illustrating an operation of an electronic device when the electronic device detects a touch pressure in a second sub-region of a second region of a display according to an embodiment of the disclosure;

FIGS. 12A and 12B are diagrams illustrating an operation of an electronic device when the electronic device detects a touch pressure in a third sub-region of a second region of a display according to an embodiment of the disclosure;

FIGS. 16A, 16B, and 16C are diagrams illustrating a disposition area of a function button set to perform a generic operation related to an electronic device when the electronic device is rotated according to an embodiment of the disclosure;

FIGS. 17A, 17B, and 17C are diagrams illustrating a disposition area of a function button set to perform a generic operation related to an electronic device when the electronic device is rotated according to an embodiment of the disclosure;

FIGS. 18A, 18B, and 18C are diagrams illustrating another example of a disposition area of a function button set to perform a generic operation related to an electronic device when the electronic device is rotated according to an embodiment of the disclosure;

FIGS. 20A, 20B, 20C, and 20D are diagrams illustrating visual feedback providing when an electronic device detects a touch pressure in a first sub-region of a second region of a display according to an embodiment of the disclosure;

FIGS. 21A, 21B, 21C, and 21D are diagrams illustrating another visual feedback providing when an electronic device detects a touch pressure in a first sub-region of a second region of a display according to an embodiment of the disclosure;

FIGS. 22A, 22B, 22C, and 22D are diagrams illustrating another visual feedback providing when an electronic device detects a touch pressure in a first sub-region of a second region of a display according to an embodiment of the disclosure;

FIGS. 23A, 23B, 23C, and 23D are diagrams illustrating another visual feedback providing when an electronic device detects a touch pressure in a first sub-region of a second region of a display according to an embodiment of the disclosure;

FIGS. 24A, 24B, 24C, and 24D are diagrams illustrating another visual feedback providing when an electronic device detects a touch pressure in a first sub-region of a second region of a display according to an embodiment of the disclosure;

FIGS. 25A, 25B, 25C, and 25D are diagrams illustrating another visual feedback providing when an electronic device detects a touch pressure in a first sub-region of a second region of a display according to an embodiment of the disclosure;

FIGS. 26A, 26B, 26C, and 26D are diagrams illustrating visual feedback providing when an electronic device detects a touch pressure in a fourth sub-region of a second region of a display according to an embodiment of the disclosure;

FIGS. 27A, 27B, 27C, and 27D are diagrams illustrating another visual feedback providing when an electronic device detects a touch pressure in a fourth sub-region of a second region of a display according to an embodiment of the disclosure;

FIGS. 28A, 28B, 28C, and 28D are diagrams illustrating visual feedback providing when an electronic device detects a touch pressure in a third sub-region of a second region of a display according to an embodiment of the disclosure;

FIGS. 29A, 29B, 29C, and 29D are diagrams illustrating another visual feedback providing when an electronic device detects a touch pressure in a third sub-region of a second region of a display according to an embodiment of the disclosure;

FIGS. 31A, 31B, 31C, and 31D are diagrams illustrating an operation and visual feedback providing when an electronic device simultaneously detects a touch pressure in a third sub-region and a fourth sub-region of a second region of a display according to an embodiment of the disclosure;

FIGS. 32A, 32B, 32C, and 32D are diagrams illustrating an operation and visual feedback providing when an electronic device simultaneously detects a touch pressure in a third sub-region and a fourth sub-region of a second region of a display according to an embodiment of the disclosure;

Throughout the drawings, like reference numerals will be understood to refer to like parts, components, and structures.

DETAILED DESCRIPTION

Figure 1:
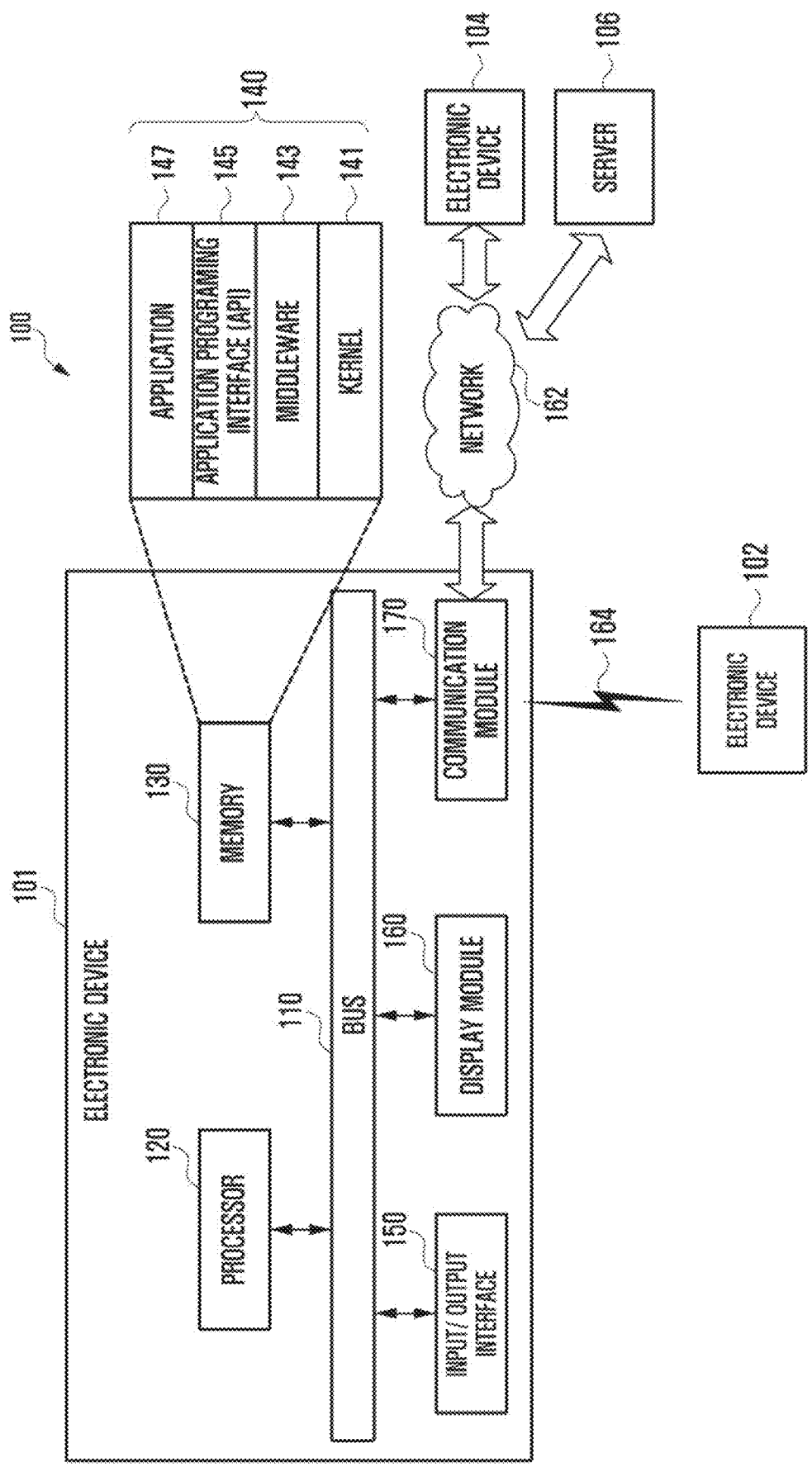
FIG. 1 is a block diagram illustrating an electronic device in a network environment according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the dictionary meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the disclosure, the expression "and/or" includes any and all combinations of the associated listed words. For example, the expression "A and/or B" may include A, may include B, or may include both A and B.

In the disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the disclosure.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween. The terms used in the disclosure are only used to describe specific various embodiments, and are not intended to limit the disclosure. As used herein, the singular forms are intended to include the plural forms as well, unless the context clearly indicates otherwise. Singular forms are intended to include plural forms unless the context clearly indicates otherwise.

An electronic device according to the disclosure may be a device including a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a Television (TV), a digital versatile disc (DVD) player, an audio device, various medical devices (for example, magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the disclosure is not limited to the aforementioned devices.

FIG. 1 is a block diagram illustrating a configuration of an electronic device according to an embodiment of the disclosure.

Referring to FIG. 1, the electronic device 101 may include a bus 110, a processor 120, a memory 130, an input/output interface 150, a display 160 and a communication interface 170, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, input/output interface 150, the display 160, the communication interface 170, etc.) through the bus 110, may interpret the received commands, and may execute calculation or data processing according to the interpreted commands. The processor 120 may include a microprocessor or any suitable type of processing circuitry, such as one or more general-purpose processors (e.g., advanced reduced instruction set computer (RISC) machines (ARM)-based processors), a digital signal processor (DSP), a programmable logic device (PLD), an application-specific integrated circuit (ASIC), a field-programmable gate array (FPGA), a graphical processing unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and operations provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure.

The memory 130 may store commands or data received from the processor 120 or other elements (e.g., the input/output interface 150, a display 160 and a communication interface 170, etc.) or generated by the processor 120 or the other elements. The memory 130 may include programming modules 140, such as a kernel 141, middleware 143, an application programming interface (API) 145, an application 147, and the like. Each of the above-described programming modules 140 may be implemented in software, firmware, hardware, or a combination of two or more thereof.

The kernel 141 may control or manage system resources (e.g., the bus 110, the processor 120, the memory 130, and/or other hardware and software resources) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The input/output interface 150, for example, may receive a command or data as input from a user, and may deliver the received command or data to the processor 120 or the memory 130 through the bus 110. The display 160 may display a video, an image, data, or the like to the user.

The communication interface 170 may connect communication between another electronic device 102 and the electronic device 101. The communication interface 170 may support a predetermined short-range communication protocol 164 (e.g., Wi-Fi, BlueTooth (BT), and near field communication (NFC)), or predetermined network 162 (e.g., the Internet, a local area network (LAN), a wide area network (WAN), a telecommunication network, a cellular network, a satellite network, a plain old telephone service (POTS), or the like). Each of the electronic devices 102 and 104 may be a device which is identical (e.g., of an identical type) to or different (e.g., of a different type) from the electronic device 101. Further, the communication interface 170 may connect communication between a server 106 and the electronic device 101 via the network 162.

Figure 2:
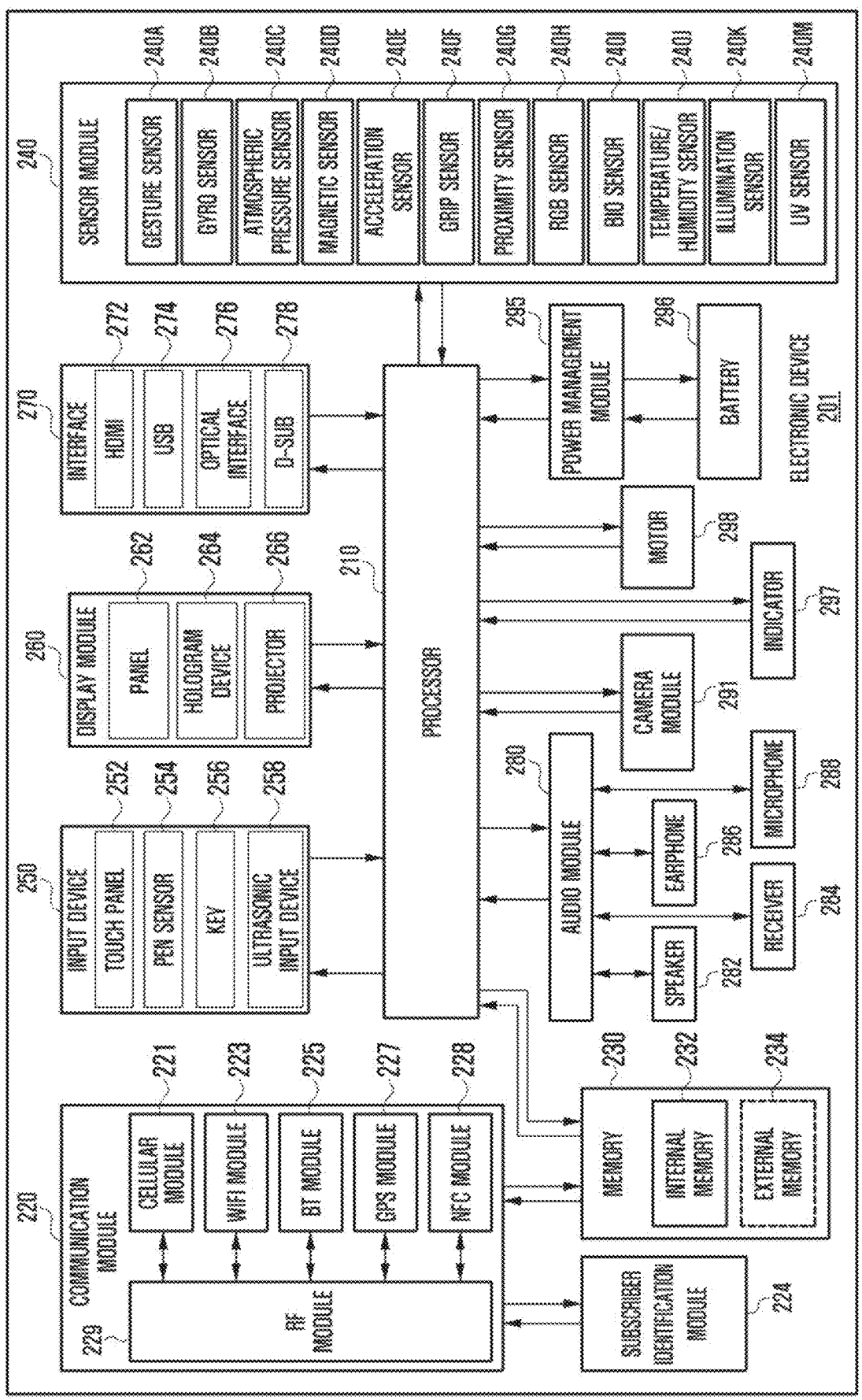
FIG. 2 is a block diagram illustrating a configuration of an electronic device according to various embodiments of the disclosure.

FIG. 2 is a block diagram illustrating a configuration of an electronic device 201 according to an embodiment of the disclosure.

The hardware shown in FIG. 2 may be, for example, the electronic device 101 illustrated in FIG. 1.

Referring to FIG. 2, the electronic device may include one or more application processors (APs) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, a motor 298 and any other similar and/or suitable components.

The AP 210 (e.g., the processor 120) may include one or more APs, or one or more communication processors (CPs). The AP 210 may be, for example, the processor 120 illustrated in FIG. 1. The AP 210 is illustrated as being included in the AP 210 in FIG. 2, but may be included in different integrated circuit (IC) packages, respectively. According to an embodiment of the disclosure, the AP 210 may be included in one IC package.

The AP 210 may execute an operating system (OS) or an application program, and thereby may control multiple hardware or software elements connected to the AP 210 and may perform processing of and arithmetic operations on various data including multimedia data. The AP 210 may be implemented by, for example, a system on chip (SoC). According to an embodiment of the disclosure, the AP 210 may further include a GPU (not illustrated).

The AP 210 may manage a data line and may convert a communication protocol in the case of communication between the electronic device (e.g., the electronic device 101) including the hardware and different electronic devices connected to the electronic device through the network. The AP 210 may be implemented by, for example, a SoC. According to an embodiment of the disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 210, the power management module 295, the memory 230, and the like are illustrated as elements separate from the AP 210. However, according to an embodiment of the disclosure, the AP 210 may include at least some (e.g., the CP) of the above-described elements.

According to an embodiment of the disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 101. The SIM card 224 may include unique identification information (e.g., integrated circuit card IDentifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a Not AND (NAND) flash memory, a not OR (NOR) flash memory, etc.). According to an embodiment of the disclosure, the internal memory 232 may be in the form of a solid state drive (SSD). The external memory 234 may further include a flash drive, for example, a compact flash (CF), a secure digital (SD), a micro-secure digital (Micro-SD), a mini-secure digital (Mini-SD), an extreme Digital (xD), a memory stick, or the like.

The communication module 220 may include a cellular module 221, a Wi-Fi module 223 or a radio frequency (RF) module 229. The communication module 220 may be, for example, the communication interface 170 illustrated in FIG. 1. The communication module 220 may include, for example, a Wi-Fi module 223, a BT module 225, a GPS module 227, or a NFC module 228. For example, the Wi-Fi module 223 may provide a Wi-Fi communication function by using a RF. Additionally or alternatively, the Wi-Fi module 223 may include a network interface (e.g., a LAN card), a modulator/demodulator (modem), or the like for connecting the hardware to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF module 229 may include, for example, a transceiver, a power amplifier module (PAM), a frequency filter, a low noise amplifier (LNA), or the like. Also, the RF module 229 may further include a component for transmitting and receiving electromagnetic waves in a free space in a Wi-Fi communication, for example, a conductor, a conductive wire, or the like.

The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illumination sensor 240K, and a ultra violet (UV) sensor 240M. The sensor module 240 may measure a physical quantity or may sense an operating state of the electronic device 101, and may convert the measured or sensed information to an electrical signal. Additionally/alternatively, the sensor module 240 may include, for example, an E-nose sensor (not illustrated), an electromyography (EMG) sensor (not illustrated), an electro encephalogram (EEG) sensor (not illustrated), an electrocardiogram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include a touch panel 252, a pen sensor 254 (e.g., a digital pen sensor), keys 256, and an ultrasonic input unit 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of Wi-Fi recognition. According to an embodiment of the disclosure, the hardware may receive a user input from an external device (e.g., a network, a computer, or a server), which is connected to the communication module 220, through the communication module 220.

The display 260 may include a panel 262, a hologram device 264, or projector 266. The display 260 may be, for example, the display 160 illustrated in FIG. 1. The panel 262 may be, for example, a liquid crystal display (LCD) and an active matrix organic light emitting diode (AM-OLED) display, and the like. The panel 262 may be implemented so as to be, for example, flexible, transparent, or wearable. The panel 262 may include the touch panel 252 and one module. The hologram device 264 may display a three-dimensional image in the air by using interference of light. According to an embodiment of the disclosure, the display 260 may further include a control circuit for controlling the panel 262 or the hologram device 264.

The interface 270 may include, for example, a high-definition multimedia interface (HDMI) 272, a universal Serial bus (USB) 274, an optical interface 276, and a D-subminiature (D-sub) 278. Additionally or alternatively, the interface 270 may include, for example, SD/multi-media card (MMC) (not illustrated) or infrared data association (IrDA) (not illustrated).

The audio module 280 may bi-directionally convert between a voice and an electrical signal. The audio module 280 may convert voice information, which is input to or output from the audio module 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an image signal processor (ISP) (not illustrated), and a flash LED (not illustrated).

The power management module 295 may manage power of the hardware. Although not illustrated, the power management module 295 may include, for example, a power management integrated circuit (PMIC), a charger IC, or a battery fuel gauge.

The PMIC may be mounted to, for example, an IC or a SoC semiconductor. Charging methods may be classified into a wired charging method and a Wi-Fi charging method. The charger IC may charge a battery, and may prevent an overvoltage or an overcurrent from a charger to the battery. According to an embodiment of the disclosure, the charger IC may include a charger IC for at least one of the wired charging method and the Wi-Fi charging method. Examples of the Wi-Fi charging method may include a magnetic resonance method, a magnetic induction method, an electromagnetic method, and the like. Additional circuits (e.g., a coil loop, a resonance circuit, a rectifier, etc.) for Wi-Fi charging may be added in order to perform the Wi-Fi charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware or a part (e.g., the AP 210) of the hardware, for example, a booting state, a message state, a charging state and the like. The motor 298 may convert an electrical signal into a mechanical vibration. The AP 210 may control the sensor module 240.

Although not illustrated, the hardware may include a processing unit (e.g., a GPU) for supporting a module TV. The processing unit for supporting a module TV may process media data according to standards such as, for example, digital multimedia broadcasting (DMB), digital video broadcasting (DVB), media flow, and the like. Each of the above-described elements of the hardware according to an embodiment of the disclosure may include one or more components, and the name of the relevant element may change depending on the type of electronic device. The hardware according to an embodiment of the disclosure may include at least one of the above-described elements. Some of the above-described elements may be omitted from the hardware, or the hardware may further include additional elements. Also, some of the elements of the hardware according to an embodiment of the disclosure may be combined into one entity, which may perform functions identical to those of the relevant elements before the combination.

The term "module" used in the disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the disclosure may include at least one of an ASIC chip, a FPGA, and a programmable-logic device for performing certain operations which have been known or are to be developed in the future.

Figure 3:
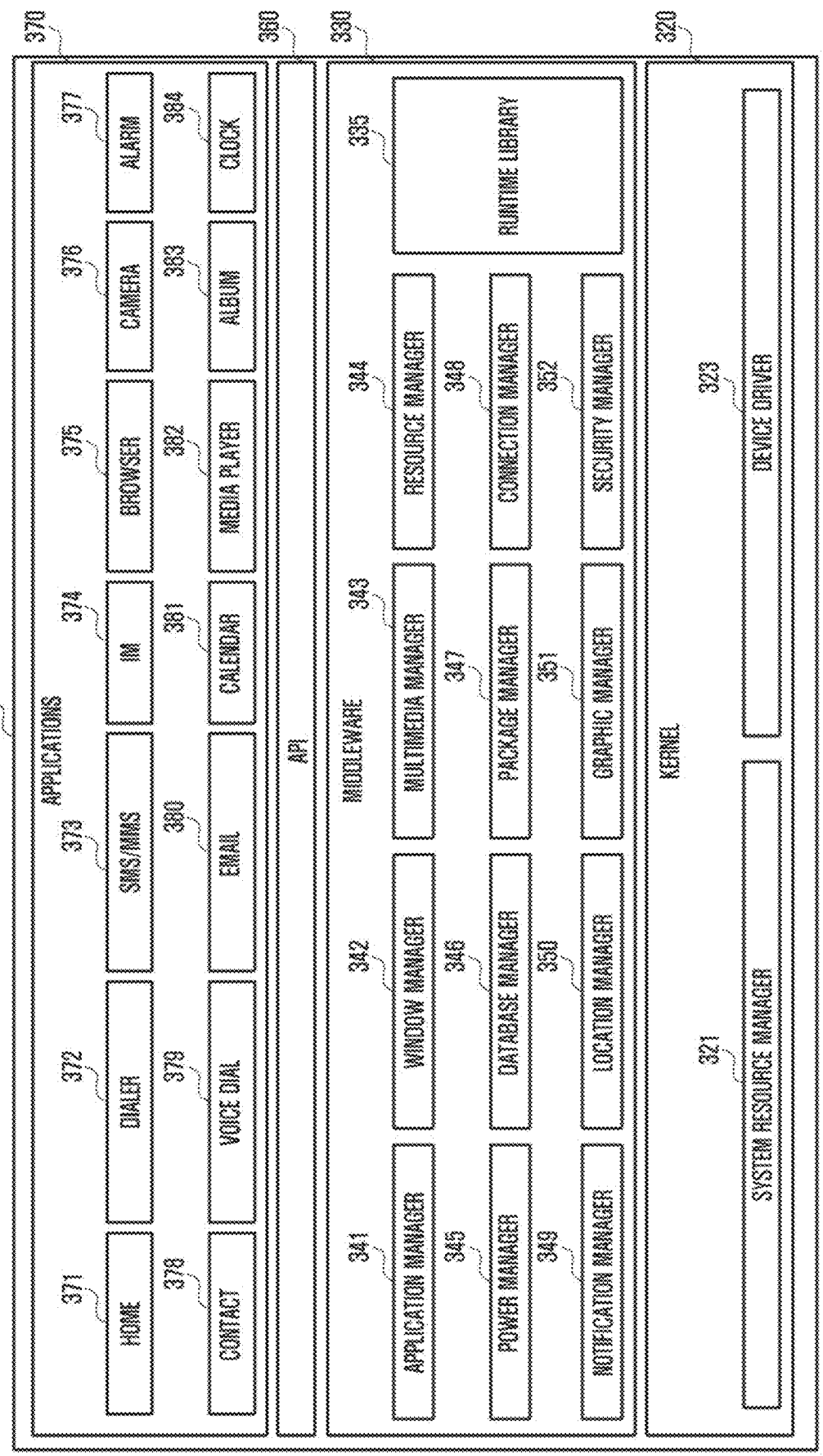
FIG. 3 is a block diagram illustrating a configuration of a program module according to various embodiments of the disclosure.

FIG. 3 is a block diagram illustrating a configuration of one or more programming modules 300 according to an embodiment of the disclosure.

Referring to FIG. 3, the programming module 300 may be included (or stored) in the electronic device 101 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware (e.g., the hardware), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 141) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the disclosure, the device driver 312 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a Wi-Fi connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more APs 210), the one or more processors may perform functions corresponding to the instructions. The non-transitory computer-readable storage medium may be, for example, the memory 230. At least a part of the programming module 300 may be implemented (e.g., executed) by, for example, the one or more APs 210. At least a part of the programming module 300 may include, for example, a module, a program, a routine, a set of instructions, and/or a process for performing one or more functions.

Names of the elements of the programming module (e.g., the programming module 300) according to an embodiment of the disclosure may change depending on the type of OS. The programming module according to an embodiment of the disclosure may include one or more of the above-described elements. Alternatively, some of the above-described elements may be omitted from the programming module. Alternatively, the programming module may further include additional elements. The operations performed by the programming module or other elements according to an embodiment of the disclosure may be processed in a sequential method, a parallel method, a repetitive method, or a heuristic method. Also, some of the operations may be omitted, or other operations may be added to the operations.

An electronic device according to various embodiments of the disclosure includes a housing including a first plate and a second plate facing away from the first plate; a touchscreen display (e.g., 453) positioned inside the housing and exposed through a portion of the first plate; a pressure sensing circuit (e.g., 431, 433) interposed between the first plate and the second plate, and configured to detect a pressure exerted onto at least a portion of the display 453 by an external force; a wireless communication circuit positioned inside the housing; at least one processor positioned inside the housing, and electrically connected to the display 453, the pressure sensing circuits 431 and 433, and the communication circuit 220; and a memory positioned inside the housing and electrically connected to the processor 410, wherein the memory 440 is configured to store an application program 519 including a user interface, and stores instructions that, when executed, cause the processor 410 to: display the user interface through the display 453; detect a first touch input with a pressure lower than a first threshold via a first region 860 of the display 453, and perform a first action associated with the application program in response to the first touch input; detect a second touch input with a pressure lower than a second threshold via a second region 851 of the display 453, wherein the second region abuts a periphery of the display 453, and perform a second action associated with the application program 519 in response to the second touch input; detect a third touch input with a pressure greater than the first threshold via the first region of the display 453, and perform a third action associated with the application program 519 in response to the third touch input; and detect a fourth touch input with a pressure greater than the second threshold via the second region 851, and perform a generic fourth action associated with the electronic device in response to the fourth touch input. The second threshold may be substantially the same as the first threshold. The fourth action may include an action associated with a home button. The fourth action may include an action invoking an intelligent assistant program. The first region 860 may be adjacent to the center of the touchscreen display 453. The instructions enable the at least one processor 410 to: detect a fifth touch input with a pressure lower than a third threshold via a third region 853 of the touchscreen display 453 adjacent to a periphery of the touchscreen display 453 and positioned at the opposite side of the second region 851 and perform a fifth action associated with the application program 519 in response to the fifth touch input; and detect a sixth touch input with a pressure greater than a third threshold via the third region 853 and perform a sixth action of displaying at least one notification or status information related to the electronic device in response to the sixth touch input. The third threshold may be substantially the same as the first threshold or the second threshold. The instructions may enable the at least one processor 410 to: detect a seventh touch input with a pressure lower than a fourth threshold via a fourth region 855 of the display 453 adjacent to a periphery of the display 453 and adjacent to one side of the second region 851 and perform a seventh action associated with the application program 519 in response to the seventh touch input; and detect an eighth touch input with a pressure greater than the fourth threshold via the fourth region 855 and perform an eighth action of invoking an intelligent assistant program or adjusting a volume of a speaker in response to the eighth touch input. The fourth threshold may be substantially the same as the first threshold or the second threshold. The instructions enable the at least one processor 410 to: detect a ninth touch input with a pressure lower than a fifth threshold via a fifth area 857 of the display 453 adjacent to a periphery of the display 453 and adjacent to the other side of the second region 851 and perform a ninth action associated with the application program 519 in response to the ninth touch input; and detect a tenth touch input with a pressure greater than a fifth threshold via the fifth region 857 and perform a tenth action of activating a power off function or an emergency call function in response to the tenth touch input. The fifth threshold may be substantially the same as the first threshold or the second threshold. The tenth action may include an action associated with a menu including at least one specified icon.

A non-transitory recording medium in which a program is recorded for controlling an operation of an electronic device according to various embodiments of the disclosure, wherein the program is configured to enable to: display a user interface through a touchscreen display; detect a first touch input with a pressure lower than a first threshold via a first region (e.g., 860) of the touchscreen display 453 and perform a first action associated with the application program in response to the first touch input; detect a second touch input with a pressure lower than a second threshold via a second region of the touchscreen display 453 adjacent to a periphery of the touchscreen display 453 and perform a second action associated with the application program 519 in response to the second touch input; detect a third touch input with a pressure greater than the first threshold via a first region 860 of the touchscreen display 453 and perform a third action associated with the application program 519 in response to the third touch input; and detect a fourth touch input with a pressure greater than the second threshold via the second region 851 and perform a generic fourth action associated with the electronic device in response to the fourth touch input. The fourth action may include an action associated with a home button or an action of invoking an intelligent assistant program.

Figure 4:
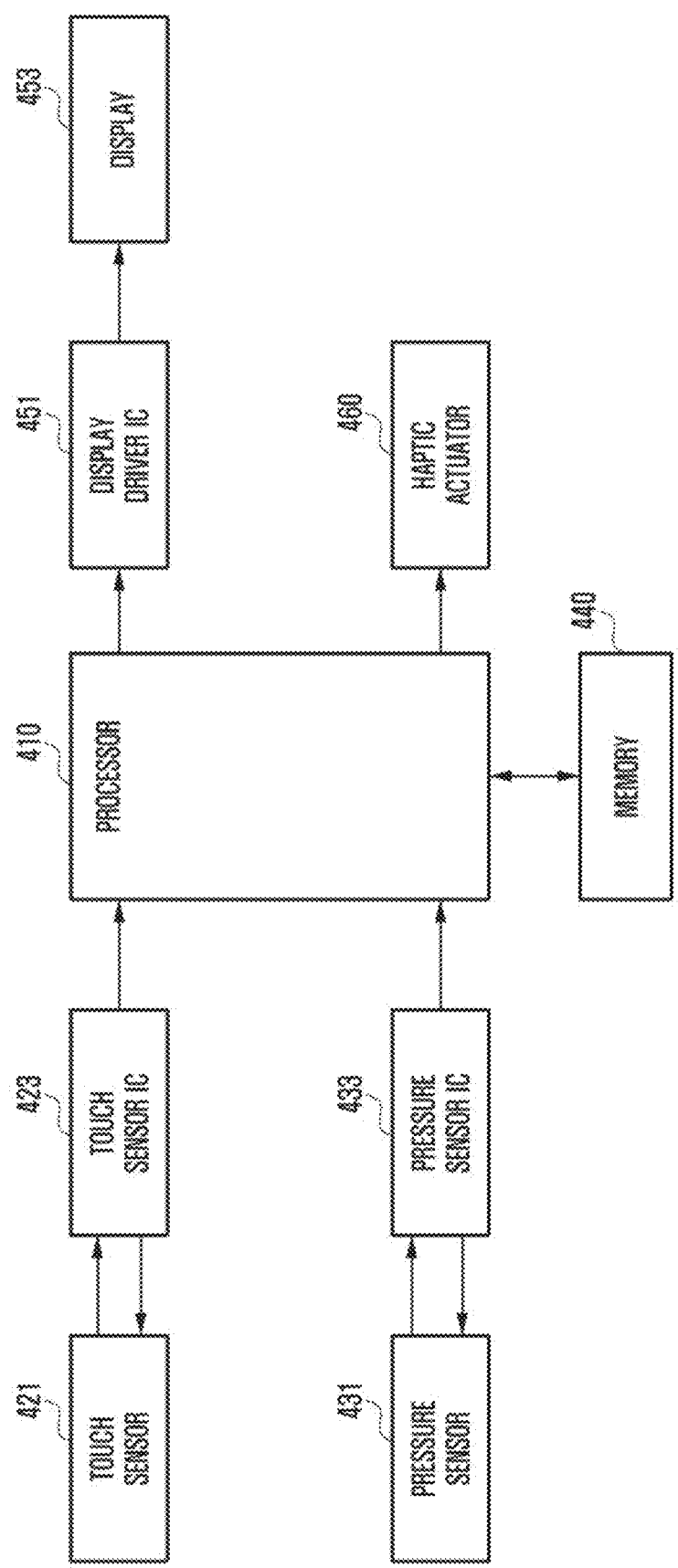
FIG. 4 is a block diagram illustrating a configuration of an electronic device according to various embodiments of the disclosure.

FIG. 4 is a block diagram illustrating a configuration of an electronic device according to various embodiments of the disclosure.

Referring to FIG. 4, the electronic device (e.g., electronic device 101) according to various embodiments may include a processor 410 (e.g., processor 120), memory 440 (e.g., memory 130), touch sensor 421 (e.g., touch sensor 252), touch sensor IC 423, pressure sensor 431, pressure sensor IC 433, display 453 (e.g., display 160), display driver IC 451, or haptic actuator 460.

The processor 410 may execute an application and control at least one constituent element of the electronic device based on the executed application. For example, the processor 410 may execute the application and control at least one of the memory 440, touch sensor 421, touch sensor IC 423, pressure sensor 431, pressure sensor IC 433, display 453, display driver IC 451, and haptic actuator 460 based on the executed application.

According to an embodiment, the processor 410 may set a user input area (a touch area, a pressure area, and so on) that may be recognized by the touch sensor IC 423 and/or the pressure sensor IC 433 and transfer the user input area (a touch area, a pressure area, and so on) to the touch sensor IC 423 or the pressure sensor IC 433. According to an embodiment, a position of the user input area may be changed. For example, the processor 410 may transfer a changed position of the user input region to the touch sensor IC 423 and/or the pressure sensor IC 433. According to an embodiment, the processor 410 may determine image information to transfer to the display driver IC 451, a position of the image information and/or haptic information to transfer to the haptic actuator 460. For example, if intensity of the received touch pressure is equal to or larger than a first threshold, the processor 410 may transfer first image information to the display driver IC 451 and transfer first haptic information to the haptic actuator 460. For example, if intensity of the received touch pressure is equal to or larger than a second threshold larger than the first threshold, the processor 410 may transfer second image information (e.g., image information in which at least portion of the first image information is enlarged) to the display driver IC 451 and transfer second haptic information (e.g., haptic information stronger than the first haptic information) to the haptic actuator 460. According to an embodiment, the processor 410 may map a first position and first pressure intensity of a touch input received at a first time and map a second position and second pressure intensity of a touch input received at a second time different from the first time. According to an embodiment, the processor 410 may transfer map information to each module (e.g., the memory 440, touch sensor 421, touch sensor IC 423, pressure sensor 431, pressure sensor IC 433, display 453, display drive IC, or haptic actuator 460) and may be converted to an inactive state. According to an embodiment, the processor 410 may be inactivated in an always on display (AOD) mode. For example, only when the processor 410 transfers and receives image information and/or a control signal or a detection signal to and from the display driver IC 451, the touch sensor IC 423, and the pressure sensor IC 433 while maintaining an inactive state in the AOD mode, the processor 410 may be activated, and when the transfer and reception operation is complete, the processor 410 may be converted to an inactive state. The AOD mode may be a state in which, for example, the display 453 may activate only at least a partial area under the control of the processor 410 to display specified information in the at least a partial area and in which configuration elements (e.g., the touch sensor 421, touch sensor IC 423, pressure sensor 431, pressure sensor IC 433, display 453, display driver IC, or haptic actuator 460) of the electronic device including the processor 410 operates in a low power mode for reducing power consumption.

The touch sensor IC 423 may transfer or receive a signal (transmission signal (TX), reception signal (RX), stimulus signal (shield), and so on) to and from the touch sensor 421. According to an embodiment, the touch sensor IC 423 may detect a user's touch input position based on the signal transferred and received to and from the touch sensor 421. According to an embodiment, the touch sensor IC 423 may transfer a position of the detected touch input to the processor 410. According to an embodiment, the touch sensor IC 423 may transfer and receive a signal to and from the touch sensor 421 only in a partial area of the touch sensor 421 pre-designated by the processor 410. Alternatively, the touch sensor IC 423 may transfer and receive a signal to and from the touch sensor 421 in an entire area of the touch sensor 421, but when the touch input position is positioned at a partial area of the touch sensor 421 pre-designated by the processor 410, the touch sensor IC 423 may transfer the touch input position to the processor 410, and when the touch input position is not positioned at a partial area of the touch sensor 421 pre-specified by the processor 410, the processor 410 may not transfer the touch input position to the processor 410. According to an embodiment, the touch sensor IC 423 may operate in a normal mode and/or a low power mode under the control of the processor 410. The low power mode may be an operation mode for reducing power consumption of the touch sensor 421 and the touch sensor IC 423, compared with, for example, the normal-mode. For example, in a low power mode, the touch sensor IC 423 may operate in a low touch sensing frequency and/or touch scan period, compared with a normal mode.

The pressure sensor IC 433 may transfer or receive a signal (transmission signal (TX), reception signal (RX), stimulus signal (shield), and so on) to and from the pressure sensor IC 433. According to an embodiment, the pressure sensor IC 433 may transfer intensity (pressure) of a detected touch input and/or a holding time of the pressure to the processor 410. According to an embodiment, the processor 410 or the pressure sensor IC 433 may determine intensity (pressure) of a user's touch input and/or a holding time of the pressure based on the signal received from the pressure sensor IC 433. According to an embodiment, the pressure sensor IC 433 may transfer and receive a signal to and from the pressure sensor IC 433 in only a partial area of the pressure sensor IC 433 pre-designated by the processor 410. Alternatively, the pressure sensor IC 433 may transfer and receive a signal to and from the pressure sensor IC 433 in an entire area of the pressure sensor IC 433, but when a pressure input position is positioned in a partial area of the pressure sensor IC 433 pre-designated by the processor 410, the pressure sensor IC 433 may transfer the pressure input position to the processor 410, and when the pressure input position is not positioned in a partial area of the pressure sensor IC 433 pre-designated by the processor 410, the pressure sensor IC 433 may not transfer the pressure input position to the processor 410. According to an embodiment, the pressure sensor IC 433 may operate in a normal mode and/or a low power mode. The low power mode may be an operation mode for reducing power consumption of the touch sensor 421 and the touch sensor IC 423, compared with, for example, the normal mode. For example, in the low power mode, the pressure sensor IC 433 may operate in a low pressure sensing frequency and/or pressure scan period, compared with the normal mode. According to an embodiment, the display 453 may be formed separately from the touch sensor 421 or the pressure sensor 431. Alternatively, the display 453 may include any one of the touch sensor 421 and the pressure sensor 431. According to any embodiment, the touch sensor 421 may be formed separately from the pressure sensor 431 or may be formed integrally with the pressure sensor 431.

The display driver IC 451 may transfer a drive signal (e.g., a driver drive signal and a gate driving signal) to the display 453 based on the image information received from the processor 410.

The memory 440 may store instructions or data for enabling the processor 410 to perform the above operations and include a volatile or non-volatile memory 440.

Figure 5:
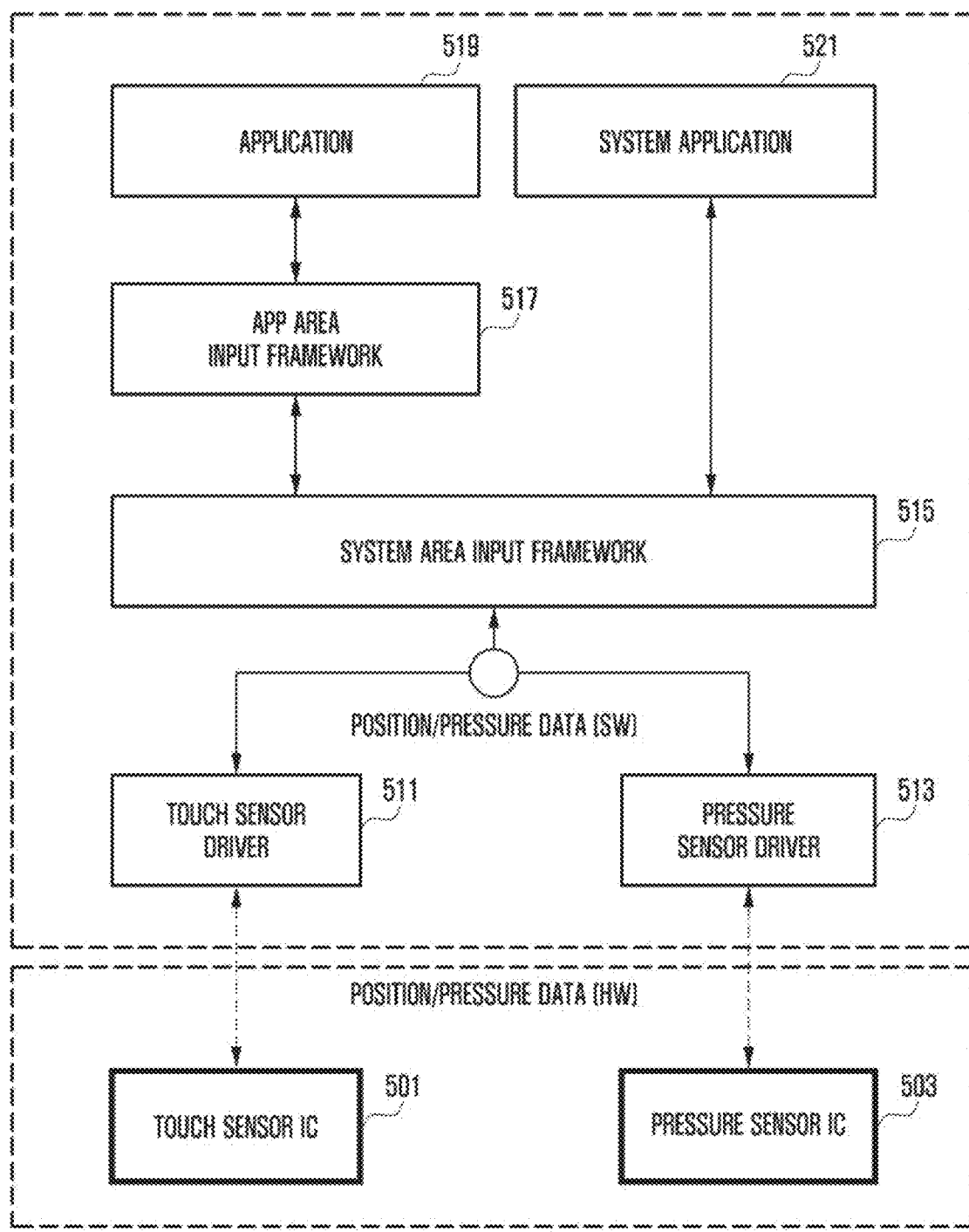
FIG. 5 is a block diagram illustrating a configuration of a program module of an electronic device according to various embodiments of the disclosure.

FIG. 5 is a block diagram illustrating a configuration of a program module of an electronic device according to various embodiments of the disclosure.

Referring to FIG. 5, the program module according to various embodiments may include an application 519, system application 521, application area input framework 517, system area input framework 515, touch sensor driver 511 (e.g., 323), or pressure sensor driver 513 (e.g., 323). According to any embodiment, the touch sensor driver 511 and the pressure sensor driver 513 may be separately formed or may be combined into a single driver. The program module according to various embodiments may be instructions/codes at least temporarily resided in the processor 410 or a storage that stores instructions/codes as a code or a set of instructions stored at the memory 440. According to an embodiment, the system area may include a designated area in which buttons for performing a generic function (e.g., a home button input, volume control, or power off) related to the electronic device are positioned. According to an embodiment, the system application 521 may include at least one application related to a generic function (e.g., a home button input, volume control, or power off) related to the electronic device. For example, the system application 521 may be an application set to perform functions of conversion to a home screen, volume control, or power off in response to a touch input to a designated button related to the system area in a state in which a specific application is executed.

According to an embodiment, the touch sensor driver 511 may determine a signal input received from a touch sensor IC 501 (e.g., the touch sensor IC 423), determine data including a coordinate value of the touch input based on the input signal, and transfer the determined data to a system input framework.

According to an embodiment, the pressure sensor driver 513 may determine a signal input received from the pressure sensor IC 503 (e.g., the pressure sensor IC 433), determine data including a coordinate value and/or pressure intensity of a pressure touch input based on the input signal, and transfer the determined data to the system input framework.

According to an embodiment, the system area input framework 515 may determine whether a touch coordinate value and a pressure intensity value transferred from the touch sensor driver 511 or the pressure sensor driver 513 match to a coordinate value of an area specified by a button of a current system area. For example, the system area input framework 515 may determine whether a touch coordinate value and a pressure intensity value match to a coordinate value of an area specified to the current system area based on a screen layout output from the current display 453 or a coordinate value of an area specified by a key of the current system area. For example, if the touch coordinate value and the pressure intensity value transferred from the touch sensor driver 511 or the pressure sensor driver 513 match to the coordinate value of the key of the current system area and when pressure intensity is maintained with intensity of a specified intensity or more for a specified time or more, the system area input framework 515 may transfer the transferred system input event to the system application 521. Alternatively, if the touch coordinate value and the pressure intensity value transferred from the touch sensor driver 511 or the pressure sensor driver 513 do not match to a coordinate value of an area specified by the key of the current system area or even though the touch coordinate value and the pressure intensity value transferred from the touch sensor driver 511 or the pressure sensor driver 513 match to a coordinate value of an area designated by the key of the current system area, when the touch coordinate value and the pressure intensity value transferred from the touch sensor driver 511 or the pressure sensor driver 513 are a specified time or less or a specified pressure intensity or less, the system area input framework 515 may transfer the transferred data to the application area input framework 517.

In various embodiments of the disclosure, a button of the system area may be a button designated to perform a generic function related to the electronic device (e.g., a home button input, volume control, or power off). In various embodiments of the disclosure, the system input event may include that the processor 410 maintains a touch pressure of specified intensity or more in an area specified to a key of a system area for a specified time or more. For example, the system input event may include that the processor 410 maintains a touch pressure of specified intensity or more in a specified area for a specified time or more to correspond to a home button, that the processor 410 maintains a touch pressure of specified intensity or more in a pre-specified area for a specified time or more to correspond to a volume control button, that the processor 410 maintains a touch pressure of specified intensity or more in a pre-specified area for a specified time to correspond to a power button, or that the processor 410 maintains a touch pressure of specified intensity or more in a pre-specified area for a specified time or more to correspond to a button for invoking an intelligent assistant program (e.g., Bixby virtual assistant (Bixby) of Samsung Galaxy S8™, Samsung Galaxy S8 Plus™) operating based on voice recognition. According to any embodiment, the system input event may include that the electronic device maintains a touch pressure of specified intensity or more in a specified area for a specified time or more in order to perform a generic function (e.g., a home button input, volume control, or power off) that may be commonly performed upon executing the entire application 519 regardless of a type of the application 519.

According to an embodiment, the application area input framework 517 may determine whether a touch coordinate value and a pressure intensity value transferred from the system area input framework 515 match to those of an event designated in the application 519. For example, the application area input framework 517 may determine whether the transferred touch coordinate value and pressure intensity value match to an event specified in the application 519 based on a determination result on whether the transferred touch coordinate value and pressure intensity value match to a specified area, time, or pressure intensity. For example, the application area input framework 517 may determine whether a drag, a long touch, or a movement corresponds to an event reference pre-designated in the application 519 based on a pattern of the touch coordinate value and the pressure intensity value. For example, when transferred data (e.g., the touch coordinate value and the pressure intensity value) correspond to the above reference, the application area input framework 517 may transfer the transferred data to the application 519.

A method of controlling an electronic device according to various embodiments of the disclosure includes displaying a user interface through a touchscreen display; detecting a first touch input with a pressure lower than a first threshold via a first region of the touchscreen display 453 and performing a first action associated with the application program in response to the first touch input; detecting a second touch input with a pressure lower than a second threshold via a second region of the touchscreen display 453 adjacent to a periphery of the touchscreen display 453 and performing a second action associated with the application program 519 in response to the second touch input; detecting a third touch input with a pressure greater than the first threshold via the first region 860 of the touchscreen display 453 and performing a third action associated with the application program 519 in response to the third touch input; and detecting a fourth touch input with a pressure greater than the second threshold via the second region 851 and performing a generic fourth action associated with the electronic device in response to the fourth touch input. The fourth action may include an action associated with a home button. The method may further include detecting a fifth touch input with a pressure lower than a third threshold via a third region of the touchscreen display 453 adjacent to a periphery of the touchscreen display 453 and positioned at the opposite side of the second region 851 and performing a fifth action associated with the application program 519 in response to the fifth touch input; and detecting a sixth touch input with a pressure greater than the third threshold via the third region 853 and performing a sixth action of displaying at least one notification or status information related to the electronic device in response to the sixth touch input. The method may further include detecting a seventh touch input with a pressure lower than a fourth threshold via a fourth region of the touchscreen display 453 adjacent to a periphery of the touchscreen display 453 and adjacent to one side of the second region 851 and performing a seventh action associated with the application program 519 in response to the seventh touch input; and detecting an eighth touch input with a pressure greater than the fourth threshold via the fourth region 855 and performing an eighth action of invoking an intelligent assistant program or adjusting a volume of a speaker in response to the eighth touch input. The method may further include detecting a ninth touch input with a pressure lower than a fifth threshold via a fifth region of the touchscreen display 453 adjacent to the edge of the touchscreen display 453 and adjacent to the other side of the second region 851 and performing a ninth action associated with the application program 519 in response to the ninth touch input; and detecting a tenth touch input with a pressure greater than the fifth threshold via the fifth region 857 and performing a tenth action of activating a power off function or an emergency call function in response to the tenth touch input. The tenth action may further include an action associated with a menu including at least one specified icon.

FIG. 6 is a flowchart illustrating an operation of an electronic device according to various embodiments of the disclosure.

Referring to FIG. 6, the processor of the electronic device may detect a touch input at operation 610. For example, the processor 410 may detect a touch input through a touch sensor or a touch sensor IC.

The processor 410 of the electronic device according to various embodiments may determine whether intensity of a touch pressure is equal to or larger than (or exceeds) a specified threshold at operation 620. For example, the processor 410 may receive pressure intensity corresponding to the detected touch input from the pressure sensor IC 423 and determine whether intensity of the received touch pressure is equal to or larger than a threshold. According to any embodiment, the processor 410 of the electronic device may first perform any one of operation 610 and operation 620 and perform the other one. Alternatively, the processor 410 may simultaneously perform operation 610 and operation 620. According to an embodiment, if intensity of a touch pressure is equal to or larger than a threshold, the processor 410 may perform operation 630, and if intensity of a touch pressure is less than a threshold, the processor 410 may perform operation 650.

The processor 410 of the electronic device according to various embodiments may determine whether a touch area is a specified area at operation 630. For example, the processor 410 may determine a position in which a touch pressure of a specified threshold or more has occurred, i.e., determine whether a touch coordinate value matches to a designated area. The specified area may be, for example, an area in which a designated button for performing a generic function (e.g., a home button input, volume control, or power off) related to the electronic device is positioned. For example, in the specified area, a home button, a cancel button, a specified hot key, a volume control button, a power button, or a button for executing an intelligent assistant program operating based on voice recognition may be positioned, and the buttons may be a software button responding to a touch input instead of a physical manipulation button. According to various embodiments, the processor 410 may change a position of the designated area and may fix or change a position of the designated area based on user setup. According to any embodiment, the designated area may be positioned in a single area or a plurality of areas and may be positioned in an area adjacent to a periphery of the display 453. According to an embodiment, if the touch area is a specified area, the processor 410 may perform operation 660, and if the touch area is not a specified area, the processor 410 may perform operation 640.

If the touch area is a specified area, the processor 410 of the electronic device according to various embodiments may execute a generic function related to the electronic device at operation 660. For example, the processor 410 may execute a generic function related to the electronic device mapped to the specified area. For example, the processor 410 may execute conversion to a home screen, display of a power on-off menu, execution of volume control, application of an intelligent assistant program operating based on voice recognition, or call (or execution) of a specified application as a function mapped to the specified area.

If the touch area is not a specified area, the processor 410 of the electronic device according to various embodiments may determine whether a function mapped to the application to respond to a pressure exists in the touch area at operation 640. According to an embodiment, if a function mapped to the application to respond to a pressure exists in the touch area, the processor 410 may perform operation 670, and if a function mapped to the application to respond to a pressure does not exist in the touch area, the processor 410 may perform operation 650.

The processor 410 of the electronic device according to various embodiments may execute a pressure function mapped to the application at operation 670. For example, the processor 410 may provide a function of sharing a touched object (e.g., photo or music), a function (e.g., quick action) of displaying a menu related to the touched object, a preview function (e.g., preview) of a screen related to the touch object, or a screen rearrangement function as a function mapped to the application.

The processor 410 of the electronic device according to various embodiments may regard the detected touch input as a general touch input (e.g., a touch input related to the application) and execute a touch function at operation 650. For example, if intensity of the detected touch pressure is smaller than a specified threshold, the processor 410 may provide a user interface based on a general touch input. Alternatively, even though intensity of the detected touch pressure is greater than a specified threshold, when a function mapped to the application to respond to a pressure does not exist, the processor 410 may provide a user interface based on a general touch input.

In various embodiments of the disclosure, the general touch input may include a touch input related to the application. For example, the general touch input may include an input limited to a special (or specific) application different from an input for performing a generic function (e.g., a home button input, volume control, or power off) related to the electronic device. For example, the general touch input may include a user input related to a specific application.

FIG. 7 is a flowchart illustrating an operation of an electronic device according to various embodiments of the disclosure.

Referring to FIG. 7, the processor of the electronic device according to various embodiments may control to display a user interface, for example, upon releasing a lock screen or upon executing a specific application at operation 710. For example, when a lock screen is released, the processor 410 may control to display a previously displayed user interface and to detect a touch input through the user interface. Alternatively, the processor 410 may provide a user interface based on a touch input upon executing the specific application.

The processor 410 of the electronic device according to various embodiments may detect a touch input at operation 720. For example, the processor 410 may detect a touch input through any one of the touch sensor 421, the touch sensor IC 423, the pressure sensor 431, and the pressure sensor IC 433.

The processor 410 of the electronic device according to various embodiments may determine whether the touch input satisfies a first condition at operation 730. According to an embodiment, the first condition may include determination on whether a touch input via a first region has a pressure lower than a first threshold. For example, the processor 410 may determine whether a touch input via the first region of the display has a pressure lower than the first threshold. According to an embodiment, the first region may be a region that displays at least a portion of a home screen and an execution screen of the application regardless of a common button (e.g., a home button, a volume button, or a power button set to respond to a touch input) that performs a generic operation or function related to the electronic device. For example, the first region may be a region relatively adjacent to the center of the display 453. According to an embodiment, if the touch input satisfies the first condition, the processor 410 may perform operation 790, and if the touch input does not satisfy the first condition, the processor 410 may perform operation 740.

The processor 410 of the electronic device according to various embodiments may determine whether the touch input satisfies a second condition at operation 740. According to an embodiment, the second condition may include determination on whether the touch input has a pressure lower than a second threshold via a second region. For example, in order to determine whether the touch input satisfies the second condition, the processor 410 may determine whether the touch input has a pressure lower than the second threshold via the second region of the display 453. According to an embodiment, the second region may be a region in which a common button that performs a generic operation or function related to the electronic device is positioned. For example, the second region may be a region designated to perform a function of a home button set to respond to a touch pressure of intensity greater than the second threshold. According to an embodiment, the second region may be positioned adjacent to a periphery of the display 453. For example, the second region may be positioned to correspond to an existing area of a home button configured with a physical button in a portable electronic device such as a smart phone. According to an embodiment, the second threshold may be set to be equal to or similar to the first threshold. According to an embodiment, if the touch input satisfies the second condition, the processor 410 may perform operation 790, and if the touch input does not satisfy the second condition, the processor 410 may perform operation 750.

The processor 410 of the electronic device according to various embodiments may determine whether the touch input satisfies a third condition at operation 750. According to an embodiment, the second condition may include determination on whether the touch input has a pressure greater than the first threshold via the first region. For example, in order to determine whether the touch input satisfies a third condition, the processor 410 may determine whether the touch input has a pressure greater than the first threshold via the first region of the display 453. According to an embodiment, if the touch input satisfies the third condition, the processor 410 may perform operation 770, and if the touch input does not satisfy the third condition, the processor 410 may perform operation 760.

The processor 410 of the electronic device according to various embodiments may determine whether the touch input satisfies a fourth condition at operation 760. According to an embodiment, the fourth condition may include determination on whether the touch input has a pressure greater than the second threshold via the second region of the display 453. For example, in order to determine whether the touch input satisfies the fourth condition, the processor 410 may determine whether the touch input has a pressure greater than the second threshold via the second region of the display 453. According to an embodiment, if the touch input satisfies the fourth condition, the processor 410 may perform operation 780, and if the touch input does not satisfy the fourth condition, the processor 410 may perform operation 790.

According to various embodiments, the processor 410 may set a common button (e.g., a button implemented with software) that performs a generic operation or function related to the electronic device to position in a plurality of regions of the display 453, and the processor 410 may determine whether the touch input corresponds to a plurality of regions in which the common button is positioned. For example, in order to determine whether the touch input satisfies the fourth condition, the processor 410 may determine whether the touch input has a pressure greater than the third threshold via the third region of the display 453 adjacent to a periphery of the display 453 and positioned at the opposite side of the second region, determine whether the touch input has a pressure greater than the fourth threshold though the fourth region of the display 453 adjacent to a periphery of the display 453 and adjacent to one side of the second region, or determine whether the touch input has a pressure greater than a fifth threshold though a fifth region of the display 453 adjacent to a periphery of the display 453 and adjacent at the other side of the second region. According to an embodiment, the third threshold may be set to be the same as or similar to the first threshold or the second threshold. According to an embodiment, the fourth threshold may be set to be the same as or similar to the first threshold or the second threshold. According to an embodiment, if the touch input satisfies a fourth condition, the processor 410 may perform operation 780, and if the touch input does not satisfy a fourth condition, the processor 410 may perform operation 790.

According to an embodiment, in the second region, a home button set to respond to a touch pressure having intensity of a specified threshold or more may be positioned. According to an embodiment, in the third region, a button may be positioned that displays a notification window including at least one notification or status information related to the electronic device set to respond to a touch pressure having intensity of a specified threshold or more. According to an embodiment, in the fourth region, a button that invokes an intelligent assistant program set to respond to a touch pressure having intensity of a specified threshold or more or that adjusts a volume of the speaker may be positioned. According to an embodiment, in the fifth region, a button that activates a power button or an emergency call function set to respond to a touch pressure having intensity of a specified threshold or more may be positioned.

The processor 410 of the electronic device according to various embodiments may execute a pressure function mapped to an application at operation 770. For example, the processor 410 may provide a function of sharing a touched object (e.g., photo or music), a function (quick action) of displaying a menu related to the touched object, a preview function (preview) of a screen related to the touched object, or a screen rearrangement function as a function mapped to the application. According to an embodiment, even though intensity of the detected touch pressure is greater than a specified threshold, when a function mapped to the application to respond to the pressure does not exist, the processor 410 may provide a user interface based on a general touch input.

The processor 410 of the electronic device according to various embodiments may execute a generic function related to the electronic device at operation 780. For example, the processor 410 may execute a generic function related to the electronic device mapped to the specified area. For example, the processor 410 may execute conversion to a home screen, display of a power on-off menu, volume control, an intelligent assistant program operating based on voice recognition, or call (or execution) of a specified application as a function mapped to the specified area.

The processor 410 of the electronic device according to various embodiments may regard the detected touch input as a general touch input and execute a touch function at operation 790. For example, if intensity of the detected touch pressure is smaller than a specified threshold, the processor 410 may provide a user interface based on a general touch input. Alternatively, even though intensity of the detected touch pressure is greater than a specified threshold, if a function mapped to the application to respond to the pressure does not exist, the processor 410 may provide a user interface based on a general touch input.

Figure 8B:
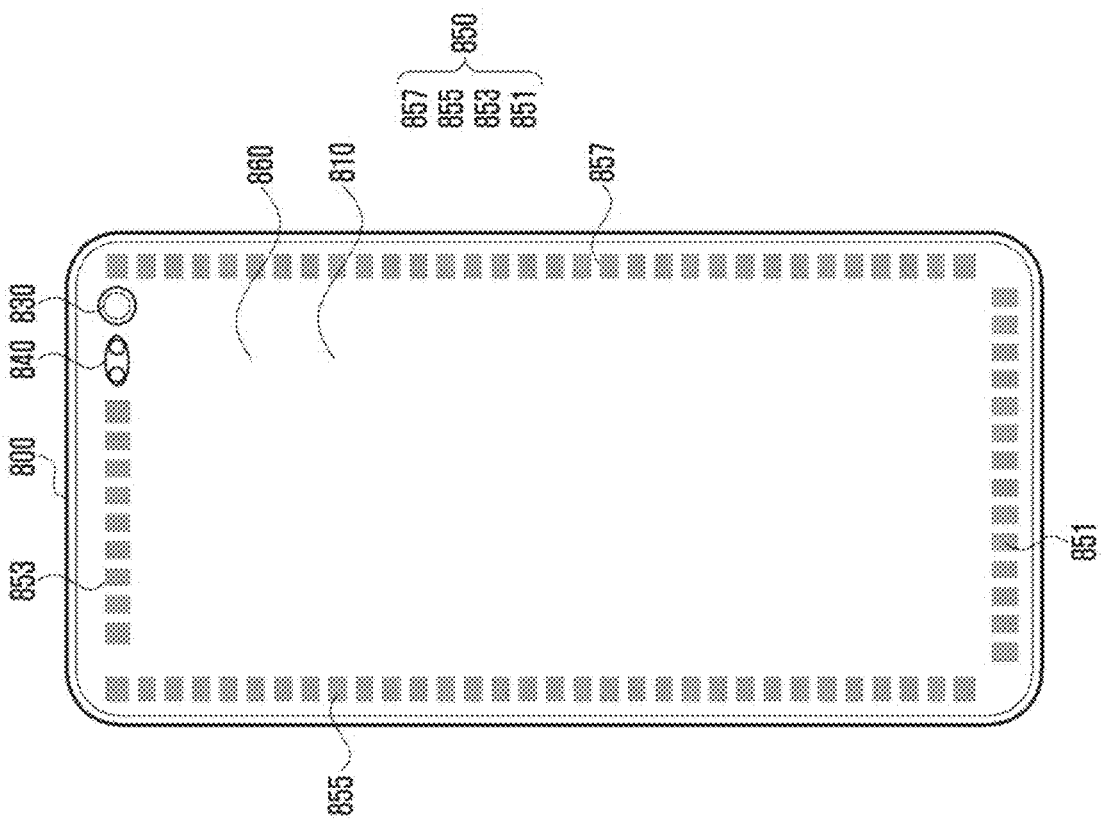
FIGS. 8A and 8B are diagrams illustrating a front surface of the electronic device according to various embodiments of the disclosure.
Figure 8A:
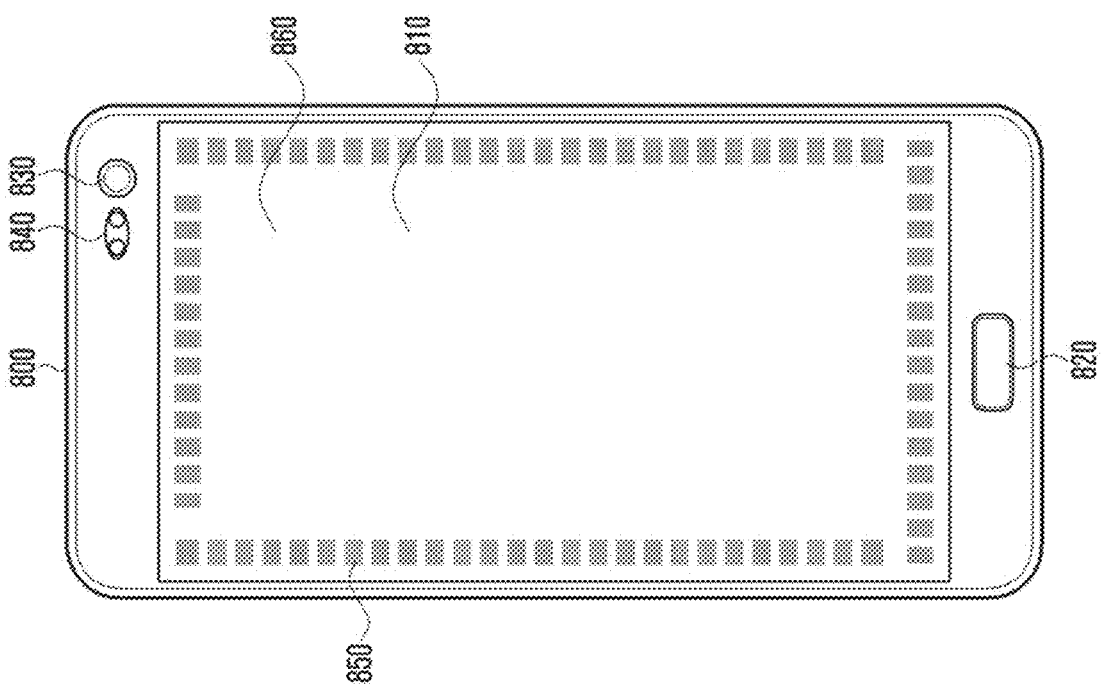

FIGS. 8A and 8B are diagrams illustrating a front surface of the electronic device according to various embodiments of the disclosure.

Referring to FIG. 8A, at a front surface of an electronic device 800 a display 810 may be positioned, at one side (e.g., an upper portion of the display 810) of the display 810, a front camera 830 or at least one sensor 840 may be positioned, and at the other side (e.g., a lower portion of the display 810) of the display 810, at least one physical button 820 (e.g., a home button) may be positioned. According to an embodiment, the display 810 may include a first region 860 relatively adjacent to the center and a second region 850 positioned at an edge of the first region 860 and relatively adjacent to a peripheral edge of the display 810. According to an embodiment, in the second region 850, a common button may be positioned to which a generic function related to the electronic device 800 is mapped, and a function mapped to the common button and a position of a common button may be adjusted. For example, the common button may include a volume key, a power key, or a key invoking an intelligent assistant program. According to an embodiment, when the electronic device 800 includes at least one physical button, the processor 410 may perform a generic function related to the electronic device 800 in response to a touch pressure of a specified threshold or more onto the at least one button 820. According to an embodiment, the processor 410 may control the display 810 to output a visual feedback effect adjusted in a stepwise manner to correspond to the touch pressure based on intensity of a touch pressure onto the at least one button 820. For example, when a touch pressure of less than a specified threshold is detected in at least one physical button 820, the processor 410 may control the display 810 to adjust and display stepwise (or gradually) visual feedback based on intensity of the touch pressure. According to any embodiment, when the electronic device 800 includes at least one physical button, the processor 410 may control the at least one physical button or a software button operating based on a touch input to selectively perform a generic function related to the electronic device 800. According to any embodiment, when the electronic device 800 includes at least one physical button, the processor 410 may perform different functions (e.g., a touch function related to a plurality of different generic functions or a plurality of different applications) based on pressure intensity of a touch input on the physical specific button. For example, the processor 410 may execute a plurality of different generic functions based on intensity of a touch pressure on the physical specific button 820, execute a touch function related to a plurality of different applications, or selectively execute at least one of a generic function and a touch function related to the application.

Referring to FIG. 8B, in an electronic device 800 according to another embodiment, a display 810 positioned at a front surface may be substantially positioned at an entire front surface of the electronic device 800, and the electronic device 800 may not include a home button 820, unlike FIG. 8A. For example, the electronic device 800 may not include a physical button at the front surface, and the display 810 may be positioned at the front surface of the electronic device 800. For example, the front surface of the electronic device 800 may not include a physical button 820 (e.g., the home button of FIG. 8A), and a software configured home button may be positioned to respond to a touch input in an area of the home button.

According to various embodiments, a second region 850 may include a first sub-region 851 adjacent to a lower edge of the display 810, a second sub-region 853 adjacent to an upper edge of the display 810, a third sub-region 855 adjacent to a left edge of the display 810, and a fourth sub-region 857 adjacent to a right edge of the display 810. According to an embodiment, the processor may selectively position a plurality of common buttons to which a generic function related to the electronic device 800 is mapped in the first to fourth sub-regions 851, 853, 855, and 857. For example, the processor may set five common buttons (e.g., a home button, a volume up/down button, a power button, or a button related to an intelligent assistance program operating based on speech recognition (e.g., Bixby virtual assistant (Bixby) of Samsung Galaxy S8™ and Samsung Galaxy S8 Plus™) to which a general function related to the electronic device 800 is mapped, and the five common buttons may position at any one area selected from the first to fourth sub-regions 851, 853, 855, and 857 or may dividedly position in the first to fourth sub-regions 851, 853, 855, and 857.

Figure 9A:
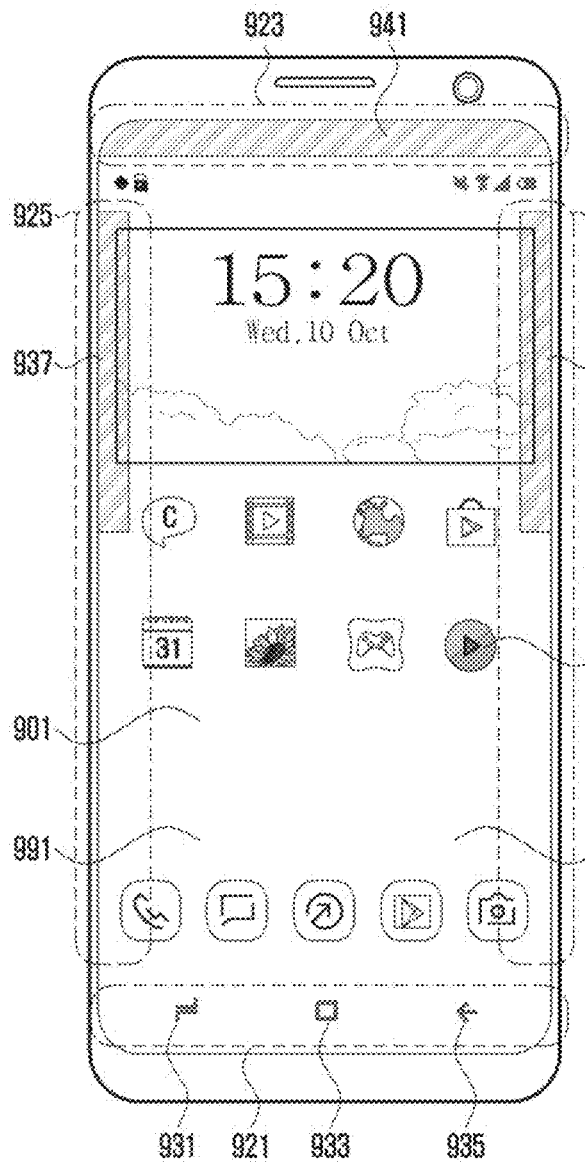
FIGS. 9A and 9B are diagrams illustrating a user interface of an electronic device according to various embodiments of the disclosure.
Figure 9B:
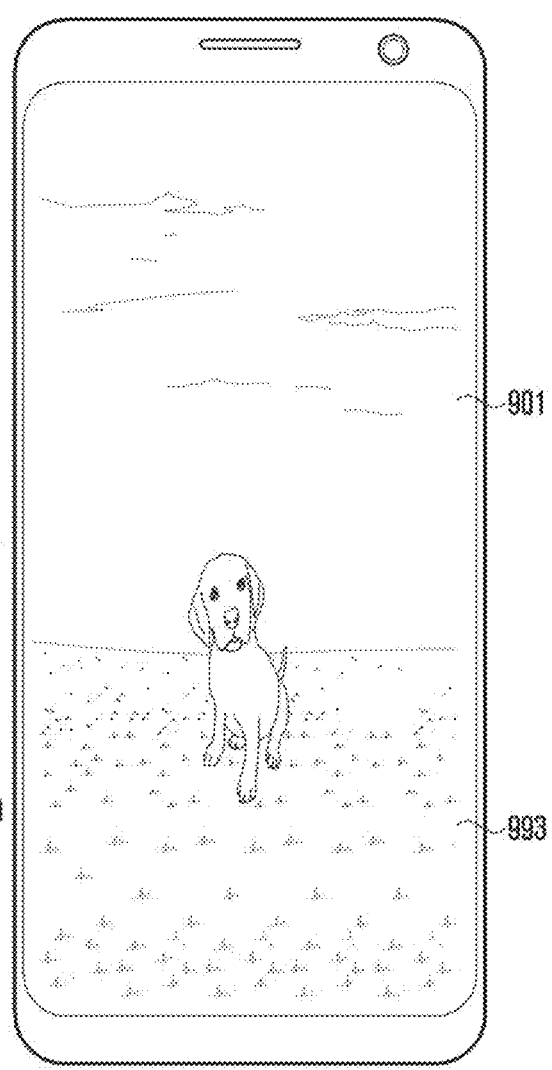

FIGS. 9A and 9B are diagrams illustrating a user interface of an electronic device according to various embodiments of the disclosure.

Referring to FIG. 9A, a processor 410 of an electronic device 900 may control a display 901 to display a home screen 991 in response to release of a lock screen or a home button input event. According to an embodiment, in order for the display 901 to display the home screen 991, the processor 410 may control to display a specified application icon 911 or a widget in a first region 910 relatively adjacent to the center of the display 901 and a common button to which a generic function related to the electronic device 900 is mapped in a second region 920 adjacent to a periphery of the display 901. For example, the processor 410 may set a plurality of common buttons, and the plurality of common buttons may be positioned in a first sub-region 921 adjacent to a lower edge of the display 901, a second sub-region 923 adjacent to an upper edge of the display 901, a third sub-region 925 adjacent to a left edge of the display 901, or a fourth sub-region 927 adjacent to a right edge of the display 901. For example, when a general user interface such as the home screen 991 is displayed, the processor 410 may control to display a home button 933, a cancel button 935, or a multi-task button 931 set to respond to a touch pressure having intensity of a specified threshold or more in the first sub-region 921. Alternatively, when the user interface is displayed, the processor 410 may control to display a button 941 that displays a notification window including at least one notification or status information related to the electronic device 900 set to respond to a touch pressure having intensity of a specified threshold or more in the second sub-region 923. Alternatively, when the user interface is displayed, the processor 410 may control to display a volume button 937 set to respond to a touch pressure having intensity of a specified threshold or more or a button invoking an intelligent assistant program in the third sub-region 925. Alternatively, when the user interface is displayed, the processor 410 may control to display an emergency call button or a power button 939 set to respond to a touch pressure having intensity of a specified threshold or more in the fourth sub-region 927.

Referring to FIG. 9B, upon executing a specific application, when a full screen function is activated, the processor 410 may control to hide common buttons to which a generic function related to the electronic device 900 that has been displayed in a general user interface is mapped or to display the common buttons in a transparent state and to display only a full screen 993 related to the specific application.

Figure 10A:
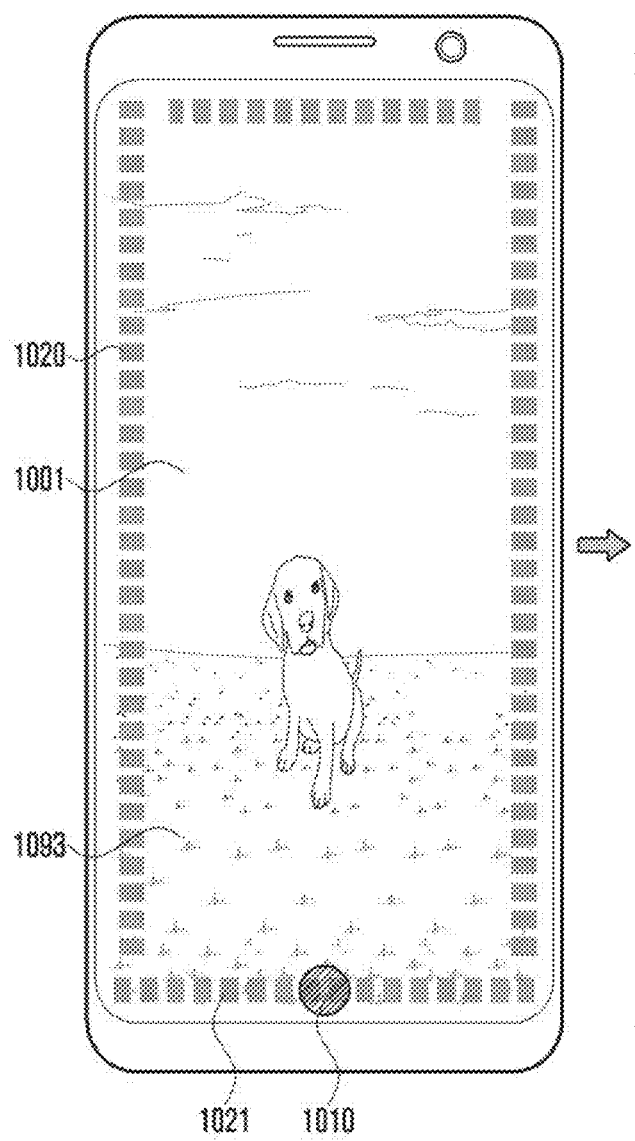
FIGS. 10A and 10B are diagrams illustrating an operation of an electronic device when the electronic device detects a touch pressure in a first sub-region of a second region of a display according to an embodiment of the disclosure.
Figure 10B:
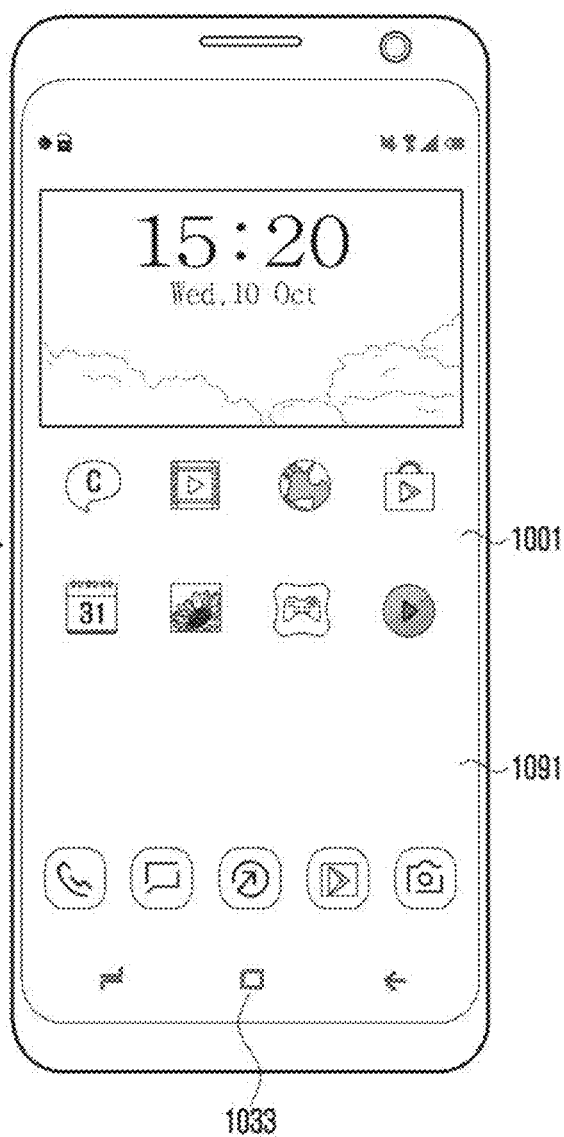

FIGS. 10A and 10B are diagrams illustrating an operation of an electronic device when the electronic device detects a touch pressure in a first sub-region of a second region of a display according to an embodiment.

Referring to FIG. 10A, upon executing a specific application, when a full screen function is activated, the processor 410 may control a display 1001 to hide common buttons (e.g., a home button) 1033 mapped to a generic function related to the electronic device that has been displayed in a general user interface and to display only a full screen 1093 related to a specific application.

According to an embodiment, as shown in FIG. 10A, in a state that provides a user interface 1093 in which the common button 1033 is hidden, the processor 410 may detect a touch input 1010 in a second region 1020, and when a touch input has a pressure of a specified threshold or more in the second region 1020, the processor 410 may activate an input event of the common button mapped to a touch coordinate value. For example, as shown in FIG. 10A, in a state that provides a user interface 1093 in which a common button 1033 is hidden, when a touch input 1010 with a pressure of a threshold or more is detected in a first sub-region 1021, the processor 410 may convert a screen output by the display 1001 to a home screen 1091, as shown in FIG. 10B.

FIGS. 11A and 11B are diagrams illustrating an operation of an electronic device when the electronic device detects a touch pressure in a second sub-region of a second region of a display according to an embodiment.

Referring to FIG. 11A, in a state that provides a user interface 1193 in which a common button is hidden, when a touch input 1110 with a pressure of a threshold or more is detected in a second sub-region 1123 of a second region 1120, the processor 410 may control a display 1101 to display a notification window 1195 including at least one notification 1141 or status information 1143 related to the electronic device, and a quick function setup menu 1145, as shown in FIG. 11B.

FIGS. 12A and 12B are diagram illustrating an operation of an electronic device when the electronic device detects a touch pressure in a third sub-region of a second region of a display according to an embodiment.

Referring to FIG. 12A, in a state that provides a user interface in which a common button is hidden, when a touch input 1210 with a pressure of a threshold or more is detected in a third sub-region 1225 of a second region 1220, the processor 410 may activate an intelligent assistant program and control a display 1201 to display a window 1230 related to the intelligent assistant program, as shown in FIG. 12B. According to another embodiment, as shown in FIG. 12A, in a state that provides a user interface in which a common button is hidden, when a touch input 1210 with a pressure of a threshold or more is detected in the third sub-region 1225, the processor 410 may activate an input event of a volume control button. For example, as shown in FIG. 12A, in a state that provides a user interface 1293 in which a common button is hidden, when a touch input 1210 with a pressure of a threshold or more is detected in another region of the third sub-region 1225, the processor 410 may output a user interface for activating an input event of a volume control button to adjust a volume.

Figure 13A:
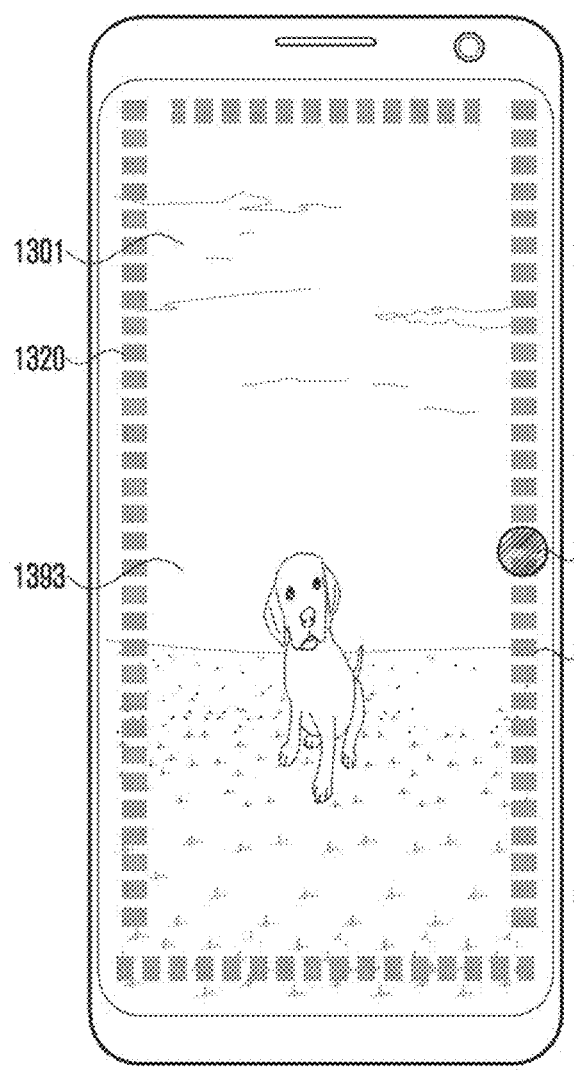
FIGS. 13A and 13B are diagrams illustrating an operation of an electronic device when the electronic device detects a touch pressure in a fourth sub-region of a second region of a display according to an embodiment of the disclosure.
Figure 13B:
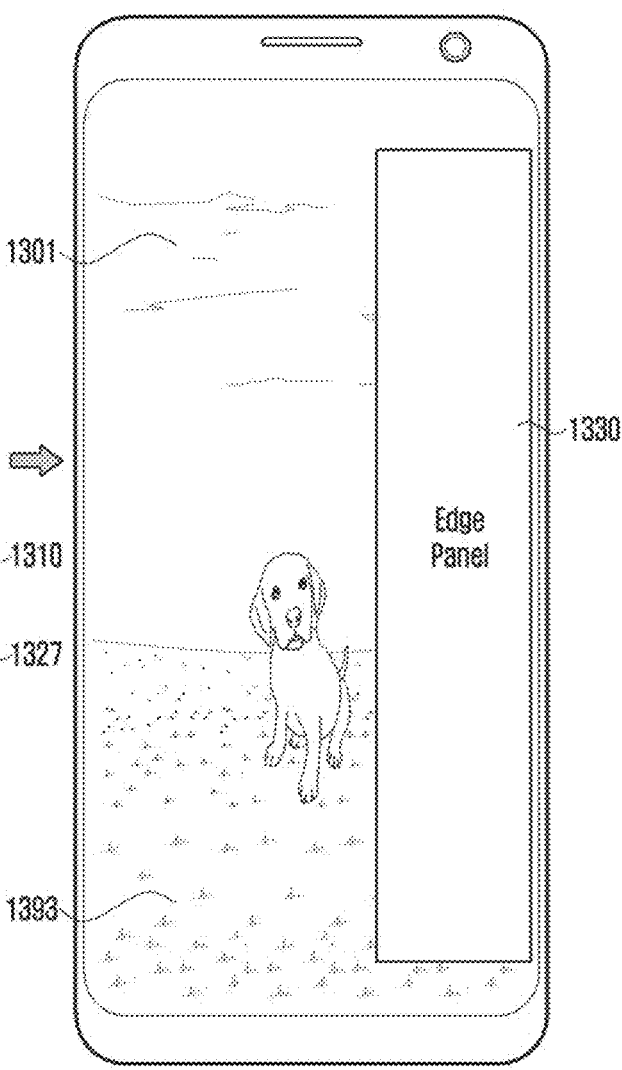

FIGS. 13A and 13B are diagrams illustrating an operation of an electronic device when the electronic device detects a touch pressure in a fourth sub-region of a second region of a display according to an embodiment of the disclosure.

Referring to FIG. 13A, in a state that provides a user interface in which a common button is hidden, when a touch input 1310 with a pressure of a threshold or more is detected in a fourth sub-region 1327 of a second region 1320, the processor 410 may control a display 1301 to display a specified edge panel 1330, as shown in FIG. 13B. The edge panel 1330 may include, for example, at least one specified application icon. According to another embodiment, as shown in FIG. 13A, in a state that provides a user interface 1393 in which a common button is hidden, when a touch input 1310 with a pressure of a threshold or more is detected in the fourth sub-region 1327, the processor 410 may activate a power key input event or an emergency call button input event. For example, as shown in FIG. 13A, in a state that provides a user interface 1393 in which a common button is hidden, when a touch input 1310 with a pressure of a threshold or more is detected in another area (e.g., the center, upside, or downside of a side surface of the electronic device) of the fourth sub-region 1327, the processor 410 may activate a power key input event or an emergency call button input event to output a user interface related to the power key input event or the emergency call button input event.

Figures 14A, 14B:
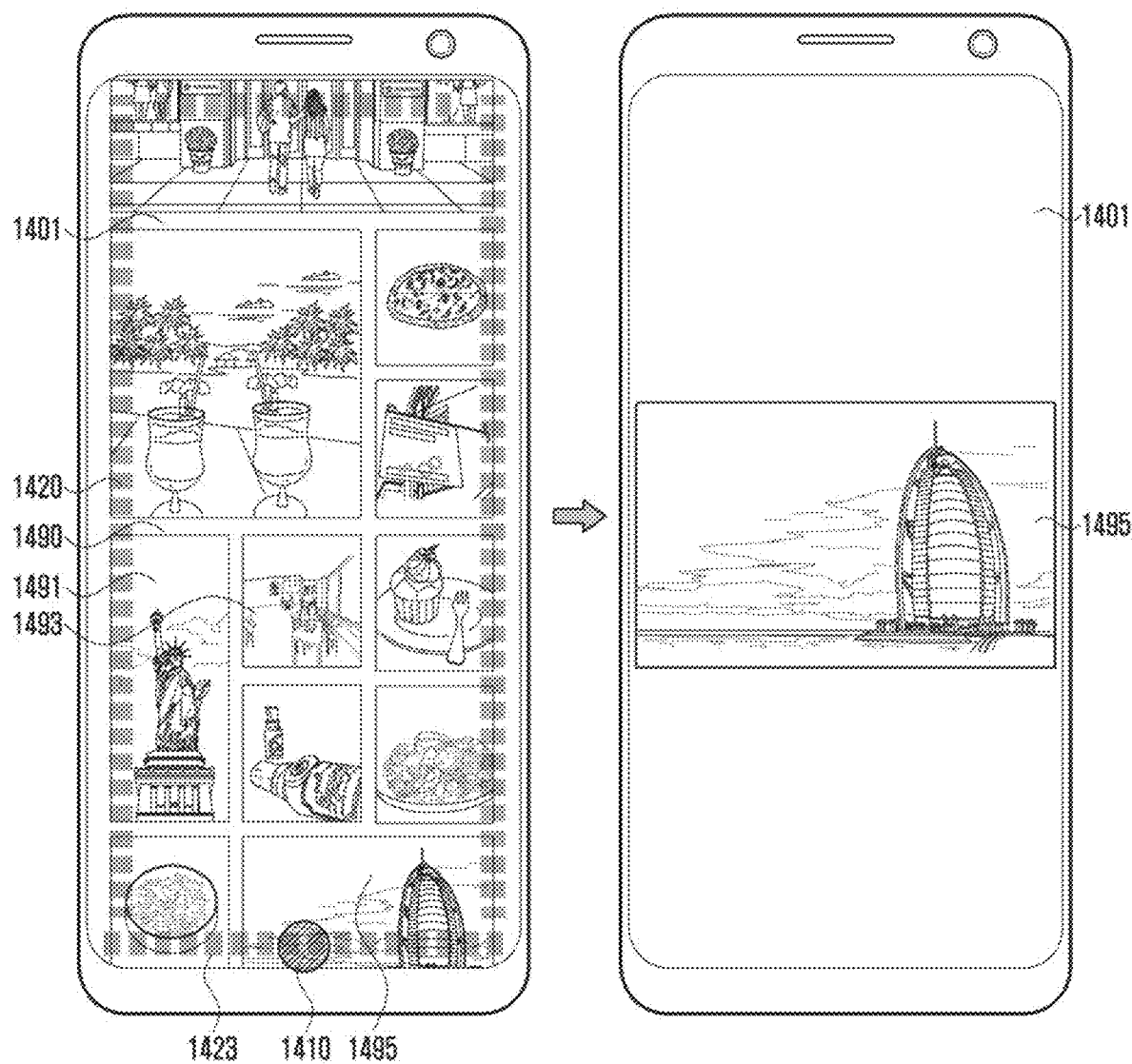
FIGS. 14A and 14B are diagrams illustrating an operation of an electronic device when the electronic device detects a touch pressure having intensity of a threshold or less in a second region of a display according to an embodiment of the disclosure.

FIGS. 14A and 14B are diagrams illustrating an operation of an electronic device when the electronic device detects a touch pressure having intensity of a threshold or less in a second region of a display according to an embodiment of the disclosure.

According to an embodiment, when a touch input is detected in a second region 1420 and when intensity of a detected touch pressure is smaller than a specified threshold, the processor 410 may provide a user interface based on a general touch input.

Referring to FIGS. 14A and 14B, for example, even if a touch input is detected in the second region 1420, if intensity of the detected touch pressure is smaller than a specified threshold, the processor 410 may provide a user interface 1490 based on a general touch input. For example, as shown in FIG. 14A, upon executing a gallery application, the processor 410 may provide a user interface 1490 in which a plurality of pictures 1491, 1493, and 1495 are arranged. For example, when a touch input 1410 having pressure intensity of less than a specified threshold is detected in a first sub-region 1423 of the plurality of pictures 1491, 1493, and 1495 included in the user interface 1490, the processor 410 may perform a general touch input action in any one picture 1495 positioned in the first sub-region 1423 among the plurality of pictures. For example, as shown in FIG. 14B, the processor 410 may control to enlarge and display the picture 1495 of the touch area to a full screen of the display 1401 in response to the touch input 1410.

Figure 15A:
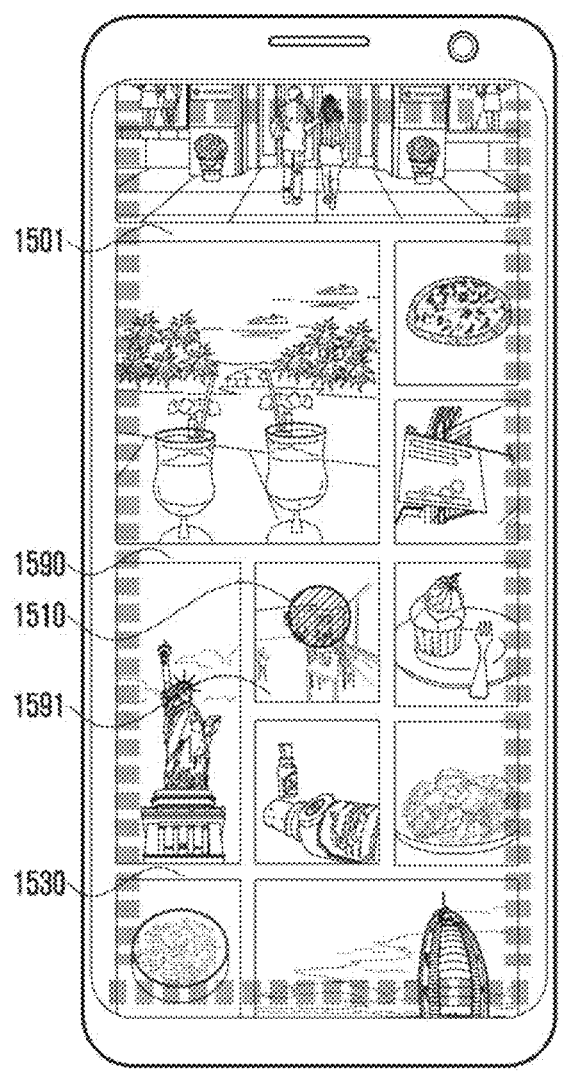
FIGS. 15A and 15B are diagrams illustrating an operation of an electronic device when the electronic device detects a touch pressure in a first region of a display according to an embodiment of the disclosure.
Figure 15B:
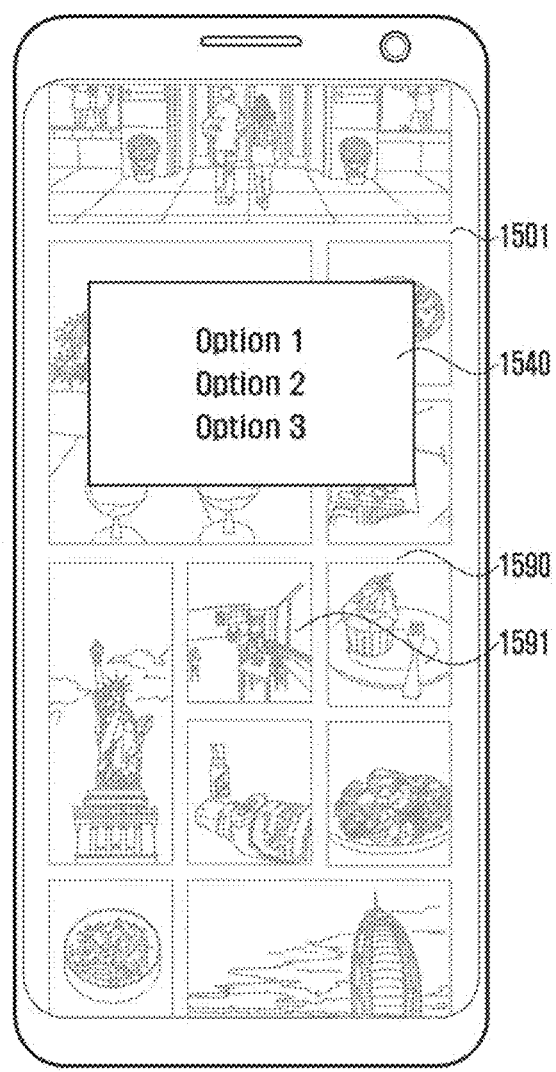

FIGS. 15A and 15B are diagram illustrating an operation of an electronic device when the electronic device detects a touch pressure in a first region of a display according to an embodiment of the disclosure.

Referring to FIGS. 15A and 15B, for example, when a touch is detected in a first region 1530 and when intensity of a detected touch input 1510 is greater than a specified threshold, the processor 410 may execute a pressure function mapped to an application. For example, as shown in FIG. 15A, upon executing a gallery application, the processor 410 may provide a user interface 1590 in which a plurality of pictures are arranged. According to an embodiment, when a touch input 1510 having pressure intensity of a specified threshold or more is detected in the first region 1530 of a plurality of pictures included in the user interface 1590, the processor 410 may control a display 1501 to display an option menu 1540 for providing a plurality of functions related to a touch picture 1591. For example, as shown in FIG. 15B, the processor 410 may control to display an option menu 1540 that provides a function of sharing a touched object (e.g., photo or music) 1591, a function (quick action) of displaying a menu related to the touch object 1591, a function (preview) of previewing a screen related to the touch object 1591, or a screen rearrangement function as a function mapped to the application.

FIGS. 16A, 16B, and 16C are diagrams illustrating a disposition area of a function button set to perform a generic operation related to an electronic device when the electronic device is rotated according to various embodiments of the disclosure.

Referring to FIGS. 16A, 16B, and 16C, an electronic device 1600 according to various embodiments of the disclosure may detect a rotation and adjust a disposition area of a function button set to perform a generic operation based on a rotation direction. According to an embodiment, the electronic device 1600 may change a preset position of a plurality of common buttons based on a rotation direction. For example, the processor 410 may set a plurality of common buttons and selectively position the plurality of common buttons in second regions 1621, 1623, 1625, and 1627. According to an embodiment, the processor 410 may selectively position the plurality of common buttons in a first sub-region 1621 adjacent to a lower edge of the display, a second sub-region 1623 adjacent to an upper edge of the display 453, a third sub-region 1625 adjacent to a left edge of the display 453, and a fourth sub-region 1627 adjacent to a right edge of the display 453. For example, the plurality of common buttons may have different function attributes, such as a home button, volume control button, or power button.

According to an embodiment, when a rotation of the electronic device 1600 is detected, the processor 410 may set a position of the common button such that a common button of the same function attribute always positions in the same direction based on the direction of gravity.

Referring to FIG. 16A, when the electronic device 1600 is gripped or placed such that the first sub-region 1621 positions in the direction of gravity, the electronic device 1600 may position a common button of a fourth function attribute such as an indication number "4" in the first sub-region 1621, position a common button of a first function attribute such as an indication number "1" in the second sub-region 1623, position a common button of a second function attribute such as an indication number "2" in the third sub-region 1625, and position a common button of a third function attribute such as an indication number "3" in the fourth sub-region 1627.

Referring to FIG. 16B, when the electronic device 1600 is gripped or placed such that the third sub-region 1625 positions in the direction of gravity with a rotation thereof, the processor 410 may position a common button of a third function attribute such as an indication number "3" in the first sub-region 1621, position a common button of a second function attribute such as an indication number "2" in the second sub-region 1623, position a common button of a fourth function attribute such as an indication number "4" in the third sub-region 1625, and position a common button of a first function attribute such as an indication number "1" in the fourth sub-region 1627.

Referring to FIG. 16C, when the electronic device 1600 is gripped or placed such that the fourth sub-region 1627 positions in the direction of gravity with a rotation thereof, the processor 410 may position a common button of a second function attribute such as an indication number "2" in the first sub-region 1621, position a common button of a third function attribute such as an indication number "3" in the second sub-region 1623, position a common button of a first function attribute such as an indication number "1" in the third sub-region 1625, and position a common button of a fourth function attribute such as an indication number "4" in the fourth sub-region 1627.

In an embodiment of the disclosure, by enabling a common button of the same function attribute to always position in the same direction based on the direction of gravity, a user may easily recognize a position of the specified common button. For example, the processor 410 may set the home button to always position in the direction of gravity regardless of a rotation direction of the electronic device 1600, and as shown in FIG. 16B, when the electronic device 1600 is rotated, the processor 410 may perform a touch input in the second sub-region 1623 positioned in the direction of gravity when trying to input the home button, or as shown in FIG. 16C, when the electronic device 1600 is rotated, the processor 410 may perform a touch input in the third sub-region 1627 positioned in the direction of gravity when trying to input the home button; thus, by enhancing intuition in manipulating the electronic device, user convenience can be increased.

FIGS. 17A, 17B, and 17C are diagrams illustrating a disposition area of a function button set to perform a generic operation related to an electronic device when the electronic device is rotated according to various embodiments of the disclosure.

Referring to FIG. 17, the processor 410 may set a position of a common button such that the common button of the same function attribute always positions in the same direction regardless of a rotation of an electronic device 1700. For example, the processor 410 may fixedly position a common button of a fourth function attribute such as an indication number "4" in a first sub-region 1721 regardless of a holding direction or a placed direction of the electronic device 1700, position a common button of a first function attribute such as an indication number "1" in a second sub-region 1723, position a common button of a second function attribute such as an indication number "2" in a third sub-region 1725, and position a common button of a third function attribute such as an indication number "3" in a fourth sub-region 1727.

FIGS. 18A, 18B, and 18C are diagrams illustrating another example of a disposition area of a function button set to perform a generic operation related to an electronic device when the electronic device is rotated according to an embodiment of the disclosure.

Referring to FIG. 18A, the processor 410 may set a position of a common button such that the common button of the same function attribute always positions in the same direction regardless of a rotation of an electronic device 1800, set an area of a region that may be recognized by the common button to be smaller than an area of a corresponding sub-region, and position the common button only in a specified direction in the corresponding sub-region.

Referring to FIG. 18A, the processor 410 may position a common button of a fourth function attribute such as an indication number "4" in a first sub-region 1821, but may position the common button of the fourth function attribute only in an intermediate area within the first sub-region 1821. Alternatively, the processor 410 may position a common button of a second function attribute such as an indication number "2" in a third sub-region 1825, but may position a common button of the second function attribute at only one side relatively spaced from the first sub-region 1821 even in the third sub-region 1825. Alternatively, the processor 410 may position a common button of a third function attribute such as an indication number "3" in the fourth sub-region 1827, but may position a common button of the third function attribute at only one side relatively spaced from the first sub-region 1821 even in the fourth sub-region 1827. The electronic device 1800 according to various embodiments may set an area of a region that may be recognized by the common button to be smaller than an area of the corresponding sub-region and position the common button only in a specified direction in the corresponding sub-region; thus, the common button positions only in a specified partial area regardless of a rotation of the electronic device 1800, thereby preventing user confusion. According to an embodiment, in the electronic device 1800, the common button positioned in a second sub-region 1823 and the common button positioned in the third sub-region 1825 may be positioned opposite to each other (e.g., a top area at both side surfaces of the electronic device 1800).

Referring to FIGS. 18B and 18C, when the electronic device 1800 is rotated in a horizontal direction, the common button positioned in the second sub-region 1823 and the common button positioned at the third sub-region 1825 position at the left side or the right side; thus, the user may be prevented from confusing the common button positioned in the second sub-region 1823 and the common button positioned in the third sub-region 1825. For example, in a laid state of FIG. 18A, when the electronic device 1800 rotates as shown in FIG. 18B, a common button of a second function attribute such as an indication number "2" may position at the lower end of the left side of the electronic device 1800 (the direction of gravity, e.g., a downward direction of FIG. 18); thus, only when the user performs a touch input to correspond to the bottom of the left side in a laid state of FIG. 18B, the electronic device 1800 may activate a common button of a second function attribute. Alternatively, in a laid state of FIG. 18A, when the electronic device 1800 is rotated as shown in FIG. 18C, a common button of a third function attribute such as an indication number "3" may position at the bottom (the direction of gravity, e.g., a downward direction in FIG. 18) of the right side of the electronic device 1800; thus, only when the user performs a touch input to correspond to the bottom of the right side in a laid state of FIG. 18C, the electronic device 1800 may activate a common button of a third function attribute.

According to an embodiment, in a state in which a plurality of common buttons are hidden (non-display state), when a touch event having pressure intensity of a threshold or more occurs in a unspecified second region at a position of the common button, in order to prevent user confusion, the processor 410 may output a user interface that again hides the plurality of common buttons while temporarily displaying. According to another embodiment, in order to prevent user confusion, in a state in which a plurality of common buttons are hidden (non-display state), when a rotation of the electronic device 1800 is detected, the processor 410 may output a user interface that again hides the plurality of common buttons while temporarily displaying.

Figure 19:
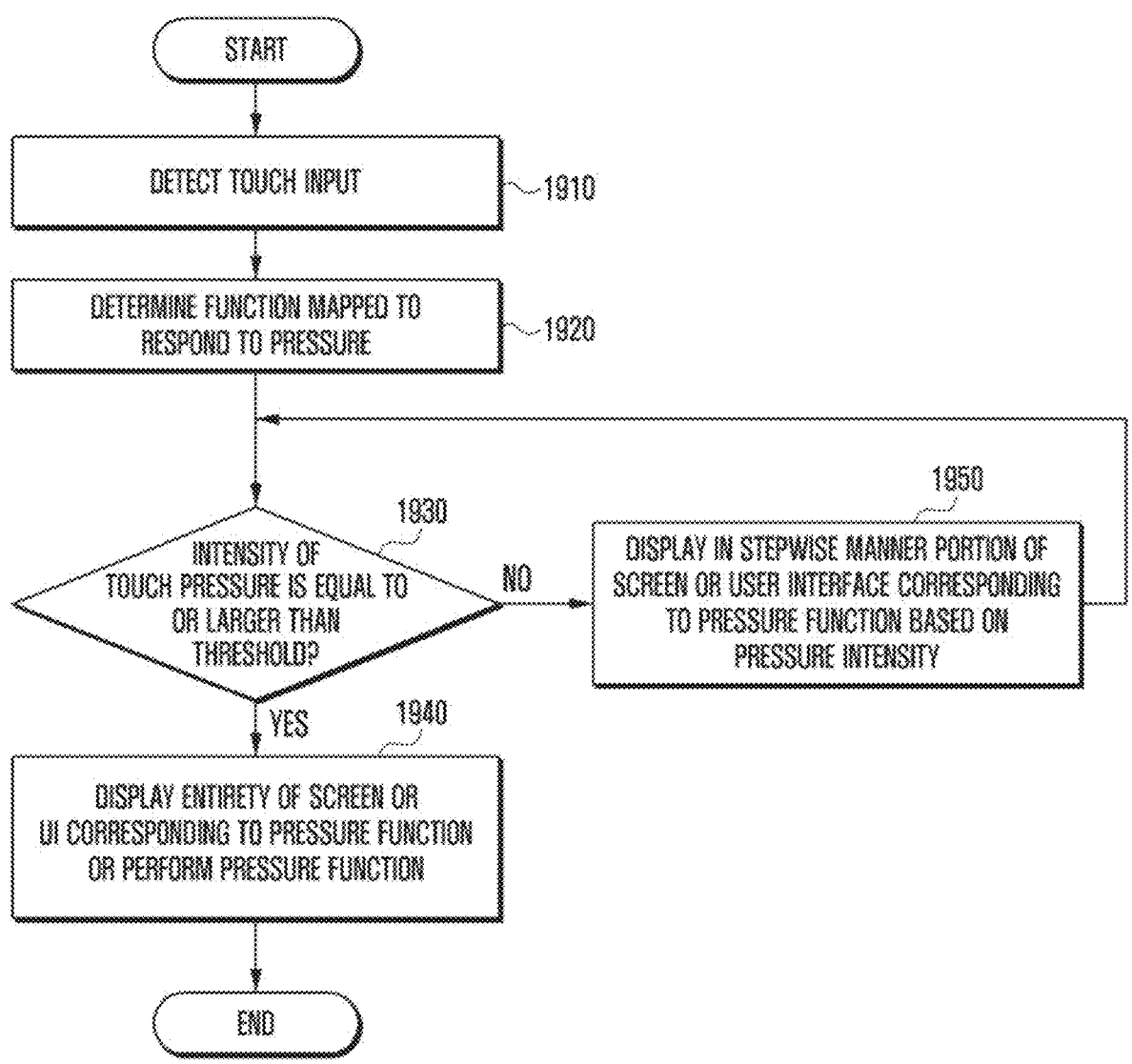
FIG. 19 is a flowchart illustrating an operation of an electronic device for providing a visual effect in response to a pressure touch of the disclosure.

FIG. 19 is a flowchart illustrating an operation of an electronic device for providing a visual effect in response to a pressure touch of the disclosure.

The processor 410 of the electronic device according to various embodiments of the disclosure may detect a touch input, determine whether a corresponding pressure function exists at a position of the touch input, and if a corresponding pressure function exists at a position of the touch input, the processor 410 may output visual feedback based on intensity of a detected pressure. For example, the processor 410 may adjust a level of a reduction, enlargement, rotation, or blur effect of graphic corresponding to visual feedback based on intensity of the detected touch pressure. For example, when the number of image frames is n in which a first screen output from the display is converted to a second screen, the processor 410 may correspond each image frame to each pressure. According to an embodiment, when the touch pressure intensity reaches a specified threshold, the processor 410 may stop gradual (stepwise) display of a user interface or a screen based on the pressure intensity and execute a generic function mapped to the pressure touch. Hereinafter, an operation of the electronic device will be described in detail.

The processor 410 of the electronic device may detect a touch input at operation 1910. For example, the processor 410 may detect the touch input through the touch sensor or the touch sensor IC.

The processor 410 of the electronic device may determine whether a touch position has a function mapped to respond to a pressure at operation 1920. For example, the processor 410 may determine whether a touch position is an area to which a common button (e.g., a home button, a volume button, or a power button set to respond to a touch input) is mapped that performs a generic operation or function related to the electronic device.

The processor 410 of the electronic device may determine whether intensity of a touch pressure is equal to or larger than a specified threshold at operation 1930. For example, the processor 410 may receive pressure intensity corresponding to a detected touch input from the pressure sensor IC and determine whether intensity of the received touch pressure is equal to or larger than a threshold. According to an embodiment, if intensity of the touch pressure is equal to or larger than a threshold, the processor 410 may perform operation 1940, and if intensity of the touch pressure is less than a threshold, the processor 410 may perform operation 1950.

The processor 410 of the electronic device may display the entirety of a user interface or a screen corresponding to a pressure function or may perform a pressure function at operation 1940. For example, the processor 410 may execute conversion to a home screen, display of a power on-off menu, volume control, an intelligent assistant program operating based on voice recognition, or call (or execution) of a designated application as a function mapped to a touch area in response to a pressure touch of a threshold or more.

The processor 410 of the electronic device may control to display in a stepwise manner a user interface or a screen corresponding to a pressure function based on pressure intensity at operation 1950. For example, the processor 410 may adjust a level of a reduction, enlargement, rotation, or blur effect of graphic corresponding to visual feedback based on intensity of the detected touch pressure.

FIGS. 20A, 20B, 20C, and 20D are diagrams illustrating visual feedback providing when an electronic device detects a touch pressure in a first sub-region of a second region of a display according to an embodiment of the disclosure.

Referring to FIG. 20A, upon executing a specific application, when a full screen function is activated, the processor 410 may control a display 2001 to hide common buttons 2013 to which a generic function related to an electronic device 2000 that has been displayed in a general user interface is mapped and to display only a full screen user interface 2030 related to the specific application.

According to an embodiment, as shown in FIG. 20A, in a state that provides a user interface 2030 in which a common button 2013 is hidden, the processor 410 of the electronic device 2000 may detect a touch input in a second region (e.g., a first sub-region 2010) and activate an output of visual feedback of the common button 2013 mapped to a touch coordinate value. For example, in a state that provides the user interfaces 2030 in which the common button 2013 is hidden, when a touch input is detected in the first sub-region 2010, the processor 410 may control to reduce in a stepwise manner and display an application screen 2030 output by the display 2001 based on intensities 2021, 2023, and 2025 of a touch pressure and to display a home screen 2040 on a layer screen different from that of the application. For example, when intensities 2021, 2023, and 2025 of the touch pressure gradually increase in the first sub-region 2010, as shown in order of FIGS. 20A, 20B, and 20C, the processor 410 may control to reduce in a stepwise manner and display the application screen 2030 output by the display 2001 in response to gradual increase of intensities 2021, 2023, and 2025 of the touch pressure in a range of less than a threshold.

According to an embodiment, as shown in FIG. 20A, in a state that provides the user interface 2030 in which the common button 2013 is hidden, the processor 410 may detect a touch input in a second region, and when a touch input 2027 in the second region has a pressure of a specified threshold or more, the processor 410 may activate an input event of the common button 2013 mapped to a touch coordinate value. For example, when a touch input 2027 with a pressure of a threshold or more is detected in the first sub-region 2010, the processor 410 may convert a screen output by the display 2001 to a home screen 2040, as shown in FIG. 20D. According to an embodiment, when outputting the home screen 2040 in the display 2001, the processor 410 may output the common button 2013.

FIGS. 21A, 21B, 21C, and 21D are diagrams illustrating another visual feedback providing when an electronic device detects a touch pressure in a first sub-region of a second region of a display according to an embodiment of the disclosure.

Referring to FIG. 21A, in a state that provides a user interface 2130 in which a common button 2113 is hidden, a processor 410 of an electronic device 2100 (e.g., the electronic device 101) may detect a touch input in a second region (e.g., a first sub-region 2110) and activate an output of visual feedback to the common button 2113 mapped to a touch coordinate value. For example, in a state that provides the user interface 2130 in which the common button 2113 is hidden, when a touch input is detected in the first sub-region 2110, the processor 410 may control to increase in a stepwise manner and display transparency of an application screen 2130 output by a display 2101 based on intensity of a touch pressure and to display a home screen 2140 on a layer screen different from that of the application. For example, when intensities 2121, 2123, and 2125 of a touch pressure gradually increase in the first sub-region 2110, as shown in order of FIGS. 21A, 21B, and 21C, the processor 410 may control to increase in a stepwise manner and display transparency of the user interface 2130 output by the display 2101 in response to gradual increase of intensities 2121, 2123, and 2125 of a touch pressure in a range of less than a threshold.

According to an embodiment, as shown in FIG. 21A, in a state that provides a user interface 2130 in which a common button 2113 is hidden, the processor 410 may detect a touch input in a second region and activate an input event of the common button 2113 mapped to a touch coordinate value when a touch input 2127 in the second region has a pressure of a specified threshold or more. For example, when a touch input 2127 with a pressure of a threshold or more is detected in the first sub-region 2110, the processor 410 may convert a screen output by the display 2101 to a home screen 2140, as shown in FIG. 21D.

FIGS. 22A, 22B, 22C, and 22D are diagrams illustrating another visual feedback providing when an electronic device detects a touch pressure in a first sub-region of a second region of a display according to an embodiment of the disclosure.

Referring to FIG. 22A, in a state that provides a user interface 2230 in which a common button 2213 is hidden, a processor 410 of an electronic device 2200 (e.g., the electronic device 101) may detect a touch input in a second region (e.g., a first sub-region 2210) and activate an output of visual feedback in the common button 2213 mapped to a touch coordinate value. For example, in a state that provides the user interface 2230 in which the common button 2113 is hidden, when the touch input is detected in the first sub-region 2210, the processor 410 may control to display objects 2251, 2253, and 2255 representing intensity of a touch pressure at a periphery of an area to which the common button 2213 is mapped. For example, when intensities 2221, 2223, and 2225 of a touch pressure gradually increase in the first sub-region 2210, the processor 410 may control to display an arrow as objects 2251, 2253, and 2255 representing intensity of a touch pressure at a periphery of an area to which the common button 2213 is mapped, as shown in order of FIGS. 22A, 22B, and 22C and to adjust in a stepwise manner and display a length, brightness, color, or chroma of the arrow in response to gradual increase of intensities 2221, 2223, and 2225 of the touch pressure in a range of less than a threshold.

According to an embodiment, as shown in FIG. 22A, in a state that provides the user interface 2230 in which the common button 2213 is hidden, the processor 410 may detect a touch input in the second region and activate an input event of the common button 2213 mapped to a touch coordinate value when a touch input 2227 in the second region has a pressure of a specified threshold or more. For example, when a touch input 2227 with a pressure of a threshold or more is detected in the first sub-region 2210, the processor 410 may convert a screen output by a display 2201 to a home screen 2240, as shown in FIG. 22D.

FIGS. 23A, 23B, 23C, and 23D are diagrams illustrating another visual feedback providing when an electronic device detects a touch pressure in a first sub-region of a second region of a display according to an embodiment.

Referring to FIG. 23A, in a state of providing a user interface 2330 in which a common button 2313 is hidden, a processor 410 of an electronic device 2300 (e.g., the electronic device 101) detects a touch input in a first sub-region 2310 and when intensities 2321, 2323, and 2325 of a touch pressure gradually increase in the first sub-region 2310, as shown in order of FIGS. 23A, 23B, and 23C, the processor 410 may control a display 2301 to display at least one semicircle as an object representing intensity of a touch pressure at a periphery of an area to which the common button 2313 is mapped. For example, the processor 410 may control to adjust in a stepwise manner and display a length, brightness, color, or chroma of the at least one semicircle in response to gradual increase of intensities 2321, 2323, and 2325 of the touch pressure in a range of less than a threshold.

According to an embodiment, when a touch input 2327 with a pressure of a threshold or more is detected in the first sub-region 2310, as shown in FIG. 23D, the processor 410 may convert a screen output by the display 2301 to a home screen 2340.

According to various embodiments, objects 2351 and 2353 may have, for example, a shape such as a polygon including a triangle and a square, a circle, or oval in addition to an arrow and a semicircle. According to an embodiment, the processor 410 may change at least one of the number, color, brightness, and chroma of the objects 2351 and 2353 based on intensities 2321, 2323, and 2325 of a touch pressure.

FIGS. 24A, 24B, 24C and 24D are diagrams illustrating another visual feedback providing when an electronic device detects a touch pressure in a first sub-region of a second region of a display according to an embodiment of the disclosure.

Referring to FIG. 24A, in a state that provides a user interface 2430 in which a common button 2413 is hidden, a processor 410 of an electronic device 2400 (e.g., the electronic device 101) may detect a touch input in a first sub-region 2410, when intensities 2421, 2423, and 2425 of a touch pressure gradually increases in the first sub-region 2410, the processor 410 may control to display edge highlighting lines 2451, 2453, and 2455 as an object representing intensity of a touch pressure in at least a portion of an edge area of the display 2401, as shown in order of FIGS. 24A, 24B, and 24C and to adjust in a stepwise manner and display a length, brightness, color, or chroma of the edge highlighting lines 2451, 2453, and 2455 in response to gradual increase of intensities 2421, 2423, and 2425 of the touch pressure in a range of less than a threshold.

According to an embodiment, when a touch input 2427 with a pressure of a threshold or more is detected in the first sub-region 2410, the processor 410 may convert a screen output by the display 2401 to a home screen 2440, as shown in FIG. 24D.

FIGS. 25A, 25B, 25C, and 25D are diagrams illustrating another visual feedback providing when an electronic device detects a touch pressure in a first sub-region of a second region of a display according to an embodiment of the disclosure.

Referring to FIG. 25A, in a state that provides an application screen 2530 in which a common button 2513 is hidden, a processor 410 (of an electronic device 2500 may detect a touch input in a first sub-region 2510 and when intensities 2521, 2523, and 2525 of a touch pressure in the first sub-region 2510 gradually increase, as shown in order of FIGS. 25A, 25B, and 25C, the processor 410 may control to rotate in a stepwise manner and display an application screen 2530 output by the display 2501 based on intensity of the touch pressure and to display a home screen 2540 on a layer screen different from that of the application.

According to an embodiment, when a touch input 2527 with a pressure of a threshold or more is detected in the first sub-region 2510, the processor 410 may convert a screen output by the display 2501 to the home screen 2540, as shown in FIG. 25D. According to an embodiment, a rotation speed of the application screen 2530 may be changed based on intensity of a touch pressure. For example, when intensity of a touch pressure quickly increases, a rotation speed may be quickly changed.

FIGS. 26A, 26B, 26C and 26D are diagrams illustrating visual feedback providing when an electronic device detects a touch pressure in a fourth sub-region of a second region of a display according to an embodiment of the disclosure.

Referring to FIG. 26A, in a state that provides a user interface 2640 in which a common button positioned in a fourth sub-region 2610 is hidden, a processor 410 of an electronic device 2600 may detect a touch input in the fourth sub-region 2610, and when intensities 2621, 2623, 2625, and 2627 of a touch pressure gradually increase in the fourth sub-region 2610, as shown in order of FIGS. 26A, 26B, and 26C, a processor 410 of an electronic device 2600 may control to display objects 2651, 2653, 2655, and 2657 protruded from the fourth sub-region 2610 as objects 2651, 2653, 2655, and 2657 representing the intensities 2621, 2623, 2625, and 2627 of the touch pressure and to adjust in a stepwise manner and display a length, brightness, color, or chroma of the protruded objects 2651, 2653, 2655, and 2657 in response to gradual increase of the intensities 2621, 2623, 2625, and 2627 of the touch pressure in a range of less than a threshold.

According to an embodiment, when a touch input with a pressure of a threshold or more is detected in the fourth sub-region 2610, the processor 410 may output the protruding object 2657 to include a phrase indicating an event of "power off", as shown in FIG. 26D. According to an embodiment, the processor 410 may activate a power-off event at the same time with an output of the phrases, or may activate a power-off event in response to re-detection of a touch input with a pressure of a threshold or more in the sub-region 2610 after the output of the phrase. According to an embodiment, after the phrase is output, when an input of a specified time or more is continued or when a pressure of a specified threshold or more is detected, the processor 410 may activate a power-off event.

FIGS. 27A, 27B, 27C and 27D are diagram illustrating another visual feedback providing when an electronic device detects a touch pressure in a fourth sub-region of a second region of a display according to an embodiment of the disclosure.

Referring to FIG. 27A, in a state that provides a user interface 2740 in which a common button positioned in a fourth sub-region 2710 is hidden, a processor 410 of an electronic device 2700 (e.g., the electronic device 101) may detect a touch input in the fourth sub-region 2710 and when intensities 2721, 2723, 2725, and 2727 of the touch pressure in the fourth sub-region 2710 gradually increase, as shown in order of FIGS. 27A, 27B, and 27C, the processor 410 may control to display protruding objects 2751, 2753, 2755, and 2757 protruding from the fourth sub-region 2710 as objects 2751, 2753, 2755, and 2757 including a phrase indicating a common button mapped to the fourth sub-region 2710. For example, the processor 410 may control to adjust in a stepwise manner and display a length, brightness, color, or chroma of the protruding objects 2751, 2753, 2755, and 2757 in response to gradual increase of the intensities 2721, 2723, 2725, and 2727 of a touch pressure in a range of less than a threshold. For example, when intensity of the touch pressure reaches a first threshold, the processor 410 may output the protruding object 2753 to include a phrase indicating an event of "power off", and when intensity of the touch pressure reaches a second threshold larger than a first threshold, the processor 410 may output the protruding object 2755 to include a phrase indicating an event of "reboot" and when intensity of the touch pressure reaches a third threshold greater than the second threshold, the processor 410 may control the display to output the protruding object 2757 to include a phrase indicating an event of "emergency call".

According to any embodiment, in a state in which protruding objects 2751, 2753, 2755, and 2757 include a specific phrase, when a specified gesture (e.g., a sliding gesture input or a swipe gesture input) is detected in the fourth sub-region 2710, even if the user's touch input is released, the processor 410 may control the display 453 such that the protruding objects 2751, 2753, 2755, and 2757 maintain a state of displaying a phrase. For example, in a state in which a phrase of the protruding objects 2751, 2753, 2755, and 2757 is maintained, when a designated input (e.g., a touch input with a pressure of a threshold or more) is again detected in the fourth sub-region 2710, the processor 410 may perform a function or an operation corresponding to the phrase. For example, in a state in which the protruding object 2753 includes a phrase indicating an event of "power off", when a sliding gesture is detected in the fourth sub-region 2710, even if the user's touch input is released, the processor 410 may maintain a display state of the protruding object 2753 including a phrase indicating an event of "power off" and in a state in which display of the protruding object 2753 is maintained, when a designated input (e.g., a touch input with a pressure of a threshold or more) is detected in the fourth sub-region 2710, the processor 410 may activate the "power off" event.

FIGS. 28A, 28B, 28C, and 28D are diagram illustrating visual feedback providing when an electronic device detects a touch pressure in a third sub-region of a second region of a display according to an embodiment of the disclosure.

Referring to FIG. 28A, in a state that provides a user interface 2840 in which a common button positioned in a third sub-region 2810 is hidden, a processor 410 of an electronic device 2800 (e.g., the electronic device 101) may detect a touch input in the third sub-region 2810 and when intensities 2821, 2823, 2825, and 2827 of the touch pressure in the third sub-region 2810 gradually increase, as shown in order of FIGS. 28A, 28B, 28C, and 28D, the processor 410 may control the display 2801 to display objects 2851, 2853, 2855, and 2857 protruded from the third sub-region 2810 as objects 2851, 2853, 2855, and 2857 indicating an activation event of the common button. For example, the processor 410 may control to adjust in a stepwise manner and display a length, brightness, color, or chroma of the protruding objects 2851, 2853, 2855, and 2857 in response to gradual increase of intensities 2821, 2823, 2825, and 2827 of a touch pressure in a range of less than a threshold. For example, the processor 410 may control a display 2801 such that the protruding objects 2851, 2853, 2855, and 2857 include information representing an environment setup parameter (e.g., a volume level, brightness of the display 2801, or sensitivity of the microphone 288) of the electronic device 2800 adjusted in response to activation of an input event of the common button based on pressure intensity. According to an embodiment, when the touch input is released, the processor 410 may maintain a final environment setup parameter of the electronic device 2800 before release of the touch input.

FIGS. 29A, 29B, 29C, and 29D are diagram illustrating another visual feedback providing when an electronic device detects a touch pressure in a third sub-region of a second region of a display according to an embodiment of the disclosure.

Referring to FIG. 29A, in a state that provides a user interface 2940 in which a common button positioned in a third sub-region 2910 is hidden, a processor 410 of an electronic device 2900 (e.g., the electronic device 101) may detect a touch input in the third sub-region 2910 and when intensities 2921, 2923, 2925, and 2927 of a touch pressure in the third sub-region 2910 gradually increase, the processor 410 may control a display 453 such that a specified hot key or specified application icons 2951, 2953, 2955, and 2957 protrude from the third sub-region 2910, as shown in order of FIGS. 29A, 29B, and 29C. For example, the processor 410 may control to adjust in a stepwise manner and display a protruded level, position, or speed of the specified hot key or the specified application icons 2951, 2953, 2955, and 2957 in response to gradual increase of intensities 2921, 2923, 2925, and 2927 of a touch pressure in a range of less than a threshold.

According to an embodiment, when a touch input 2927 with a pressure of a threshold or more is detected in the third sub-region 2910, even though the touch input 2927 is released, the processor 410 may control the display such that a specified hot-key or a specified application icon 2957 is displayed while maintaining a protruding state, as shown in FIG. 29D. According to an embodiment, in the maintaining state, when a touch input with a pressure of a threshold or more is again detected in the third sub-region 2910, the processor 410 may control the display 453 to hide again a specified hot key or designated application icons 2951, 2953, 2955, and 2957.

Figure 30:
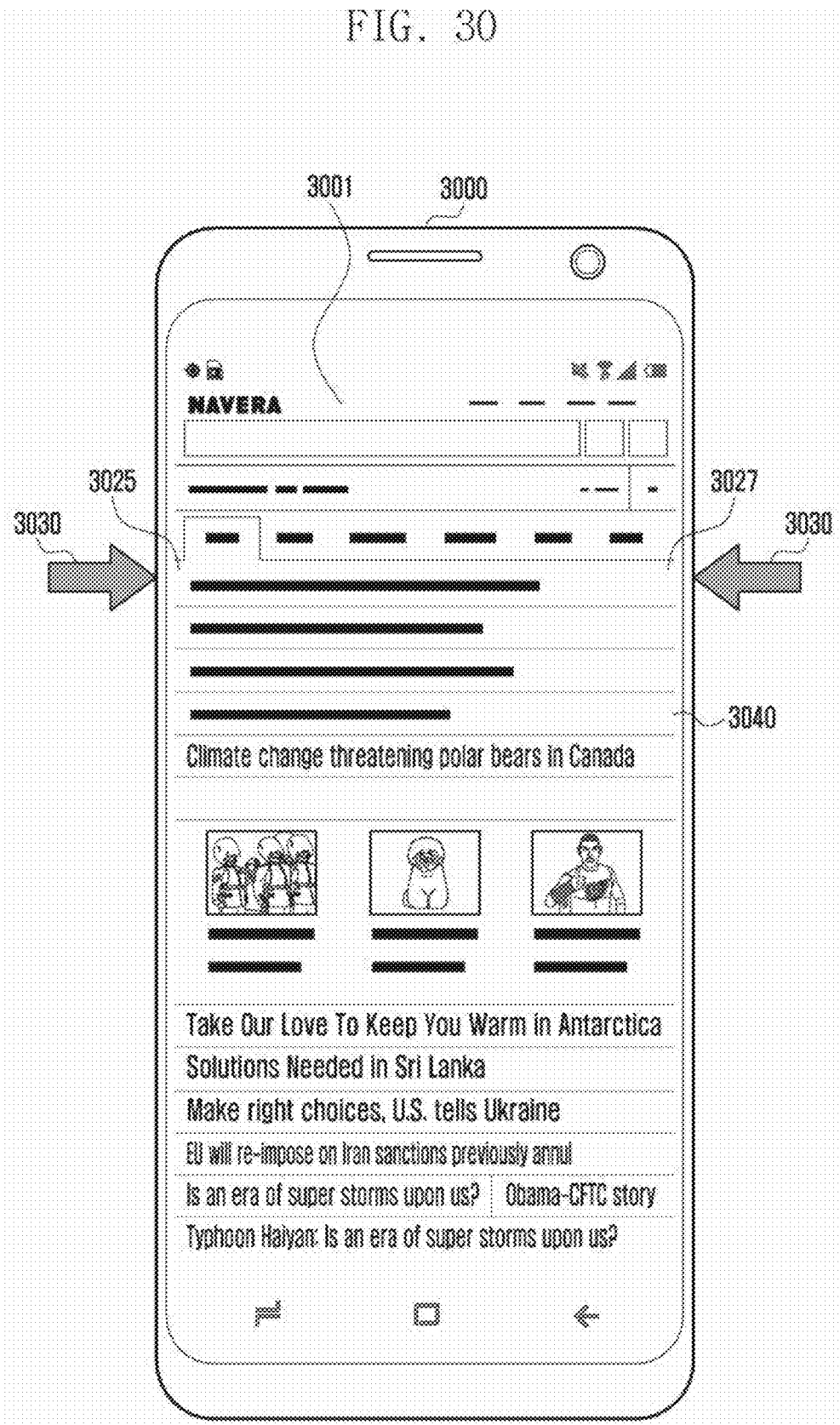
FIG. 30 is a diagram illustrating an electronic device configured to simultaneously detect a touch pressure in a third sub-region and a fourth sub-region of a second region of a display according to an embodiment of the disclosure.

FIG. 30 is a diagram illustrating an electronic device configured to simultaneously detect a touch pressure in a third sub-region and a fourth sub-region of a second region of a display according to an embodiment of the disclosure.

Referring to FIG. 30, for example, while a display 3001 of an electronic device 3000 outputs a user interface 3040 in which a common button positioned in a third sub-region 3025 and a fourth sub-region 3027 is hidden, a processor of the electronic device may control to detect a squeeze touch 3030 in the third sub-region 3025 and the fourth sub-region 3027. For example, the processor 410 may control to detect a simultaneously detected touch input 3030 in the third sub-region 3025 and the fourth sub-region 3027. In the above description, an expression "simultaneously detects a touch pressure" may not mean to trigger when a start time point of detection of a first touch pressure in the third sub-region 3025 and a start time point of detection of a second touch pressure in the fourth sub-region 3027 are the same. For example, in the above description, an expression "simultaneously detects a touch pressure" may mean to trigger when both a first touch pressure in the third sub-region 3025 and a second touch pressure in the fourth sub-region 3027 at any time point are detected for an interval of a specified time or more.

FIGS. 31A, 31B, 31C, and 31D are diagrams illustrating an operation and visual feedback providing when an electronic device simultaneously detects a touch pressure in a third sub-region and a fourth sub-region of a second region of a display according to an embodiment of the disclosure.

Referring to FIG. 31, for example, while an electronic device 3100 provides a user interface 3140 in which a common button positioned in a third sub-region 3125 and a fourth sub-region 3127 is hidden, when a squeeze touch is detected in the third sub-region 3125 and the fourth sub-region 3127, the processor 410 may control to gradually reduce and display an application screen 3140 output by a display based on intensities 3131, 3133, 3135, and 3137 of a touch pressure. For example, when the intensities 3131, 3133, 3135, and 3137 of a squeeze touch pressure gradually increase, as shown in order of FIGS. 31A, 31B, and 31C, the processor 410 may control to gradually reduce and display an application screen output by the display 453 in response to gradual increase of the intensities 3131, 3133, and 3135 of a touch pressure in a range of less than a threshold.

According to an embodiment, when an input of a squeeze touch with a pressure 3137 of a threshold or more is detected in the third sub-region 3125 and the fourth sub-region 3127, the processor 410 may activate a power off event, as shown in FIG. 31D.

FIGS. 32A, 32B, 32C, and 32D are diagram illustrating an operation and visual feedback providing when an electronic device simultaneously detects a touch pressure in a third sub-region and a fourth sub-region of a second region of a display according to an embodiment of the disclosure.

Referring to FIG. 32, for example, in a state that provides a user interface 3240 in which a common button positioned in a third sub-region 3265 and a fourth sub-region 3267 is hidden, when a squeeze touch is detected in the third sub-region 3265 and the fourth sub-region 3267, a processor 410 of an electronic device 3200 may control a display to display objects 3251, 3253, and 3255 representing intensities 3231, 3233, 3235, and 3237 of the pressure in at least a portion of each of the three sub-region 3265 and the fourth sub-region 3267. For example, the processor 410 may control to adjust in a stepwise manner and display a length, brightness, color, or chroma of objects 3251, 3253, and 3255 in response to gradual increase of intensities 3231, 3233, 3235, and 3237 of a squeeze touch pressure in a range of less than the threshold.

According to an embodiment, when a squeeze touch input with a pressure 3237 of a threshold or more is detected in the third sub-region 3265 and the fourth sub-region 3267, the processor 410 may activate a power off event, as shown in FIG. 32D.

Figure 33:
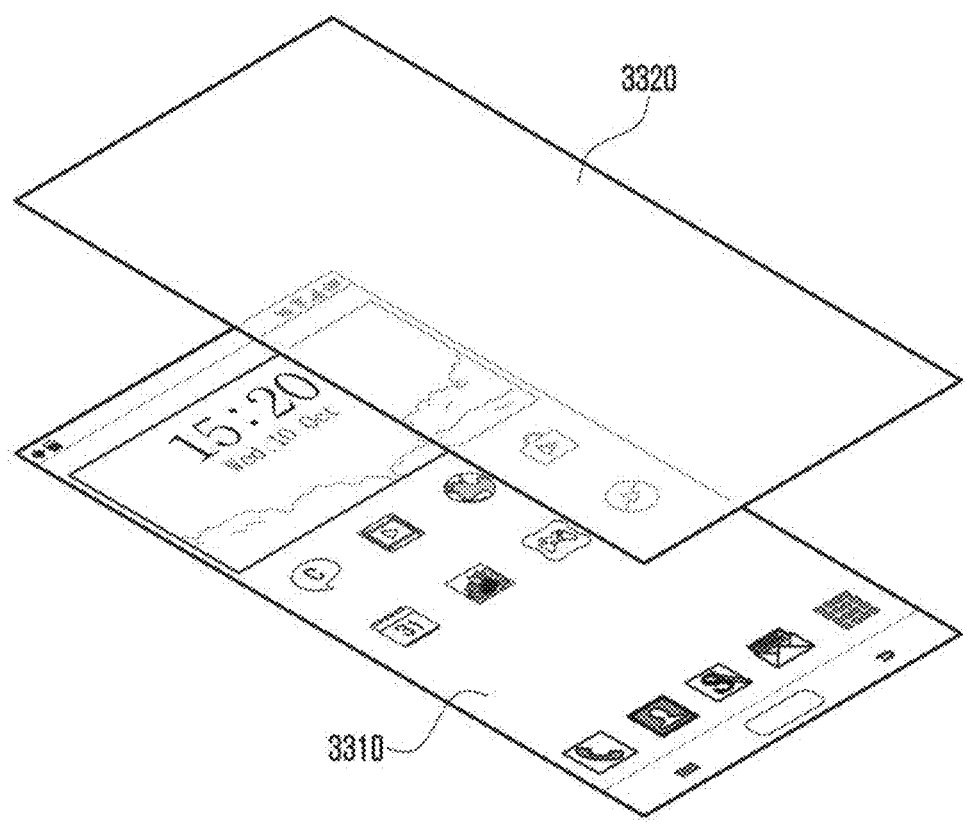
FIG. 33 is a diagram illustrating a layer structure of a screen output by display of an electronic device according to various embodiments of the disclosure.

FIG. 33 is a diagram illustrating a layer structure of a screen output by a display of an electronic device according to various embodiments of the disclosure.

Referring to FIG. 33, the processor 410 of the electronic device may control a display to dispose a separate superordinate layer 3320 on a basic screen (e.g., a home screen) 3310. For example, the processor 410 may include a layer manager to display an application screen, icon, or other visual feedback at the superordinate layer 3320. According to an embodiment, the layer manager may be implemented into software or may be implemented into hardware in a separate IC different from the processor 410.

According to an embodiment, when a user interface including an application screen is reduced, rotated, or blurred, the processor 410 may control to display the entire superordinate layer 3320 on an application screen. According to any embodiment, when a specific icon is gradually largely displayed or popped up, the processor 410 may control the display 453 to display a specified application icon or hot key in the superordinate layer 3320 separately from icons displayed on the basic screen 3310. According to an embodiment, the processor 410 may control the basic screen 3310 and the superordinate layer 3320 to independently output different visual feedback.

Figure 34A:
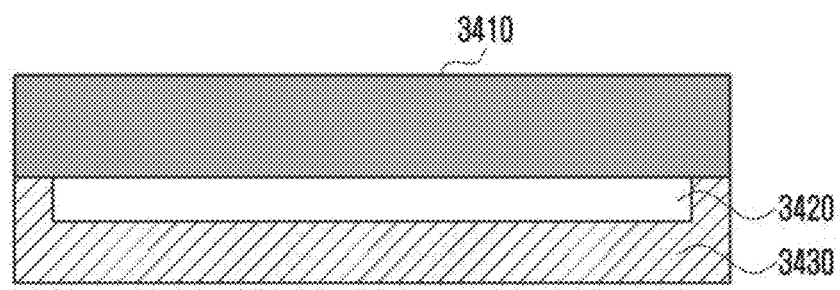
FIGS. 34A and 34B are diagrams illustrating a structure of a pressure sensor according to various embodiments of the disclosure.
Figure 34B:
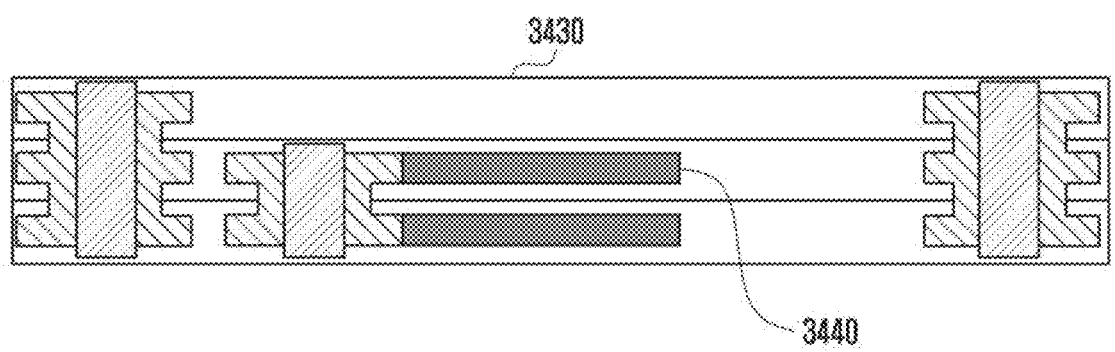

FIGS. 34A, and 34B are diagram illustrating a structure of a pressure sensor according to various embodiments of the disclosure.

Figure 35A:
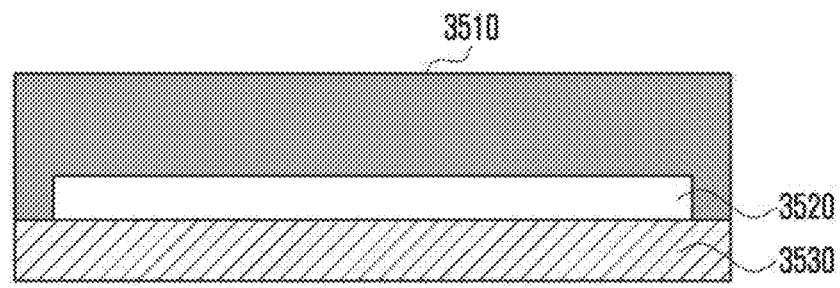
FIGS. 35A and 35B are diagrams illustrating another structure of a pressure sensor according to various embodiments of the disclosure.
Figure 35B:
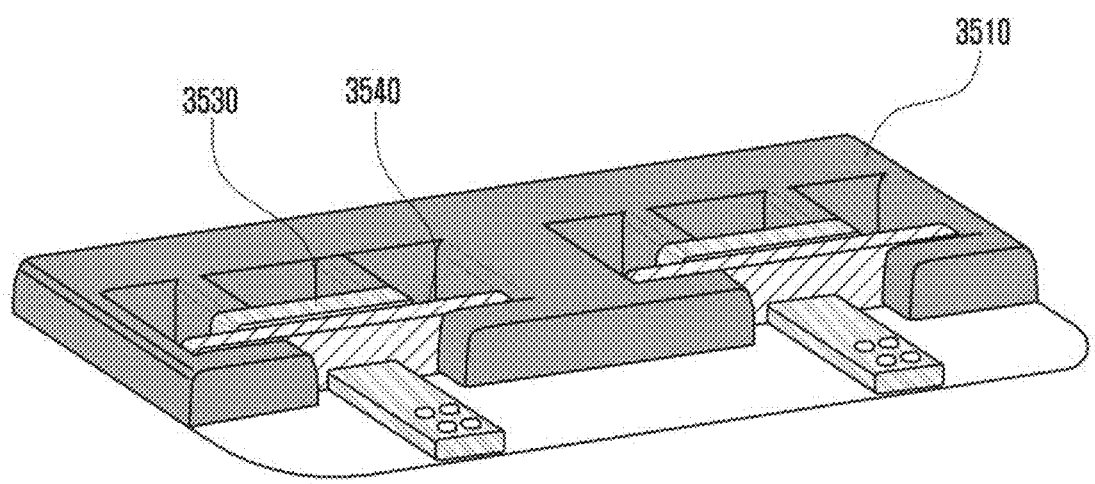

FIGS. 35A and 35B are diagram illustrating another structure of a pressure sensor according to various embodiments of the disclosure.

Figure 36A:
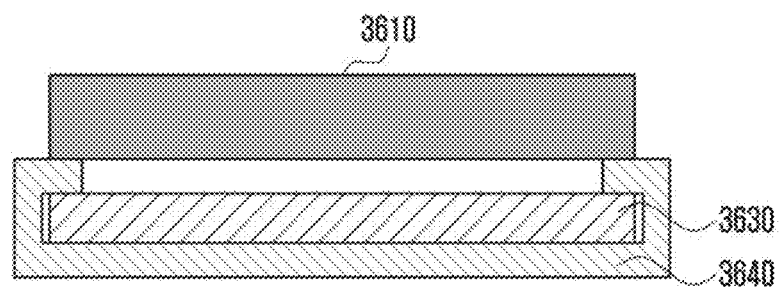
FIGS. 36A and 36B are diagrams illustrating another structure of a pressure sensor according to various embodiments of the disclosure.
Figure 36B:
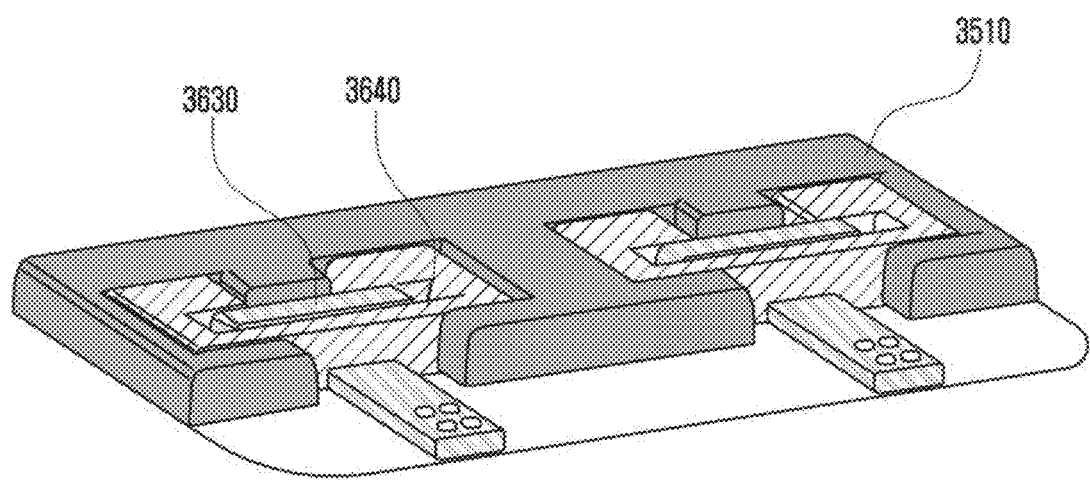

FIGS. 36A and 36B are diagram illustrating another structure of a pressure sensor according to various embodiments of the disclosure.

Figure 37A:
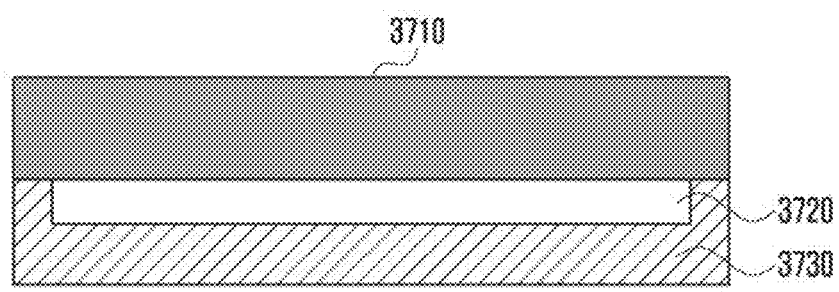
FIGS. 37A and 37B are diagrams illustrating another structure of a pressure sensor according to various embodiments of the disclosure.
Figure 37B:
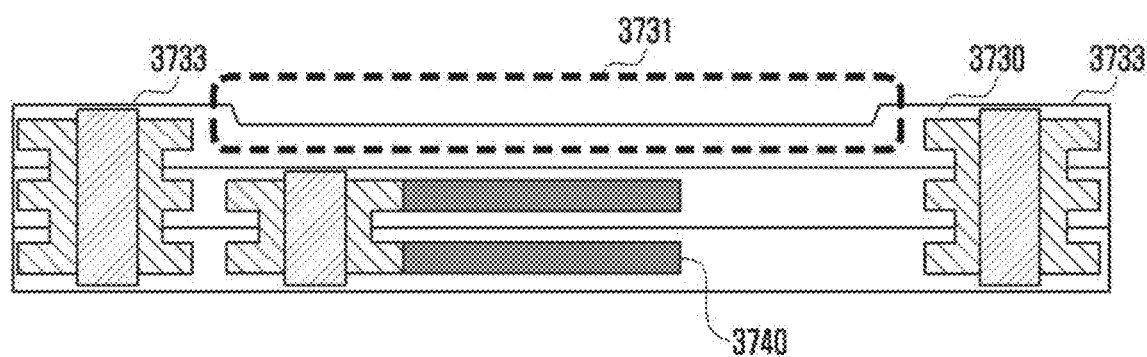

FIGS. 37A and 37B are diagram illustrating another structure of a pressure sensor according to various embodiments of the disclosure.

Figure 38A:
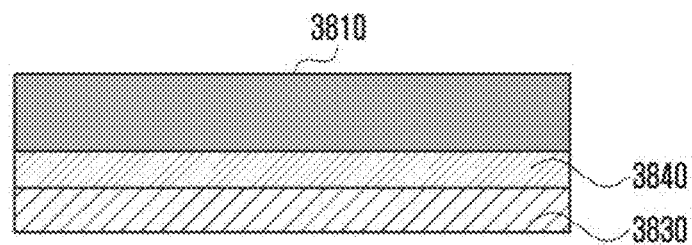
FIGS. 38A and 38B are diagrams illustrating another structure of a pressure sensor according to various embodiments of the disclosure.
Figure 38B:
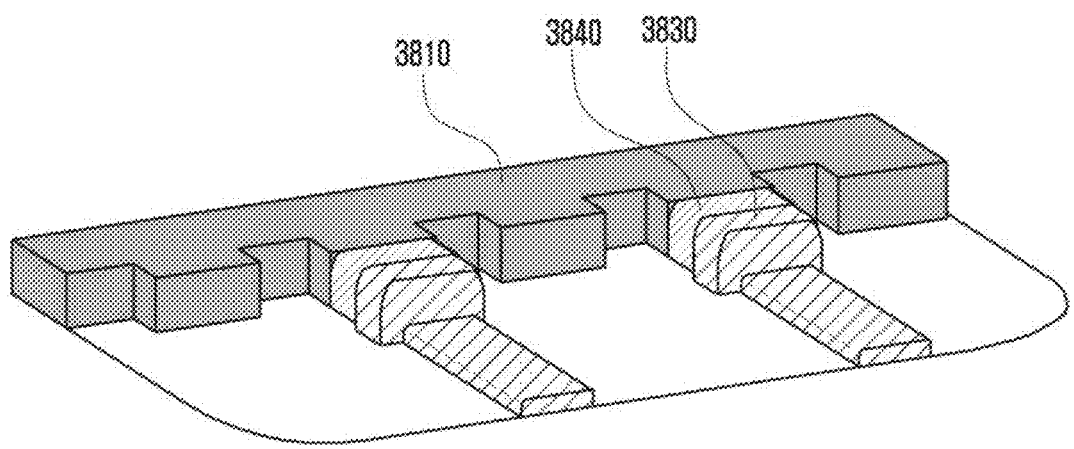

FIGS. 38A and 38B are diagram illustrating another structure of a pressure sensor according to various embodiments of the disclosure.

According to various embodiments, a pressure sensor of the electronic device may be an inductive type pressure sensor. For example, the inductive type pressure sensor may detect a pressure in response to a change in a current induced in an inductor (e.g., a coil) based on a user pressure. As a conductor (e.g., a metal housing, a user finger) approaches an inductor (e.g., coil) disposed within the housing by a user pressure, the current may increase.

According to an embodiment, the pressure sensor 431 of the electronic device may include a pressure sensor structure of the metal housing. When a pressure sensor structure of the metal housing receives an input through a side surface or a top/bottom metal housing, a problem may occur that the metal housing is not well depressed because of rigidity of the metal housing. In order to avoid the problem, as a pressure sensor according to various embodiments of the disclosure, the following structure of inductive type pressure sensor may be applied.

Referring to FIGS. 34A and 34B, the inductive type pressure sensor may detect a pressure based on a change in a current induced in an inductor (e.g., a coil) according to a user pressure. As shown in FIG. 34A, as a conductor (e.g., a user finger, a metal housing 3410) approaches an inductor (e.g., coil) 3430 disposed within the housing 3410 by a user pressure, the current may increase. For example, as shown in FIG. 34B, as conductors 3440 disposed over various layers of a multilayer flexible printed circuit board (FPCB) are electrically connected, the inductor 3430 may be configured. In FIG. 34, reference numeral 3420 may indicate a space within the metal housing 3410.

Referring to FIGS. 35A and 35B, the inductive type pressure sensor may be formed in, for example, one piece of a metal and a spacer. For example, in the pressure sensor, protrusions protruded from a metal housing 3510 may perform a function of a spacer that maintains a distance from a sensor 3530. Further, the pressure sensor may include a stiffener 3540 that fixes the sensor such that the sensor is not pushed out. In FIG. 35, reference numeral 3520 may indicate a space within the metal housing 3510.

Referring to FIGS. 36A and 36B, the inductive type pressure sensor may be formed in, for example, a spacer extended type. For example, in the pressure sensor, a stiffener 3640 that fixes a sensor 3630 not to push out backward may be integrally formed to perform a function of a spacer of maintaining a distance between a metal housing 3610 and the sensor 3630.

Referring to FIGS. 37A and 37B, the inductive type pressure sensor may be formed in, for example, an integral spacer. For example, as designated by reference numeral 3731, in the pressure sensor, by cutting out a central portion of a sensor FPCB 3730, an outer portion 3733 may perform a function of a spacer 3720 that maintains a distance between a metal housing 3710 and the sensor 3730. In FIG. 37, reference numeral 3740 may indicate a conductor disposed over several layers of the FPCB 3730.

Referring to FIGS. 38A and 38B, the inductive type pressure sensor may be formed in, for example, an attached type. For example, in the pressure sensor, an adhesive 3840 disposed between a metal housing 3810 and a sensor 3830 may perform a function of a spacer for maintaining a distance between the metal housing 3810 and the sensor 3830.

Figure 39:
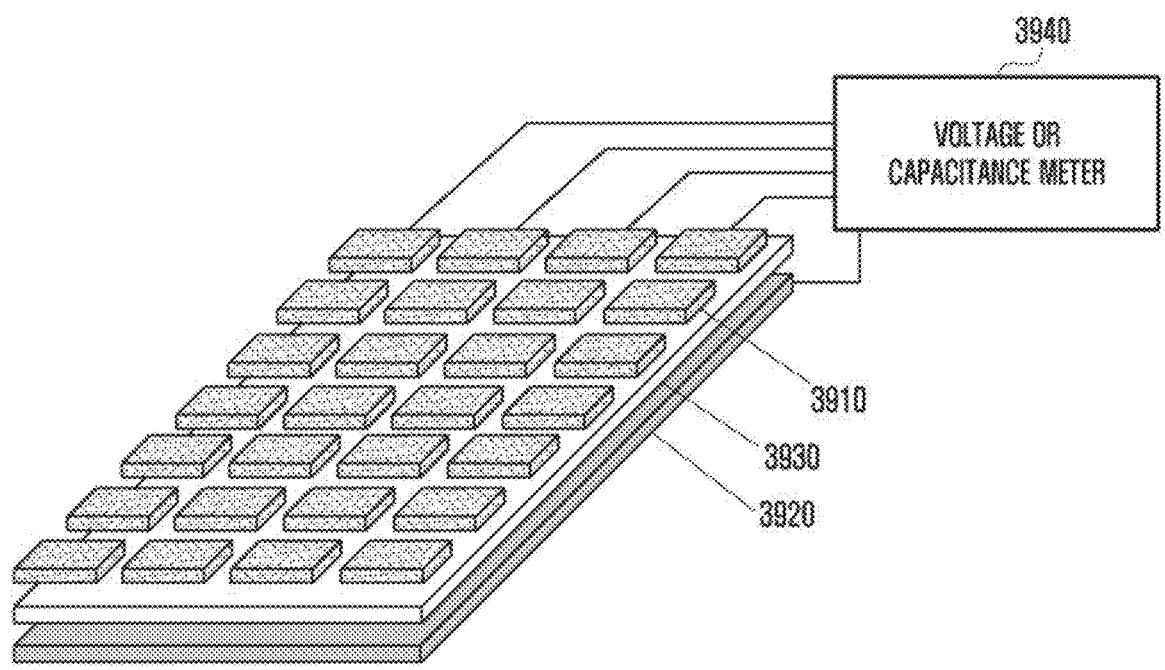
FIG. 39 is a diagram illustrating constituent elements of a self-capacitance type pressure sensor according to various embodiments of the disclosure.

FIG. 39 is a diagram illustrating constituent elements of a self-capacitance type pressure sensor according to various embodiments of the disclosure.

Referring to FIG. 39, a pressure sensor of the electronic device may be a self capacitance type pressure sensor. For example, the pressure sensor may include a first electrode 3910 of a plurality of repeated polygonal (or circles) forms, a second electrode 3920 extended to one over an entire area corresponding to a plurality of repeated polygons, a dielectric layer 3930 disposed between the first electrode 3910 and the second electrode 3920, and a voltage or capacitance meter 3940 electrically connected to the first electrode 3910 and the second electrode 3920. According to an embodiment, the pressure sensor may detect a pressure based on a change in capacitance between each partial electrode of the first electrode 3910 and the second electrode 3920. According to an embodiment, a position or a type of the first electrode 3910 and the second electrode 3920 may be interchanged.

Figure 40:
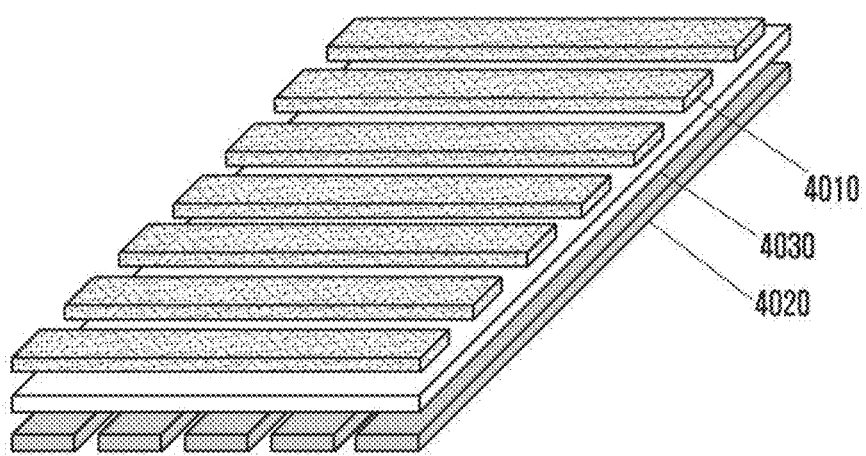
FIG. 40 is a diagram illustrating constituent elements of a mutual capacitance type pressure sensor according to various embodiments of the disclosure.

FIG. 40 is a diagram illustrating constituent elements of a mutual capacitance type pressure sensor according to various embodiments of the disclosure.

Referring to FIG. 40, a pressure sensor of the electronic device may be a mutual capacitance type pressure sensor. For example, the pressure sensor may include a first electrode 4010 extended in a first direction, a second electrode 4020 extended in a second direction substantially perpendicular to the first direction, and a dielectric layer 4030 disposed between the first electrode 4010 and the second electrode 4020. According to an embodiment, the pressure sensor may detect a pressure based on a change in capacitance between the first electrode 4010 and the second electrode 4020 at an intersecting point of the first electrode 4010 and the second electrode 4020. According to an embodiment, a position or a type of the first electrode 4010 and the second electrode 4020 may be interchanged. According to an embodiment, the first electrode 4010 and the second electrode 4020 may be opaque or transparent. For example, when the first electrode 4010 or the second electrode 4020 is opaque, the first electrode 4010 and the second electrode 4020 may include a combination of at least one or both of Cu, Ag, Mg, and Ti. According to an embodiment, when the first electrode 4010 or the second electrode 4020 is transparent, the first electrode 4010 and the second electrode 4020 may include a combination of at least one or two of indium tin oxide (ITO), indium zinc oxide (IZO), polymer conductor, graphene, and opaque line patterns (Ag nanowire, metal mesh, etc.) of a specific line width or more. According to an embodiment, the dielectric layer 4030 may include at least one of silicone, air, foam, membrane, optical clear adhesive (OCA), sponge, rubber, ink, and a polymer.

Figure 41:
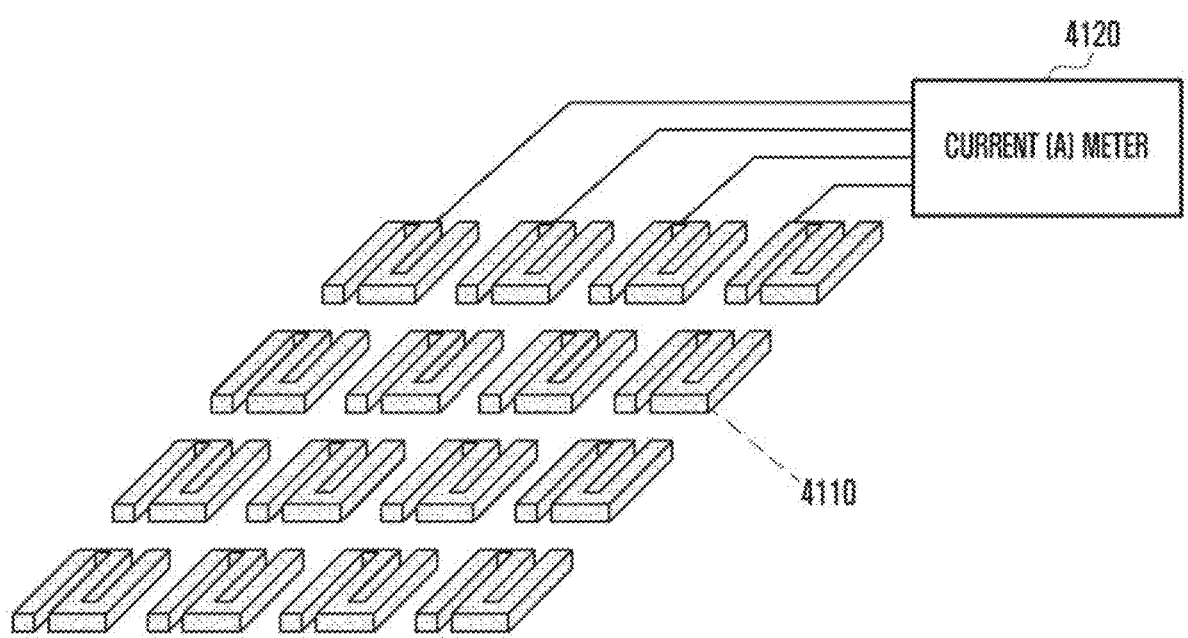
FIG. 41 is a diagram illustrating constituent elements of an inductive type pressure sensor according to various embodiments of the disclosure.

FIG. 41 is a diagram illustrating constituent elements of an inductive type pressure sensor according to various embodiments of the disclosure.

Referring to FIG. 41, a pressure sensor of the electronic device may be an inductive type pressure sensor. For example, the pressure sensor may detect a pressure based on a change of a current induced in an inductor (e.g., coil) 4110 according to a user pressure detected by a current meter 4120. For example, as the conductor (e.g., a metal housing, a user finger) approaches the inductor (e.g., coil) 4110 disposed within the housing by a user pressure, the current may increase.

Figure 42:
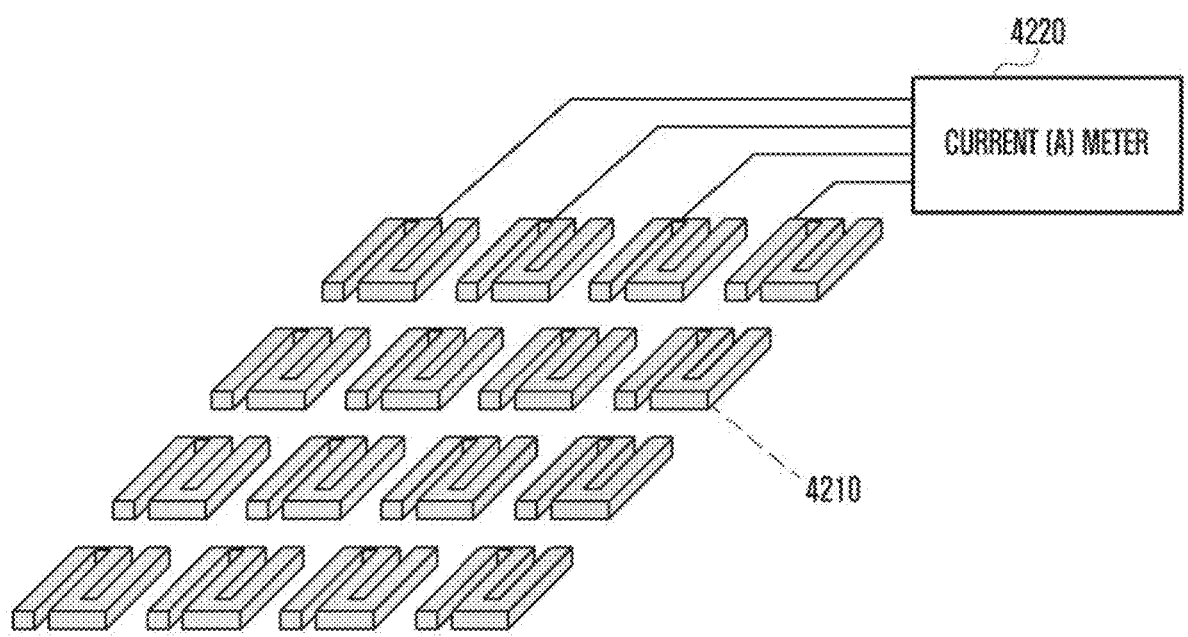
FIG. 42 is a diagram illustrating constituent elements of a strain gauge type pressure sensor according to various embodiments of the disclosure.

FIG. 42 is a diagram illustrating constituent elements of a strain gauge type pressure sensor according to various embodiments of the disclosure.

Referring to FIG. 42, a pressure sensor of the electronic device may be a strain gauge type pressure sensor. For example, the pressure sensor may detect a pressure based on a change in resistance of a conductor (e.g., wire) 4210 according to a user pressure detected by a current meter 4220. For example, as a length of the conductor increases by a user pressure, a sectional area of the conductor reduces; thus, the resistance may increase. For example, the wire constituting the conductor may be formed in a Wheatstone bridge form.

Figure 43:
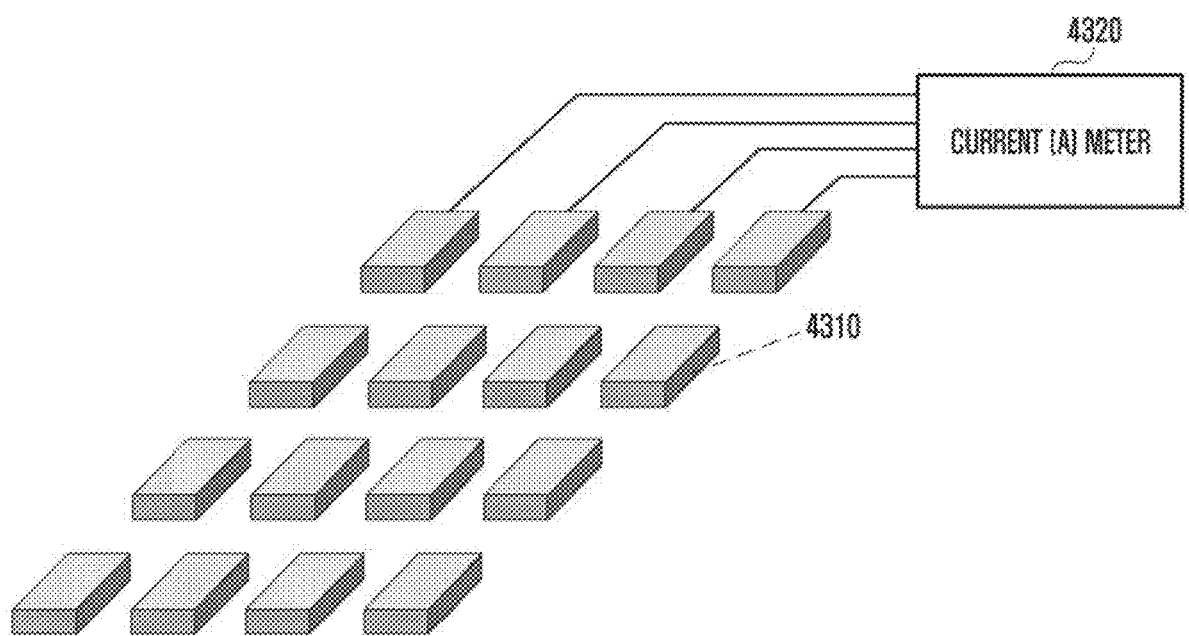
FIG. 43 is a diagram illustrating constituent elements of a piezo type pressure sensor according to various embodiments of the disclosure.

FIG. 43 is a diagram illustrating constituent elements of a piezo type pressure sensor according to various embodiments of the disclosure.

Referring to FIG. 43, a pressure sensor of the electronic device may be a piezo type pressure sensor. For example, the pressure sensor may detect a pressure based on a current generated in a piezoelectric material 4310 according to a user pressure and detected by a current meter 4320. For example, as an amount of a current converted by the piezoelectric material 4310 increases by the user pressure, the current may increase.

Figure 44:
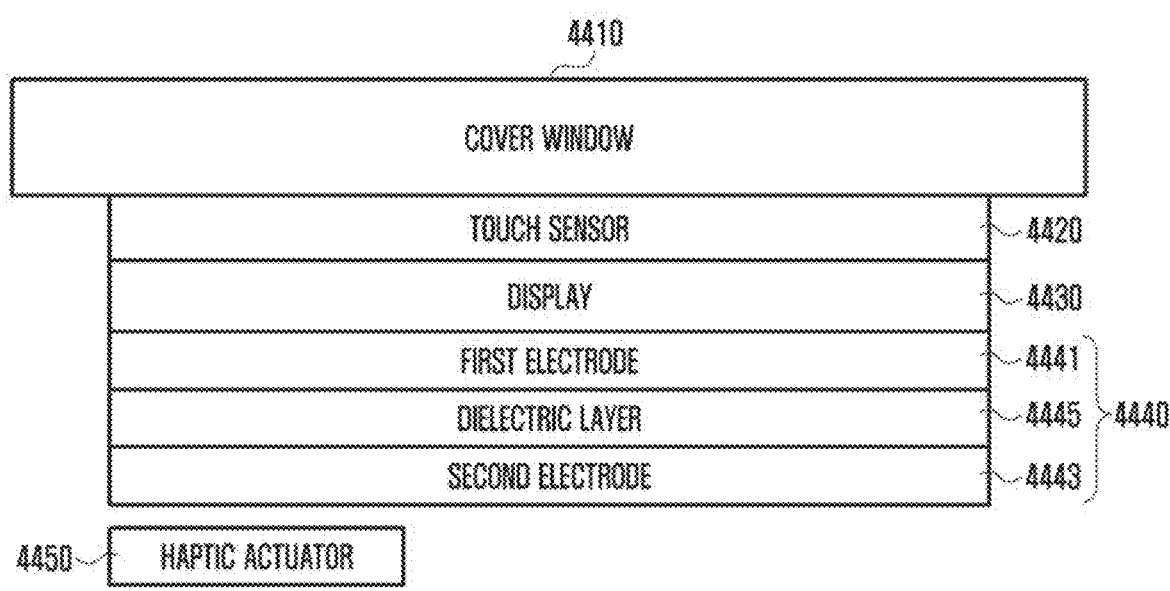
FIG. 44 is a schematic cross-sectional view illustrating an electronic device including a capacitive type pressure sensor according to various embodiments of the disclosure.

FIG. 44 is a schematic cross-sectional view illustrating an electronic device including a capacitive type pressure sensor according to various embodiments of the disclosure.

Referring to FIG. 44, the electronic device may include, for example, a cover window 4410, touch sensor 4420, display 4430, pressure sensor 4440, and haptic actuator 4450.

The pressure sensor 4440 may include, for example, a first electrode 4441, second electrode 4443, and dielectric layer 4445 disposed therebetween. For example, as shown in FIG. 44, the pressure sensor 4440 may be disposed under the display 4430, and in this case, the first electrode 4441 or the second electrode 4443 may be disposed integrally with the display 4430 or may be disposed at a separate support member FPCB. Alternatively, unlike that shown in FIG. 44, the pressure sensor 4440 may be disposed between the cover window 4410 and the display 4430, and in this case, the first electrode 4441 or the second electrode 4443 may be disposed integrally with the touch sensor 4420 or may be disposed at a separate support member (e.g., polyethylene terephthalate (PET)). Alternatively, unlike that shown in FIG. 44, the pressure sensor 4440 may be disposed at least partially (at least one electrode layer) within the display 4430, and in this case, the first electrode 4441 or the second electrode 4443 may be disposed between electrodes of the display 4430. According to an embodiment, the pressure sensor 4440 may be implemented into a self-capacitance type or a mutual capacitance type.

The touch sensor 4420 may be disposed, for example, between the cover window 4410 and the display 4430. For example, unlike that shown in FIG. 44, the touch sensor 4420 may be disposed at least partially (at least one electrode layer) within the display 4430. According to an embodiment, the touch sensor 4420 may be implemented into a self-capacitance type or a mutual capacitance type.

For example, it is shown that a single haptic actuator is disposed under the pressure sensor 4440, but the haptic actuator may be variously disposed at several positions of the electronic device and may be the plurality. For example, the haptic actuator may provide various kinds of vibration feedback to all or a part of the electronic device.

The cover window 4410 may include, for example, a substantially solid layer such as glass (including tempered glass and sapphire crystal) or a substantially flexible layer such as a polymer (e.g., PI, PET, and PC).

The display 4430 may include, for example, various displays 4430 such as an organic light emitting diode (OLED), liquid crystal display (LCD), and quantum dot (QD). According to an embodiment, the display 4430 may have a flexible property.

As described above, in an electronic device and method according to various embodiments of the disclosure, upon receiving a user's touch input, by distinguishing whether the touch input is a command related to an application or a command related to a generic function of the electronic device, user convenience can be enhanced.

A programming module according to embodiments of the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Further, some operations may be executed according to another order or may be omitted, or other operations may be added.

The above-described embodiments of the disclosure can be implemented in hardware, firmware or via the execution of software or computer code that can be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., random access memory (RAM), read only memory (ROM), Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and detail may be made therein without departing from the spirit and scope of the disclosure as defined by the appended claims.

What is claimed is:

1. An electronic device comprising:
    a display;
    a pressure sensing circuit configured to detect a pressure exerted onto at least a portion of the display by an external force;
    at least one processor; and
    a memory configured to store instructions that, when executed by the at least one processor, cause the at least one processor to:
        display a user interface through the display,
        detect a first touch input with a pressure lower than a threshold via a first region of the display,
        perform a first action associated with an application program in response to the first touch input,
        detect a second touch input with a pressure lower than the threshold via a second region of the display, wherein the second region abuts a periphery of the display,
        perform a second action associated with the application program in response to the second touch input based at least in part on the second touch input being detected via the second region of the display,
        detect a third touch input with a pressure greater than the threshold via the first region of the display,
        perform a third action associated with the application program in response to the third touch input,
        detect a fourth touch input with a pressure greater than the threshold via the second region, and
        perform a fourth action different from the second action in response to the fourth touch input, the fourth action being a generic action associated with a system of the electronic device regardless of the application program,
    wherein the fourth touch input is received while the application program is active and the fourth action is independent of the application program.

2. The device of claim 1, wherein the fourth action includes an action associated with a home button.

3. The device of claim 2, wherein the fourth action includes an action invoking an intelligent assistant program.

4. The device of claim 1, wherein the first region is adjacent to the center of the display.

5. The device of claim 1, wherein the instructions further cause the at least one processor to:
    detect a fifth touch input with a pressure lower than the threshold via a third region of the display adjacent to a periphery of the display and positioned at the opposite side of the second region,
    perform a fifth action associated with the application program in response to the fifth touch input,
    detect a sixth touch input with a pressure greater than the threshold via the third region, and
    perform a sixth action of displaying at least one notification or status information related to the electronic device in response to the sixth touch input.

6. The device of claim 1, wherein the instructions further cause the at least one processor to:
    detect a seventh touch input with a pressure lower than the threshold via a fourth region of the display adjacent to a periphery of the display and adjacent to one side of the second region,
    perform a seventh action associated with the application program in response to the seventh touch input,
    detect an eighth touch input with a pressure greater than the threshold via the fourth region, and
    perform an eighth action of invoking an intelligent assistant program or adjusting a volume of a speaker in response to the eighth touch input.

7. The device of claim 6, wherein the instructions further cause the at least one processor to:

detect a ninth touch input with a pressure lower than the threshold via a fifth region of the display adjacent to a periphery of the display and adjacent to an opposite side of the fourth region, perform a ninth action associated with the application program in response to the ninth touch input, detect a tenth touch input with a pressure greater than the threshold via a fifth region, and perform a tenth action of activating a power off function or an emergency call function in response to the tenth touch input.

8. The device of claim 7, wherein the tenth action comprises an action associated with a menu comprising at least one specified icon.

9. A method of controlling an electronic device, the method comprising:

displaying a user interface through a display;

detecting a first touch input with a pressure lower than a threshold via a first region of the display;

performing a first action associated with an application program in response to the first touch input;

detecting a second touch input with a pressure lower than the threshold via a second region of the display adjacent to a periphery of the display;

performing a second action associated with the application program in response to the second touch input based at least in part on the second touch input being detected via the second region of the display;

detecting a third touch input with a pressure greater than the threshold via the first region of the display;

performing a third action associated with the application program in response to the third touch input;

detecting a fourth touch input with a pressure greater than the threshold via the second region; and performing a generic fourth action associated with the electronic device in response to the fourth touch input, wherein the fourth touch input is received while the application program is active and the fourth action is independent of the application program.

10. The method of claim 9, wherein the fourth action comprises an action associated with a home button.

11. The method of claim 9, further comprising:

detecting a fifth touch input with a pressure lower than the threshold via a third region of the display adjacent to a periphery of the display and positioned at the opposite side of the second region;

performing a fifth action associated with the application program in response to the fifth touch input;

detecting a sixth touch input with a pressure greater than the threshold via the third region; and performing a sixth action of displaying at least one notification or status information related to the electronic device in response to the sixth touch input.

12. The method of claim 9, further comprising:

detecting a seventh touch input with a pressure lower than the threshold via a fourth region of the display adjacent to a periphery of the display and adjacent to one side of the second region;

performing a seventh action associated with the application program in response to the seventh touch input;

detecting an eighth touch input with a pressure greater than the threshold via the fourth region; and performing an eighth action of invoking an intelligent assistant program or adjusting a volume of a speaker in response to the eighth touch input.

13. The method of claim 12, further comprising:

detecting a ninth touch input with a pressure lower than the threshold via a fifth region of the display adjacent to a periphery of the display and adjacent to an opposite side of the fourth region;

performing a ninth action associated with the application program in response to the ninth touch input;

detecting a tenth touch input with a pressure greater than the threshold via the fifth region; and performing a tenth action of activating a power off function or an emergency call function in response to the tenth touch input.

14. The method of claim 13, wherein the tenth action further comprises an action associated with a menu comprising at least one specified icon.

15. A non-transitory recording medium in which a program for controlling an operation of an electronic device is recorded, wherein the program when executed by at least one processor enables the at least one processor to:

display a user interface through a display;

detect a first touch input with a pressure lower than a threshold via a first region of the display;

perform a first action associated with an application program in response to the first touch input;

detect a second touch input with a pressure lower than the threshold via a second region of the display adjacent to a periphery of the display;

perform a second action associated with the application program in response to the second touch input based at least in part on the second touch input being detected via the second region of the display;

detect a third touch input with a pressure greater than the threshold via a first region of the display;

perform a third action associated with the application program in response to the third touch input;

detect a fourth touch input with a pressure greater than the threshold via the second region; and perform a generic fourth action associated with the electronic device in response to the fourth touch input, wherein the fourth touch input is received while the application program is active and the fourth action is independent of the application program.

16. The non-transitory recording medium of claim 15, wherein the fourth action comprises one of an action associated with a home button or an action of invoking an intelligent assistant program.

* * * * *